(12) United States Patent
Siddiqui et al.

(10) Patent No.: US 10,344,510 B2
(45) Date of Patent: Jul. 9, 2019

(54) HINGED DEVICE

(71) Applicant: Microsoft Technology Licensing, LLC, Redmond, WA (US)

(72) Inventors: Kabir Siddiqui, Sammamish, WA (US); Errol Mark Tazbaz, Bellevue, WA (US); Karsten Aagaard, Monroe, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/691,524

(22) Filed: Aug. 30, 2017

(65) Prior Publication Data

US 2018/0363341 A1     Dec. 20, 2018

Related U.S. Application Data

(60) Provisional application No. 62/521,245, filed on Jun. 16, 2017.

(51) Int. Cl.
| | |
|---|---|
| *E05D 3/06* | (2006.01) |
| *E05D 3/18* | (2006.01) |
| *E05D 11/00* | (2006.01) |
| *E05D 11/08* | (2006.01) |
| *F16C 11/04* | (2006.01) |
| *G06F 1/16* | (2006.01) |
| *H04M 1/02* | (2006.01) |

(52) U.S. Cl.
CPC .............. *E05D 3/06* (2013.01); *E05D 3/18* (2013.01); *E05D 11/00* (2013.01); *E05D 11/08* (2013.01); *F16C 11/04* (2013.01); *G06F 1/1618* (2013.01); *G06F 1/1681* (2013.01); *H04M 1/022* (2013.01); *H04M 1/0241* (2013.01); *E05Y 2201/426* (2013.01); *E05Y 2900/606* (2013.01)

(58) Field of Classification Search
CPC ............. E05D 3/06; E05D 3/18; E05D 11/00; E05D 11/08; F16C 11/04; G06F 1/1681
USPC .................................................... 16/286, 366
See application file for complete search history.

(56) References Cited

U.S. PATENT DOCUMENTS

| | | | | |
|---|---|---|---|---|
| 2,040,279 | A | * | 5/1936 | Soss ........................ E05D 3/186 16/273 |
| 3,289,877 | A | | 12/1966 | Wolf |
| 4,493,316 | A | | 1/1985 | Reed |
| 4,617,699 | A | | 10/1986 | Nakamura |
| 4,718,127 | A | | 1/1988 | Rittmann et al. |

(Continued)

FOREIGN PATENT DOCUMENTS

| | | |
|---|---|---|
| CN | 1180516 A1 | 12/2004 |
| CN | 103291737 A | 9/2013 |

(Continued)

OTHER PUBLICATIONS

Written Opinion dated Sep. 6, 2017 from PCT Patent Application No. PCT/US2016/061940, 9 pages.

(Continued)

*Primary Examiner* — Roberta S Delisle
(74) *Attorney, Agent, or Firm* — Rainier Patents, P.S.

(57) ABSTRACT

The description relates to hinged devices, such as hinged computing devices. One example can include a hinge assembly that rotatably secures a first portion relative to a hinge axis. The hinge assembly can include an element that rotates around the hinge axis and moves toward and away from the hinge axis.

17 Claims, 37 Drawing Sheets

(56) References Cited

U.S. PATENT DOCUMENTS

| | | | |
|---|---|---|---|
| 4,753,331 A | 6/1988 | Dietenberger et al. | |
| 4,845,809 A | 7/1989 | Pillifant, Jr. | |
| 4,949,427 A | 8/1990 | Keller | |
| 4,976,007 A | 12/1990 | Lam | |
| 4,986,763 A | 1/1991 | Boyle | |
| 4,996,739 A | 3/1991 | Baer | |
| 5,041,818 A | 8/1991 | Liu | |
| 5,173,686 A | 12/1992 | Fujihara | |
| 5,229,921 A | 7/1993 | Bohmer | |
| 5,448,799 A | 9/1995 | Stein, Jr. | |
| 5,509,590 A | 4/1996 | Medeiros et al. | |
| 5,566,048 A | 10/1996 | Esterberg | |
| 5,606,774 A * | 3/1997 | Wu | E05D 3/12 16/283 |
| 5,640,690 A | 6/1997 | Kudma | |
| 5,666,694 A | 9/1997 | Slow et al. | |
| 5,796,576 A | 8/1998 | Kim | |
| 5,987,704 A | 11/1999 | Tan | |
| 5,995,373 A | 11/1999 | Nagai | |
| 6,108,868 A | 8/2000 | Lin | |
| 6,223,393 B1 | 5/2001 | Knopf | |
| 6,301,489 B1 | 10/2001 | Winstead | |
| 6,416,027 B1 | 7/2002 | Hart | |
| 6,421,235 B2 | 7/2002 | Ditzik | |
| 6,577,496 B1 | 6/2003 | Gioscia et al. | |
| 6,628,244 B1 | 9/2003 | Hirosawa | |
| 6,766,561 B1 * | 7/2004 | Cheng | E05D 5/0246 16/235 |
| 6,778,381 B1 | 8/2004 | Bolognia et al. | |
| 6,813,143 B2 | 11/2004 | Makela | |
| 6,925,684 B2 | 8/2005 | Kang | |
| 7,058,433 B2 | 6/2006 | Carpenter | |
| 7,127,776 B2 | 10/2006 | Park | |
| 7,155,266 B2 | 12/2006 | Stefansen | |
| 7,266,864 B2 | 9/2007 | Kim | |
| 7,293,380 B2 | 11/2007 | Repecki | |
| 7,328,481 B2 | 2/2008 | Barnett | |
| 7,345,872 B2 | 3/2008 | Wang | |
| 7,380,312 B2 | 6/2008 | Ge et al. | |
| 7,407,202 B2 | 8/2008 | Ye et al. | |
| 7,414,834 B2 | 8/2008 | Ukonaho et al. | |
| 7,418,766 B2 | 9/2008 | Nelson et al. | |
| 7,436,674 B2 | 10/2008 | Barsun et al. | |
| 7,515,406 B2 | 4/2009 | Kee | |
| 7,515,707 B2 * | 4/2009 | Ka | G06F 1/1616 16/366 |
| 7,584,524 B2 | 9/2009 | Hung | |
| 7,596,358 B2 | 9/2009 | Takagi | |
| 7,636,985 B2 | 12/2009 | Greenbank | |
| 7,753,331 B2 | 7/2010 | Tang | |
| 7,758,082 B2 | 7/2010 | Weigel et al. | |
| 7,832,056 B2 * | 11/2010 | Kuwajima | H04M 1/022 16/282 |
| 7,900,323 B2 * | 3/2011 | Lin | F21S 6/003 16/254 |
| 7,936,559 B2 | 5/2011 | Chen | |
| 7,966,694 B2 | 6/2011 | Estlander | |
| 7,966,698 B2 | 6/2011 | Barnett | |
| 8,032,988 B2 | 10/2011 | Lai et al. | |
| 8,050,021 B2 | 11/2011 | Grady et al. | |
| 8,122,970 B2 | 2/2012 | Palen | |
| 8,170,630 B2 | 5/2012 | Murayama et al. | |
| 8,405,978 B2 | 3/2013 | Okutsu | |
| 8,441,791 B2 | 5/2013 | Bohn et al. | |
| 8,451,601 B2 | 5/2013 | Bohn et al. | |
| 8,474,101 B2 * | 7/2013 | Wang | G06F 1/1681 16/354 |
| 8,498,100 B1 | 7/2013 | Whit et al. | |
| 8,522,401 B2 | 9/2013 | Jin | |
| 8,578,561 B2 | 11/2013 | Chuang | |
| 8,615,848 B2 | 12/2013 | Mitsui | |
| 8,624,844 B2 | 1/2014 | Behar et al. | |
| 8,638,546 B2 | 1/2014 | Hoshino | |
| 8,649,166 B2 | 2/2014 | Wu et al. | |
| 8,665,382 B1 | 3/2014 | Sugimoto et al. | |
| 8,687,354 B2 | 4/2014 | Uchiyama et al. | |
| 8,713,759 B2 | 5/2014 | Cai | |
| 8,776,319 B1 | 7/2014 | Chang et al. | |
| 8,780,570 B2 | 7/2014 | Bohn et al. | |
| 8,787,016 B2 | 7/2014 | Rothkopf et al. | |
| 8,804,324 B2 | 8/2014 | Bohn et al. | |
| 8,826,495 B2 | 9/2014 | Jauvtis et al. | |
| 8,833,554 B2 | 9/2014 | Busri | |
| 8,854,834 B2 | 10/2014 | O'Connor et al. | |
| 8,855,726 B2 | 10/2014 | Ozawa | |
| 8,875,349 B2 | 11/2014 | Hanigan | |
| 8,908,364 B2 | 12/2014 | Tseng et al. | |
| 8,908,365 B2 | 12/2014 | Walters et al. | |
| 8,923,934 B2 | 12/2014 | Chol et al. | |
| 8,938,856 B1 | 1/2015 | Shin et al. | |
| 8,959,714 B2 | 2/2015 | Hsu | |
| 8,971,029 B2 | 3/2015 | Wong et al. | |
| 8,978,206 B2 | 3/2015 | Hsu et al. | |
| 8,982,542 B2 | 3/2015 | Bohn | |
| 8,988,876 B2 | 3/2015 | Corbin | |
| 9,003,607 B1 * | 4/2015 | Hsu | F16H 21/44 16/366 |
| 9,009,919 B1 | 4/2015 | Chiang | |
| 9,013,867 B2 | 4/2015 | Becze | |
| 9,014,381 B2 | 4/2015 | Quan et al. | |
| 9,069,531 B2 | 6/2015 | Bohn et al. | |
| 9,103,147 B1 | 8/2015 | Chuang | |
| 9,104,381 B2 | 8/2015 | Kuramochi | |
| 9,122,455 B2 | 9/2015 | Meyers | |
| 9,185,815 B2 * | 11/2015 | Hsu | H05K 5/0226 |
| 9,201,464 B2 | 12/2015 | Uchiyama et al. | |
| 9,243,432 B2 | 1/2016 | Lee | |
| 9,290,976 B1 | 3/2016 | Horng | |
| 9,310,850 B2 | 4/2016 | Hsu | |
| 9,317,243 B2 | 4/2016 | Becze | |
| 9,348,450 B1 | 5/2016 | Kim | |
| 9,371,676 B2 | 6/2016 | Rittenhouse | |
| 9,411,365 B1 | 8/2016 | Tanner et al. | |
| 9,417,663 B2 | 8/2016 | Kinoshita et al. | |
| 9,430,000 B2 | 8/2016 | Hood, III et al. | |
| 9,500,013 B2 | 11/2016 | Senatori | |
| 9,507,388 B1 | 11/2016 | Hampton et al. | |
| 9,513,672 B2 | 12/2016 | Garelli et al. | |
| 9,523,226 B1 | 12/2016 | Lam et al. | |
| 9,524,000 B2 | 12/2016 | Hsu et al. | |
| 9,569,002 B2 | 2/2017 | Walker | |
| 9,600,036 B2 | 3/2017 | Uchiyama et al. | |
| 9,624,703 B1 | 4/2017 | Lin | |
| 9,625,947 B2 | 4/2017 | Lee et al. | |
| 9,625,953 B2 | 4/2017 | Bitz et al. | |
| 9,625,954 B2 | 4/2017 | Campbell et al. | |
| 9,684,343 B2 | 6/2017 | Tazbaz | |
| 9,714,533 B2 | 7/2017 | Kuramochi | |
| 10,227,808 B2 | 3/2019 | Kabir et al. | |
| 10,241,548 B2 | 3/2019 | Mark et al. | |
| 10,253,804 B2 | 4/2019 | Daniel et al. | |
| 2002/0147026 A1 | 10/2002 | Hsieh | |
| 2003/0179880 A1 | 9/2003 | Pan et al. | |
| 2004/0091101 A1 | 5/2004 | Park | |
| 2004/0212956 A1 | 10/2004 | Kuivas et al. | |
| 2004/0226138 A1 | 11/2004 | Harmon et al. | |
| 2004/0266239 A1 | 12/2004 | Kurokawa | |
| 2005/0018393 A1 | 1/2005 | Kuo | |
| 2005/0122671 A1 | 6/2005 | Homer | |
| 2005/0148375 A1 | 7/2005 | DeLine | |
| 2005/0155182 A1 | 7/2005 | Han et al. | |
| 2005/0239520 A1 | 10/2005 | Stefansen | |
| 2006/0005356 A1 | 1/2006 | Amano et al. | |
| 2006/0007648 A1 | 1/2006 | Wang | |
| 2006/0046792 A1 | 3/2006 | Hassemer et al. | |
| 2006/0059659 A1 | 3/2006 | Kim et al. | |
| 2006/0133052 A1 | 6/2006 | Harmon et al. | |
| 2006/0179612 A1 | 8/2006 | Oshima et al. | |
| 2007/0101541 A1 | 5/2007 | Yin et al. | |
| 2007/0117600 A1 | 5/2007 | Robertson et al. | |
| 2008/0112113 A1 | 5/2008 | Sawadski et al. | |
| 2008/0174089 A1 | 7/2008 | Ekberg | |
| 2008/0184530 A1 | 8/2008 | Chao | |

(56) References Cited

U.S. PATENT DOCUMENTS

| | | |
|---|---|---|
| 2008/0239672 A1 | 10/2008 | Ghoshal |
| 2008/0250604 A1 | 10/2008 | Chen et al. |
| 2009/0070961 A1 | 3/2009 | Chung et al. |
| 2009/0104949 A1 | 4/2009 | Sato et al. |
| 2009/0291719 A1 | 11/2009 | Christensen |
| 2010/0205777 A1 | 8/2010 | Kim |
| 2010/0207844 A1 | 8/2010 | Manning |
| 2010/0232100 A1 | 9/2010 | Fukuma et al. |
| 2010/0328250 A1 | 12/2010 | Gorsica et al. |
| 2011/0099756 A1 | 5/2011 | Chen |
| 2011/0115713 A1 | 5/2011 | Altman |
| 2011/0128216 A1 | 6/2011 | Renwick |
| 2011/0177850 A1 | 7/2011 | Griffin et al. |
| 2011/0205695 A1 | 8/2011 | Hassemer et al. |
| 2011/0292605 A1 | 12/2011 | Chen et al. |
| 2012/0002360 A1 | 1/2012 | Seo et al. |
| 2012/0037047 A1 | 2/2012 | Moldovan |
| 2012/0046076 A1 | 2/2012 | Masser et al. |
| 2012/0120618 A1 | 5/2012 | Bohn |
| 2012/0120627 A1 | 5/2012 | O'Connor et al. |
| 2012/0127471 A1 | 5/2012 | Urushidani |
| 2012/0137471 A1 | 6/2012 | Kujala |
| 2012/0162866 A1 | 6/2012 | Bohn et al. |
| 2012/0170243 A1 | 7/2012 | Griffin et al. |
| 2012/0206864 A1 | 8/2012 | Bohn et al. |
| 2012/0206893 A1 | 8/2012 | Bohn et al. |
| 2012/0257368 A1 | 10/2012 | Bohn et al. |
| 2012/0307472 A1 | 12/2012 | Bohn et al. |
| 2012/0314399 A1 | 12/2012 | Bohn |
| 2012/0314400 A1 | 12/2012 | Bohn et al. |
| 2013/0010405 A1 | 1/2013 | Rothkopf et al. |
| 2013/0016489 A1 | 1/2013 | Yeh et al. |
| 2013/0016492 A1 | 1/2013 | Wang et al. |
| 2013/0046492 A1 | 2/2013 | Westergaard |
| 2013/0111704 A1 | 5/2013 | Mitsui |
| 2013/0135809 A1 | 5/2013 | Uchiyama et al. |
| 2013/0139355 A1 | 6/2013 | Lee |
| 2013/0152342 A1 | 6/2013 | Ahn |
| 2013/0318746 A1 | 12/2013 | Kuramochi |
| 2013/0322004 A1 | 12/2013 | Park |
| 2013/0342094 A1 | 12/2013 | Walters et al. |
| 2014/0042293 A1 | 2/2014 | Mok et al. |
| 2014/0126133 A1 | 5/2014 | Griffin et al. |
| 2014/0129739 A1 | 5/2014 | King |
| 2014/0174227 A1 | 6/2014 | Hsu et al. |
| 2014/0185215 A1 | 7/2014 | Whitt et al. |
| 2014/0185220 A1 | 7/2014 | Whitt et al. |
| 2014/0196253 A1 | 7/2014 | Song et al. |
| 2014/0217875 A1 | 8/2014 | Park et al. |
| 2014/0246354 A1 | 9/2014 | Probst et al. |
| 2014/0265295 A1 | 9/2014 | Rhyner et al. |
| 2014/0287804 A1 | 9/2014 | Bohn et al. |
| 2014/0290008 A1 | 10/2014 | Hsu |
| 2014/0290009 A1 | 10/2014 | Kasai et al. |
| 2014/0293534 A1 | 10/2014 | Siddiqui |
| 2014/0360296 A1 | 12/2014 | Hsu |
| 2014/0362507 A1 | 12/2014 | Kinoshita et al. |
| 2014/0373338 A1 | 12/2014 | O'Connor et al. |
| 2015/0016040 A1 | 1/2015 | Hood, III et al. |
| 2015/0020351 A1 | 1/2015 | Lin |
| 2015/0092337 A1 | 4/2015 | Tan et al. |
| 2015/0153787 A1 | 6/2015 | Mok et al. |
| 2015/0154437 A1 | 6/2015 | Aoki et al. |
| 2015/0176317 A1 | 6/2015 | Lee |
| 2015/0184437 A1 | 7/2015 | Wikander et al. |
| 2015/0227175 A1 | 8/2015 | Motosugi |
| 2015/0241978 A1 | 8/2015 | Lombardi et al. |
| 2015/0267450 A1 | 9/2015 | Chiang |
| 2015/0277506 A1 | 10/2015 | Cheah et al. |
| 2015/0309539 A1 | 10/2015 | Kamphuis et al. |
| 2015/0345195 A1 | 12/2015 | Park |
| 2015/0361696 A1 | 12/2015 | Tazbaz |
| 2015/0362956 A1 | 12/2015 | Tazbaz |
| 2015/0362958 A1 | 12/2015 | Shang |
| 2016/0041589 A1 | 2/2016 | Tazbaz |
| 2016/0070310 A1 | 3/2016 | Holung et al. |
| 2016/0083988 A1 | 3/2016 | Hsu |
| 2016/0109908 A1 | 4/2016 | Siddiqui |
| 2016/0132075 A1 | 5/2016 | Tazbaz |
| 2016/0132076 A1 | 5/2016 | Bitz et al. |
| 2016/0147267 A1 | 5/2016 | Campbell et al. |
| 2016/0153222 A1 | 6/2016 | Hu |
| 2016/0187934 A1 | 6/2016 | Lee et al. |
| 2016/0187935 A1 | 6/2016 | Tazbaz et al. |
| 2016/0201367 A1 | 7/2016 | Kato |
| 2016/0215541 A1 | 7/2016 | Tazbaz et al. |
| 2016/0224072 A1 | 8/2016 | Huang et al. |
| 2016/0266615 A1 | 9/2016 | Uchiyama et al. |
| 2016/0299537 A1 | 10/2016 | Whitt et al. |
| 2016/0326786 A1 | 11/2016 | Lee |
| 2016/0357226 A1 | 12/2016 | Campbell et al. |
| 2017/0017273 A1 | 1/2017 | Weldon et al. |
| 2017/0090523 A1 | 3/2017 | Tazbaz et al. |
| 2017/0145724 A1 | 5/2017 | Siddiqui |
| 2017/0145725 A1 | 5/2017 | Siddiqui |
| 2018/0059735 A1 | 3/2018 | Tazbaz et al. |
| 2018/0066465 A1 | 3/2018 | Tazbaz et al. |
| 2018/0164855 A1 | 6/2018 | Tazbaz et al. |
| 2018/0166842 A1 | 6/2018 | Siddiqui |
| 2018/0209473 A1 | 7/2018 | Park et al. |
| 2018/0230724 A1 | 8/2018 | Lin et al. |
| 2018/0292860 A1 | 10/2018 | Siddiqui |
| 2018/0356858 A1 | 12/2018 | Siddiqui et al. |
| 2018/0363341 A1 | 12/2018 | Siddiqui et al. |
| 2019/0094917 A1 | 3/2019 | Schmelzle et al. |

FOREIGN PATENT DOCUMENTS

| | | |
|---|---|---|
| CN | 203376667 U | 1/2014 |
| CN | 104331124 A | 2/2015 |
| CN | 204610543 U | 9/2015 |
| EP | 0928092 A2 | 7/1999 |
| EP | 1422593 A1 | 5/2004 |
| EP | 2466420 A1 | 6/2012 |
| EP | 2528307 A1 | 11/2012 |
| EP | 2797296 A2 | 10/2014 |
| GB | 2008940 A | 6/1979 |
| JP | 2006112523 A | 4/2006 |
| WO | 2007/072124 A1 | 6/2007 |
| WO | 2010/076639 A2 | 7/2010 |
| WO | 2010/093139 A2 | 8/2010 |
| WO | 2015/073020 A1 | 5/2015 |
| WO | 2015/147885 A1 | 10/2015 |
| WO | 2015/179257 A1 | 11/2015 |
| WO | 2017087343 A1 | 5/2017 |

OTHER PUBLICATIONS

Final Office Action dated Nov. 2, 2017 from U.S. Appl. No. 14/947,994, 44 pages.

Written Opinion dated Aug. 24, 2017 from PCT Patent Application No. PCT/US2016/061942, 7 pages.

"360 deg Hinge Video," published Jul. 21, 2013, retrieved at <<httpos://www.youtube.com/watch?v=lhEczMi4nsw>> on Aug. 17, 2016, 1 page.

"Special Purpose Hinges (cont.)," published Jan. 4, 2007, retrieved at <<http://hingedummy.info/specialpurposepage2.htm>> on Aug. 17, 2016, 2 pages.

Smith, Dada, "Microsoft Helps HP Design New Convertible Spectre x360," published Mar. 3, 2015, retrieved at <<http://blog.partspeople.com/2015/03/03/microsoft-helps-hp-design-ne-convertible-spectre-x3601>>, 1 page.

Final Office Action dated Jun. 14, 2017 from U.S. Appl. No. 14/947,740, 25 pages.

Applicant-Initiated Interview Summary dated Aug. 8, 2017 from U.S. Appl. No. 14/947,740, 3 pages.

Response filed Aug. 9, 2017 to the Final Office Action dated Jun. 14, 2017 from U.S. Appl. No. 14/947,740, 9 pages.

Final Office Action dated Feb. 5, 2018 from U.S. Appl. No. 14/47,740, 54 pages.

(56) References Cited

OTHER PUBLICATIONS

International Preliminary Report on Patentability dated Jan. 23, 2018 from PCT Patent Application No. PCT/US2016/061940, 10 pages.
International Report on Patentability dated Jan. 18, 2018 from PCT Patent Application No. PCT/US2016/061942, 10 pages.
Non-Final Office Action dated Jun. 9, 2017 from U.S. Appl. No. 15/256,302, 17 pages.
"Acer Unveils Industry's First Convertible Chromebook with 13-inch Display," Aug. 31, 2016, retrieved at <<http://www.acer.com/ac/en/US/press/2016/202372>>, 2 pages.
"ASUS Transformer Book Flip TP200SA 360-Degree Convertible Laptop With Quad-core Processor", published Oct. 18, 2015, retrieved from << http://www.tipandtrick.net/asus-transformer-book-flip-tp200sa-360-degree-convertible-laptop-full-review/>> on Oct. 26, 2015, 3 pages.
Bestek® 10"-15" Laptop/Notebook Cooling Pad Six-level Changeable Stand with Dual 118mm Hydraulic Fan Dual USB 2.0 360 degree Rotatable Base BTCPZ4BL, published Nov. 20, 2014, retrieved from <<http://www.amazon.com/Notebook-Six-level-Changeable-Hydraulic-Rotatable/dp/B00L8IF6W0>> on Aug. 31, 2015, 5 pages.
Brown, Mlichael, "Dell targets younger audience with 360-degree laptops and thin, light All-in-One PCs", retrieved from <<http://www.pcworld.com/article/2304649/dell-targets-younger-audience-with-360-degree-laptops-and-thin-light-all-in-one-pcs.htm>>, published Jun. 2, 2014, 7 pages.
"Computex: Asus Transformer Book Flip series launched with 360 Degree Hinge", published Jun. 3, 2014, retrieved from <<http://tech.firstpost.com/news-analysis/computex-asus-transformer-book-flip-series-launched-with-360-degree-hinge-225064.html>> on Aug. 28, 2015, 4 pages.
Domingo, Joel Santo, "Laptop, Tablet or Both? How to Decide," retrieved from <<http://in.pcmag.com/laptops/64076/feature/laptop-tablet-or-both-how-to-decide>>, published May 1, 2014, 11 pages.
Hinckley et al., "Codex: A Dual Screen Tablet Computer", In Proceedings of the SIGCHI Conference on Human Factors in Computing Systems, Boston, MA, CHI 2009—New Mobile Interactions, Apr. 9, 2009, pp. 1933-1942, 10 pages.
"HP Spectre introduce hybrid x360 laptop, rotate 360 degrees, $900", published Apr. 25, 2015, retrieved from <<http://sharetech.biz/hp-spectre-introduce-hybrid-x360-laptop-rotate-360-%E2%80%8B%E2%80%8Bdegrees-900/>> on Oct. 26, 2015, 4 pages.
Kravitz, Noah, "Kyocera Echo Unboxing—Dual-Screen Android Phone (video)", published Apr. 13, 2011, retrieved from <<http://www.technobuffalo.com/videos/kyocera-echo-unboxing-dual-screen-android-phone-video/>> on Oct. 26, 2015, 7 pages.
Pradeep, "HP Announces New Pavilion x360 Convertible Laptop Inspired by Lenovo Yoga, Price Starts At $400", published Feb. 23, 2014, retrieved from <<http://microsoft-news.com/hp-announces-new-pavilion-x360-convertible-laptop-inspired-by-lenovo-yoga-price-starts-at-400/>> on Oct. 26, 2015, 9 pages.
Smith, Dada, "Lenovo's New Flex 3 Convertible Laptops Sport a 360 Degree Hinge", retrieved from <<http://blog.parts-people.com/2015/05/13/lenovos-new-flex-3-convertible-laptops-sport-a-360-degree-hinge/>>, published May 13, 2015, 2 pages.
Smith, Sherri L., "Toshiba Satellite Radius Folds into 5 Different Modes", published May 27, 2014, retrieved at <<http://blog.laptopmag.com/toshiba-satellite-radius-specs-price>> on Sep. 1, 2015, 4 pages.
Villa, Jason de, "iPad mini case review: The best generic case you can get right now", published Jan. 1, 2013, retrieved from <<http://technoodling.net/ipad-mini-case-review-the-best-generic-case-you-can-get-right-now/>> on Aug. 28, 2015, 12 pages.
Wang, Harry, "The 360 Degrees (and 25,000 Hinge Tests) of Yoga Design," Dec. 5, 2012, retrieved at <<http://blog.lenovo.com/en/blog/the-360-degrees-of-yoga-design>>, 14 pages.
"Double geared hinge", retrieved at <<http://www.wamungo.com/PrintModel/Detail/Double-geared-hinge-5305a74589702816c05d1ab5>>, on Mar. 10, 2017, 6 pages.

Martin, Harlan, "Geared Hinge", published on Jan. 27, 2015, retrieved at <<https://www.thingiverse.com/make:116451>> on Aug. 9, 2017, 1 page.
Non-Final Office Action dated Jul. 17, 2017 from U.S. Appl. No. 14/947,994, 23 pages.
International Search Report and Written Opinion dated Feb. 16, 2017 from PCT Patent Application No. PCT/US2016/061942, 12 pages.
Non-Final Office Action dated Feb. 9, 2017 from U.S. Appl. No. 14/947,740, 35 pages.
Response filed Apr. 13, 2017 to the Non-Final Office Action dated Feb. 9, 2017 from U.S. Appl. No. 14/947,740, 9 pages.
International Search Report and Written Opinion dated Feb. 20, 2017 from PCT Patent Application No. PCT/US2016/061940, 13 pages.
Non-Final Office Action dated Nov. 3, 2016 from U.S. Appl. No. 14/947,994, 25 pages.
Response filed Jan. 11, 2017 to the Non-Final Office Action dated Nov. 3, 2016 from U.S. Appl. No. 14/947,994, 12 pages.
Final Office Action dated Feb. 16, 2017 from U.S. Appl. No. 14/947,994, 13 pages.
Response filed Apr. 3, 2017 to the Final Office Action dated Feb. 16, 2017 from U.S. Appl. No. 14/947,994, 9 pages.
Applicant-Initiated Interview Summary dated Apr. 4, 2017 from U.S. Appl. No. 14/947,994, 3 pages.
Non-Final Office Action dated Aug. 28, 2017 from U.S. Appl. No. 14/947,740, 21 pages.
Article 34 Amendment and Chapter II Demand filed Jun. 19, 2017 from PCT Patent Application No. PCT/US2016/061940, 21 pages.
Article 34 Amendment and Chapter II Demand filed May 19, 2017 from PCT Patent Application No. PCT/US2016/061942, 14 pages.
"International Search Report & Written Opinion Issued in PCT Application No. PCT/US2018/013036", dated Apr. 6, 2018, 11 Pages.
"Moving Point Hinge-Multi Pivot Hinge", Retrieved from http://websystem.gismo.se/Gismo/files/1029/2.mph%2001%20introduktion.pdf, Retrieved on Oct. 9, 2014, 6 Pages.
"Non Final Office Action Issued in U.S. Appl. No. 14/555,184", dated Apr. 12, 2016, 32 Pages.
"Non Final Office Action Issued in U.S. Appl. No. 14/947,994", dated Apr. 5, 2018, 28 Pages.
"Non Final Office Action issued in U.S. Appl. No. 15/239,417", dated May 25, 2017, 71 Pages.
"Non Final Office Action issued in U.S. Appl. No. 15/256,302", dated May 1, 2018, 9 Pages.
"Non Final Office Action Issued in U.S. Appl. No. 15/374,594", dated Sep. 19, 2017, 11 Pages.
"Final Office Action Issued in U.S. Appl. No. 15/414,432", dated May 17, 2018, 9 Pages.
"Non Final Office Action issued in U.S. Appl. No. 15/414,432", dated Nov. 29, 2017, 10 Pages.
Elliot, Amy-Mae, "9 Nifty Laptop Feet to Keep Your PC Running Cool", Retrieved from https://mashable.com/2012/07/30/laptop-feet/#norOLvMOFaqy, Jul. 30, 2012, 26 Pages.
"International Preliminary Report on Patentability Issued in PCT Application No. PCT/US2015/060959", dated Mar. 3, 2017, 7 Pages.
"International Search Report and Written Opinion Issued in PCT Application No. PCT/US2015/060959", dated Jan. 25, 2016, 11 Pages.
"Second Written Opinion Issued in PCT Application No. PCT/US2015/060959", dated Oct. 10, 2016, 7 Pages.
"International Search Report and Written Opinion issued in PCT Application No. PCT/US2017/013591", dated Apr. 21, 2017, 11 Pages.
"International Search Report and Written Opinion Issued in PCT Application No. PCT/US2017/013687", dated Apr. 21, 2017, 12 Pages.
"Non Final Office Action Issued in U.S. Appl. No. 15/255,056", dated Sep. 28, 2018, 11 Pages.
"International Search Report and Written Opinion Issued in PCT Application No. PCT/US18/034245", dated Aug. 13, 2018, 14 pages.

(56) References Cited

OTHER PUBLICATIONS

"Final Office Action Issued in U.S. Appl. No. 15/256,302", dated Oct. 17, 2018, 12 Pages.
"International Search Report & Written Opinion Issued in PCT Application No. PCT/US18/034011", dated Nov. 16, 2018, 13 Pages.
"Final Office Action Issued in U.S. Appl. No. 15/255,056", dated Apr. 11, 2019, 6 Pages.
"Non Final Office Action Issued in U.S. Appl. No. 15/373,966", dated May 15, 2019, 7 Pages.

* cited by examiner

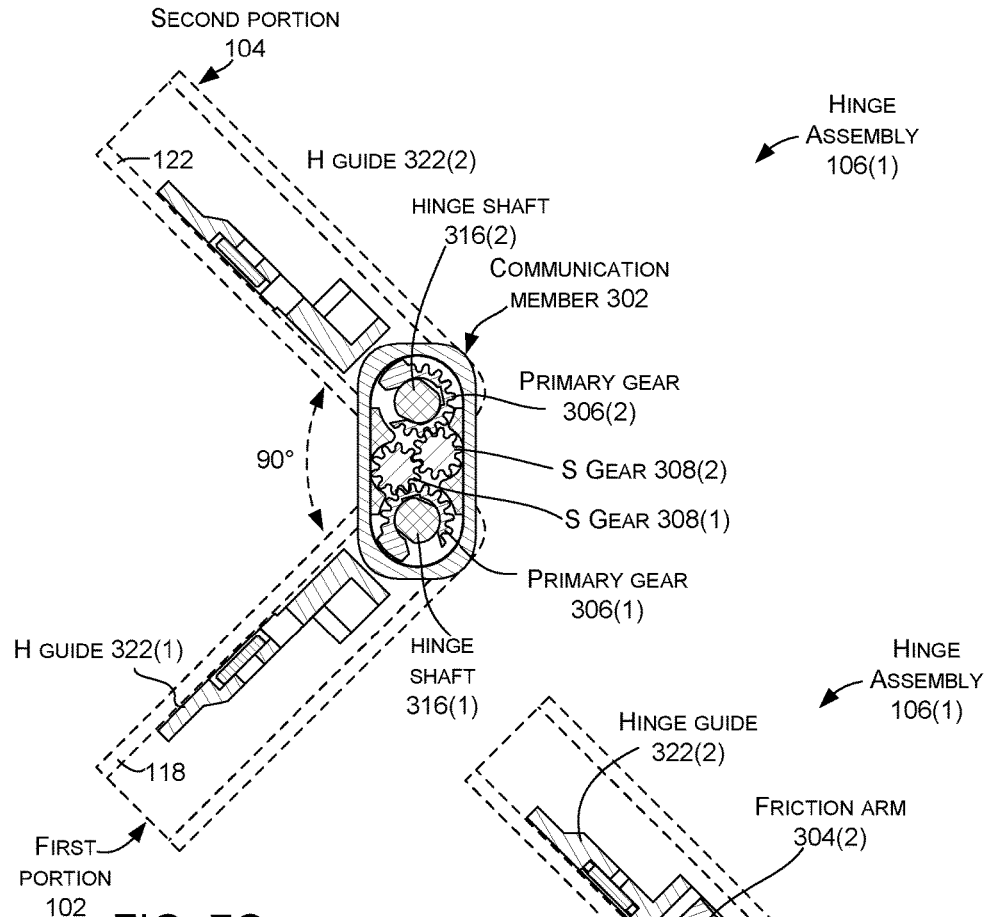
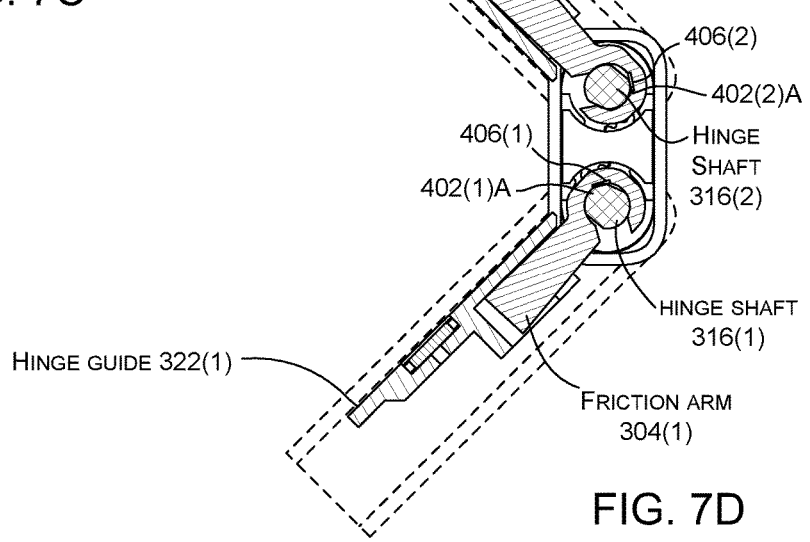

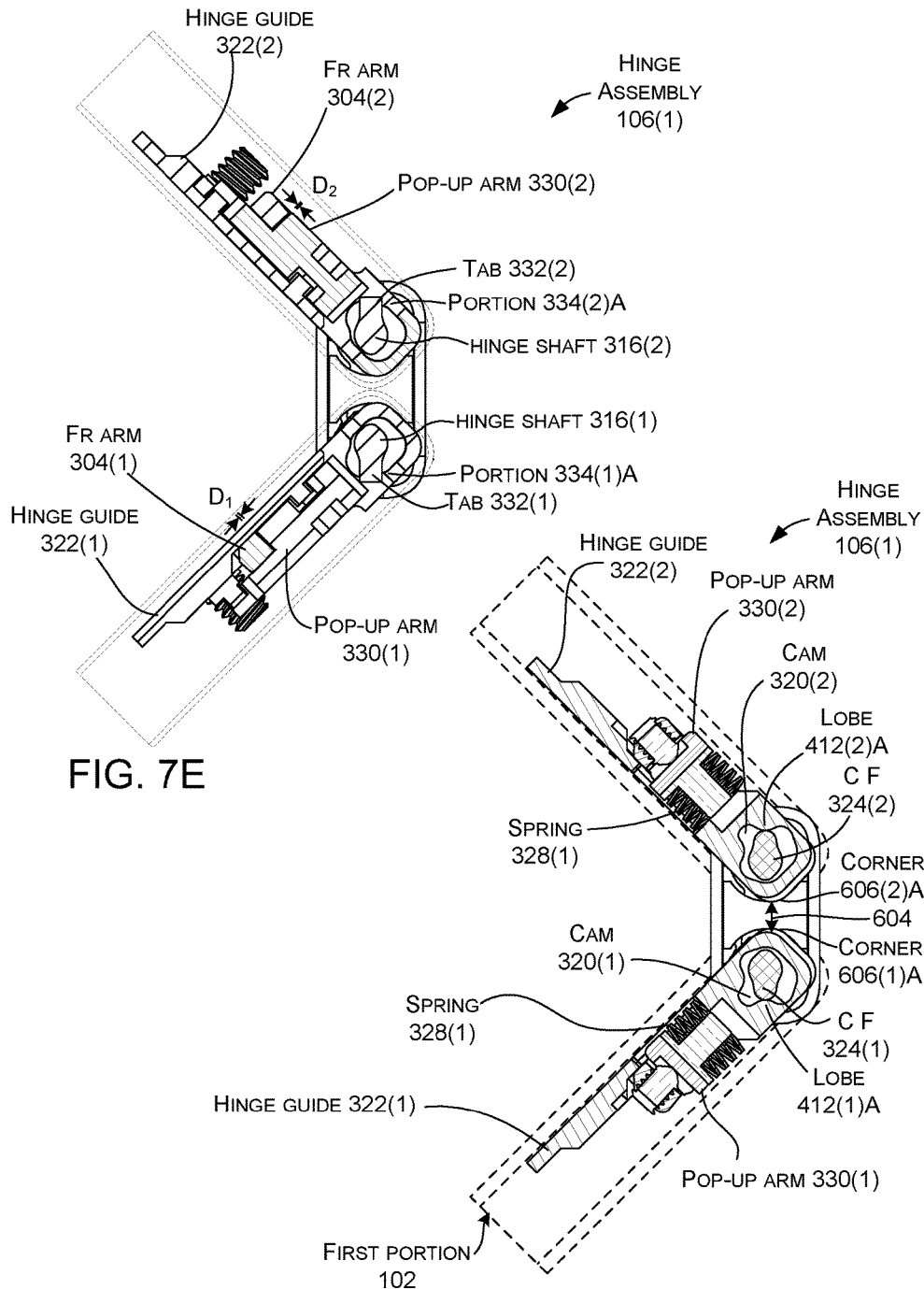

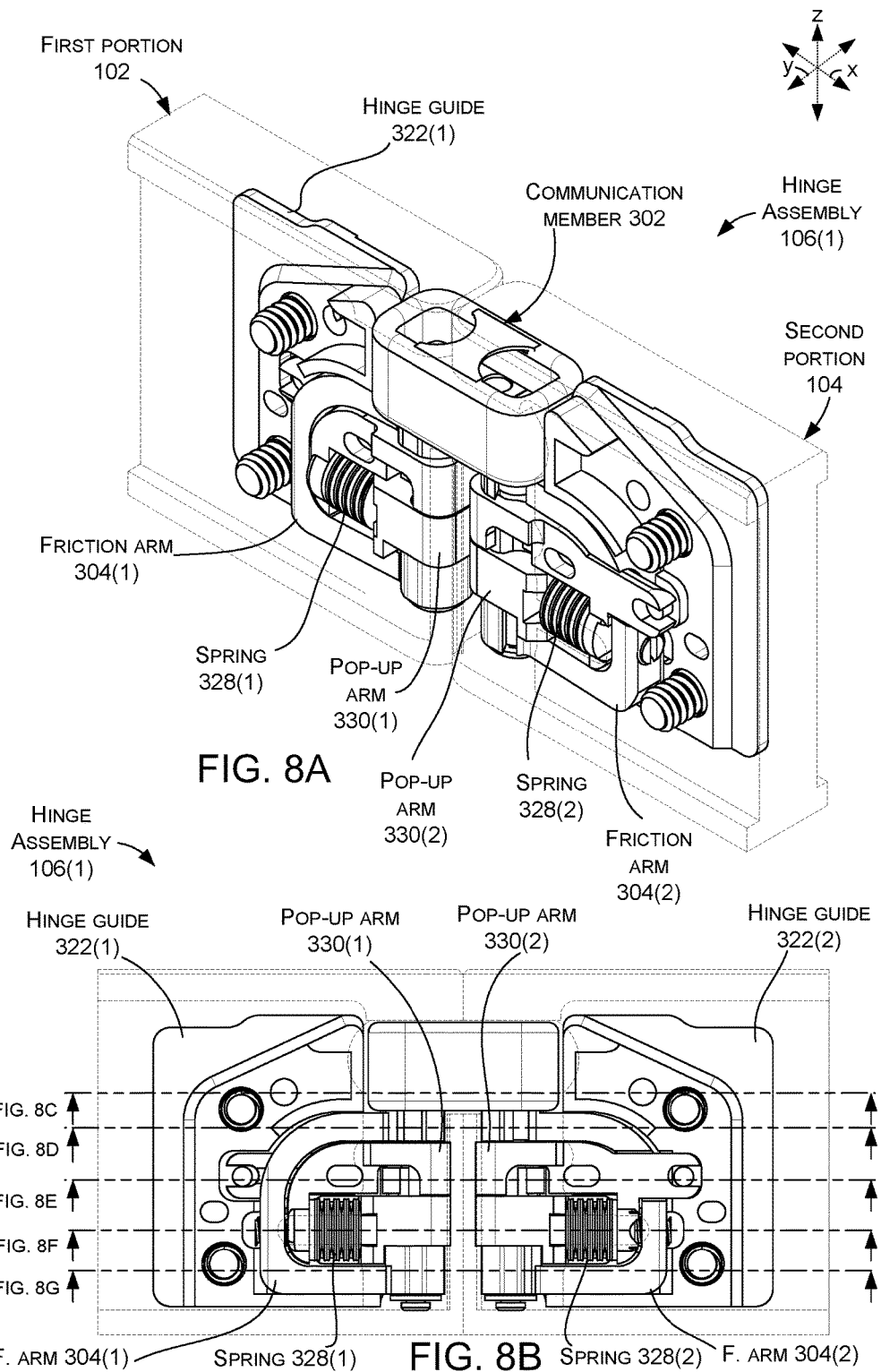

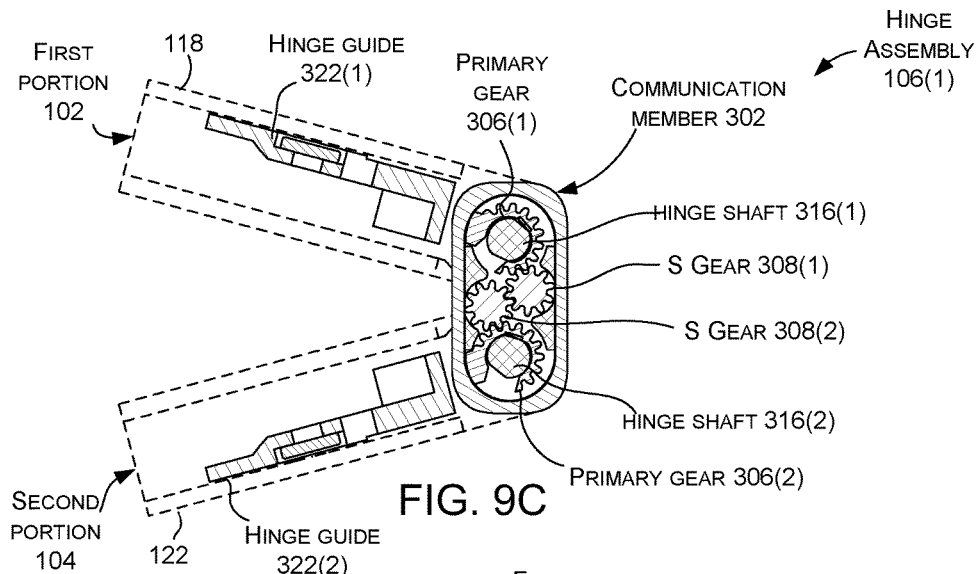
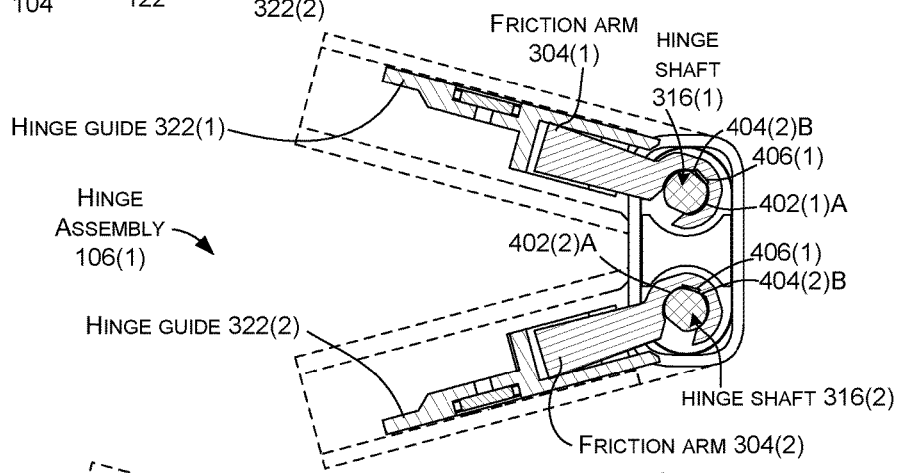
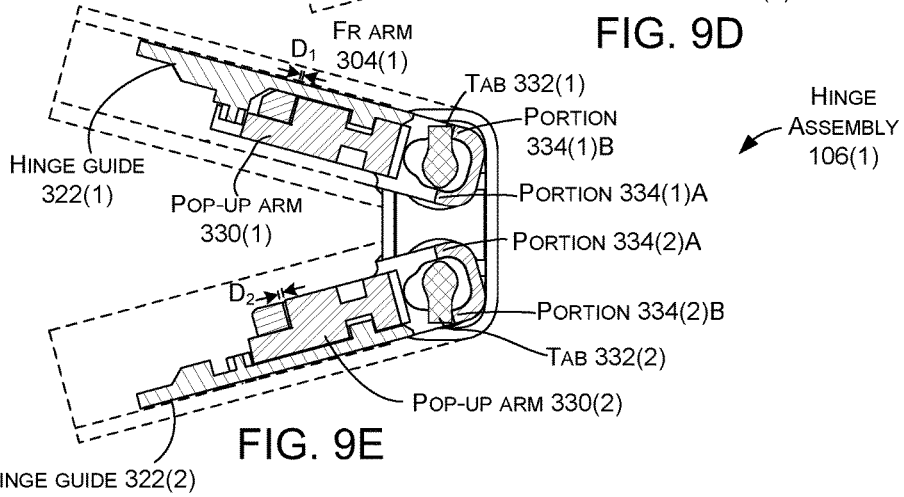

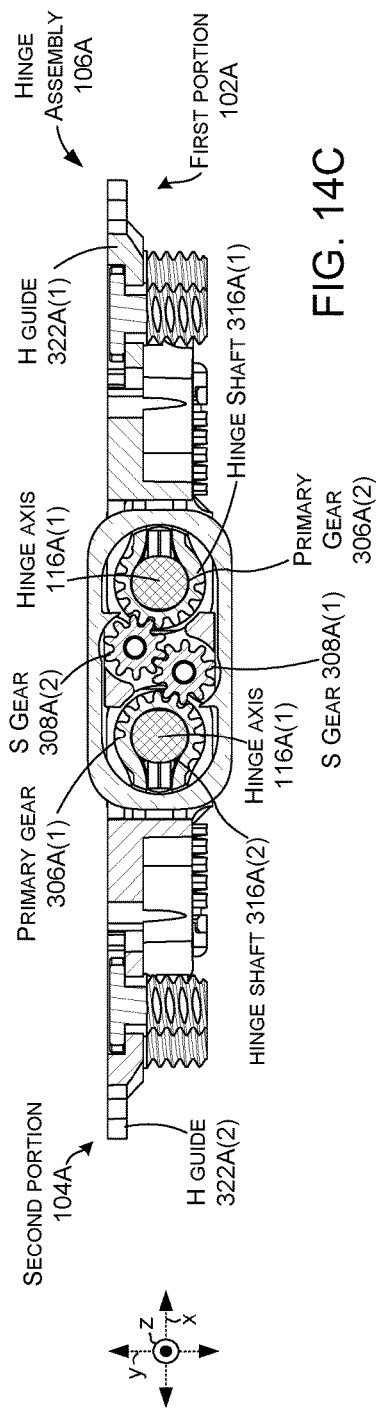
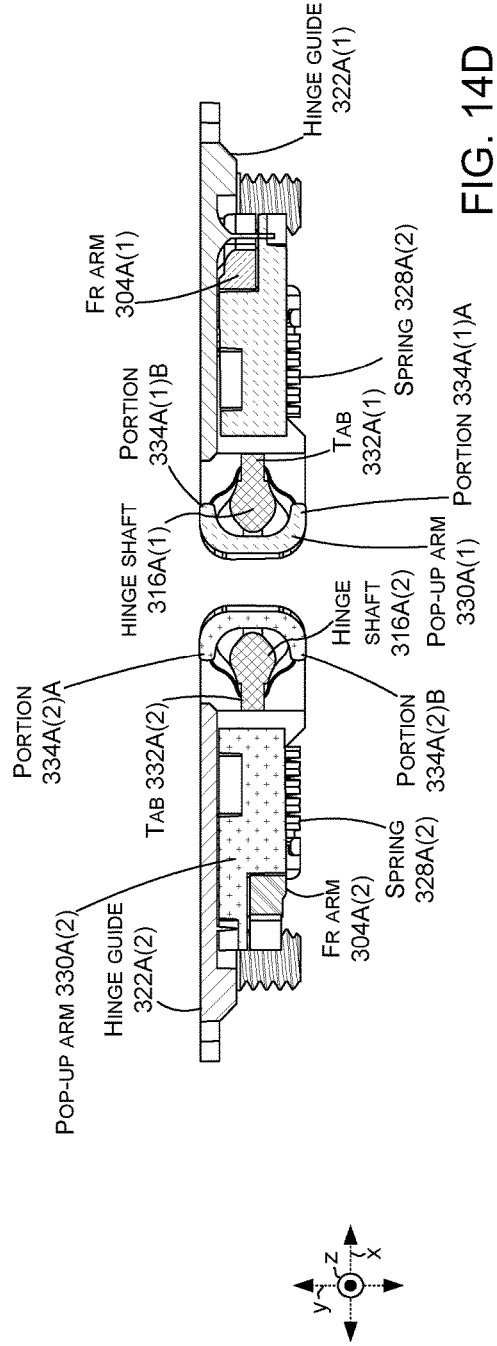
FIG. 14C
FIG. 14D

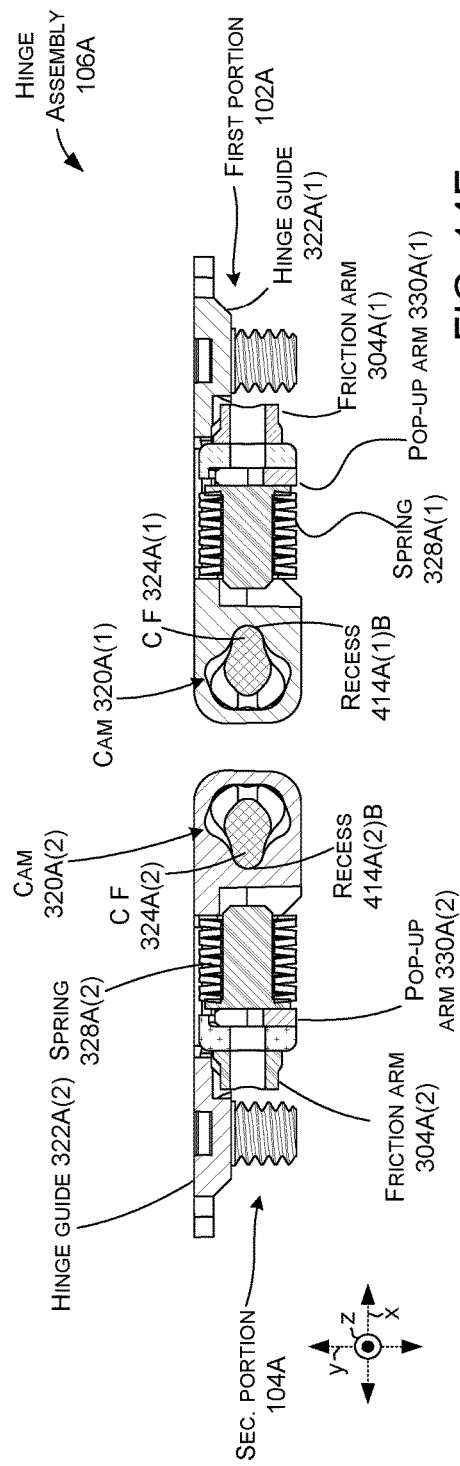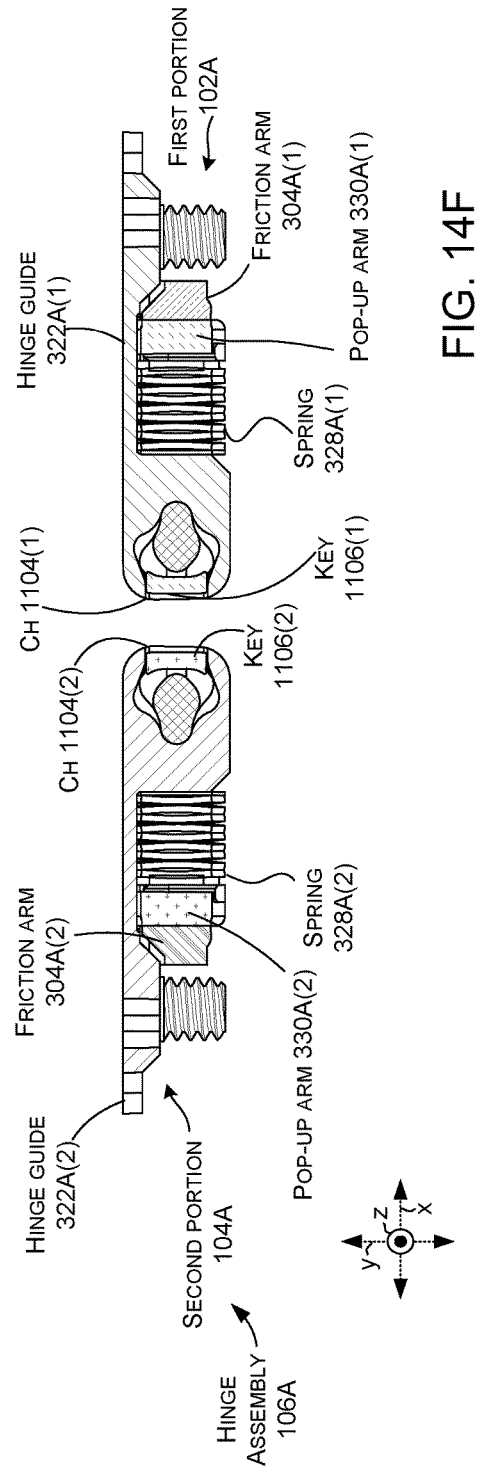
FIG. 14E
FIG. 14F

HINGED DEVICE

PRIORITY

This patent is a utility application that claims priority from U.S. Provisional Application 62/521,245 filed Jun. 16, 2017, which is incorporated by reference in its entirety.

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the FIG. and associated discussion where the reference number is first introduced. Where space permits, elements and their associated reference numbers are both shown on the drawing page for the reader's convenience. Otherwise, only the reference numbers are shown.

FIGS. 1, 2A-2D, 4A, 5A, 6A, 7A, 8A, 9A, 10A, 12A, 13A, and 14A show perspective views of example devices in accordance with some implementations of the present concepts.

FIGS. 4B, 5B, 6B, 7B, 8B, 9B, 10B, 12B, 13B, and 14B show elevational views of example devices in accordance with some implementations of the present concepts.

FIGS. 4C-4G, 5C-5G, 6C-6G, 7C-7G, 8C-8G, 9C-9G, 10C-10G, 12C-12F, 13C-13F, 14C-14F show sectional views of example devices in accordance with some implementations of the present concepts.

DESCRIPTION

The present concepts relate to devices, such as computing devices employing hinge assemblies that can rotationally secure first and second device portions relative to a hinge axis, such as a first hinge axis that relates to the first portion and a second hinge axis that relates to the second portion. Some of the present hinge assemblies can be viewed as including a 'pop-up' feature in that the hinge assembly can automatically open the hinge from a closed position when activated by a user. Alternatively or additionally, some of the present hinge assemblies can offer motion control features that facilitate specific hinge movements while inhibiting other hinge movements to provide efficient hinge assembly function.

Figure 1:
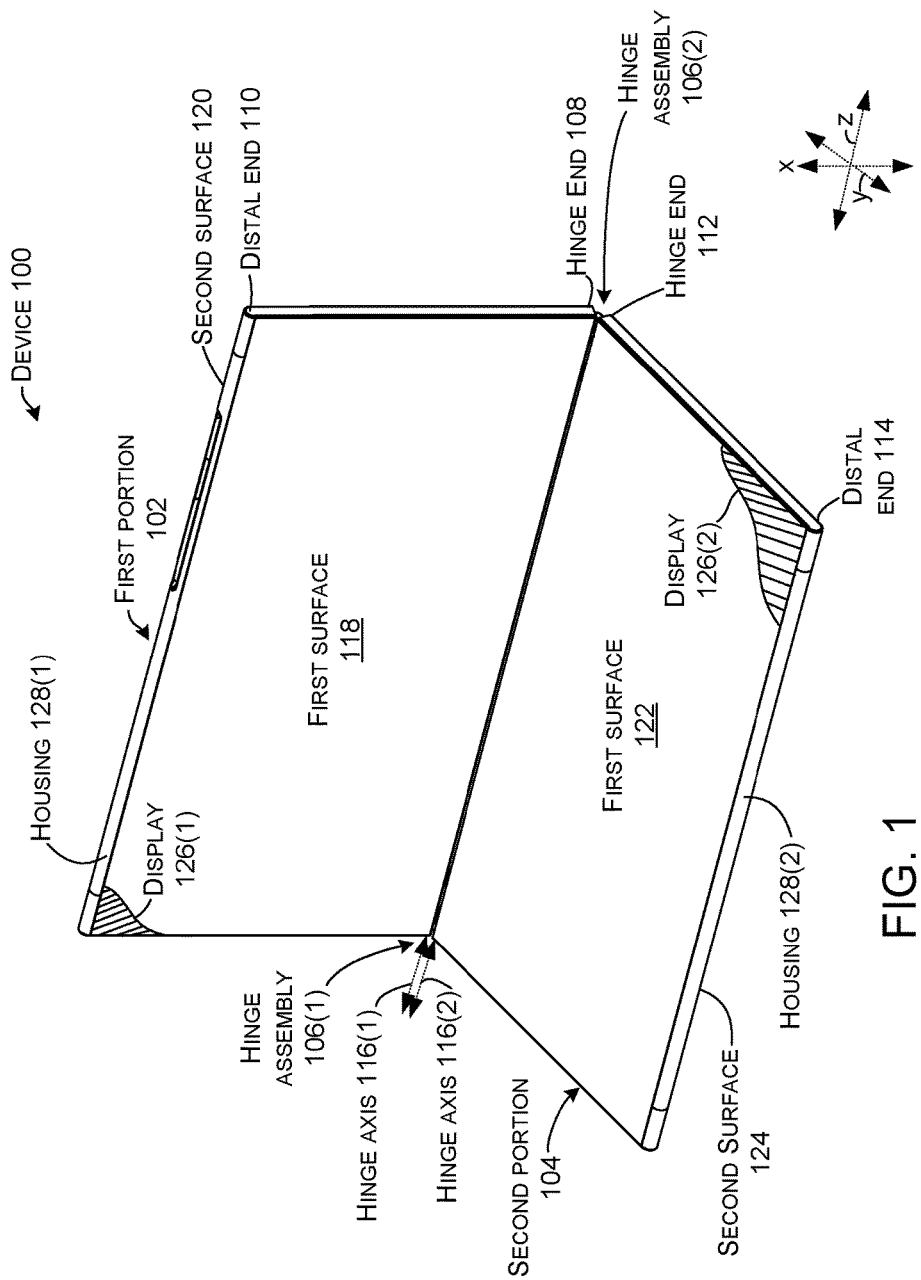

Introductory FIG. 1 shows an example device 100 that has first and second portions 102 and 104 that are rotatably secured together by hinge assemblies (e.g., hinge assemblies) 106. In the illustrated implementation, two hinge assemblies 106(1) and 106(2) are employed, but other implementations could employ a single hinge assembly or more than two hinge assemblies.

The first portion 102 can extend from a hinge end 108 to a distal end 110. The second portion 104 also can extend from a hinge end 112 to a distal end 114. The hinge assembly 106 can define two hinge axes 116. The first portion 102 can rotate around first hinge axis 116(1) and the second portion 104 can rotate around second hinge axis 116(2). The first portion 102 can include opposing first and second major surfaces 118 and 120 (hereinafter, first and second surfaces). Similarly, the second portion 104 can include opposing first and second major surfaces 122 and 124 (hereinafter, first and second surfaces). (Note the second surfaces 120 and 124 are facing away from the viewer and as such are not directly visible in this view, but are shown and designated in subsequent FIGS.).

In some implementations, displays 126 are supported by housing 128. In some implementations the displays can be positioned on the first and/or second surfaces 118, 120, 122, and/or 124, respectively. In the illustrated configuration, the displays 126 are positioned on first surfaces 118 and 122, respectively.

Figure 2A:
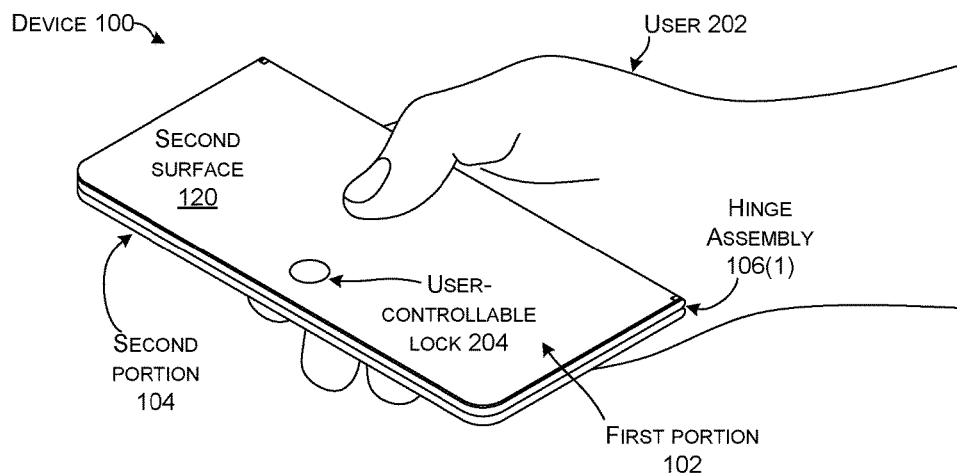

FIGS. 2A-2D collectively show a use case scenario of device 100. FIG. 2A starts with device 100 in the closed orientation where the first and second portions 102 and 104 are positioned parallel to and against one another and are rotatably secured by hinge assemblies 106. In this case, the second surfaces are facing outwardly with the first portion's second surface 120 facing the reader and the second portion's second surface 124 facing the user's palm. The first surfaces are facing inwardly and first surface 122 is visible to the reader in FIG. 2C. The closed orientation can be very compact and easy for the user 202 to transport. For instance, the device may fit in the user's pocket. Further, the first surfaces can be protected in this closed orientation by the second surfaces.

In this implementation, device 100 can also feature a user-controllable lock 204. The user-controllable lock 204 can function to maintain the first and second portions 102 and 104 in the closed orientation unless released by the user 202. In this implementation, the hinge assemblies 106 also include a pop-up feature that biases the first and second portions 102 and 104 away from each other from the closed orientation.

Figure 2B:
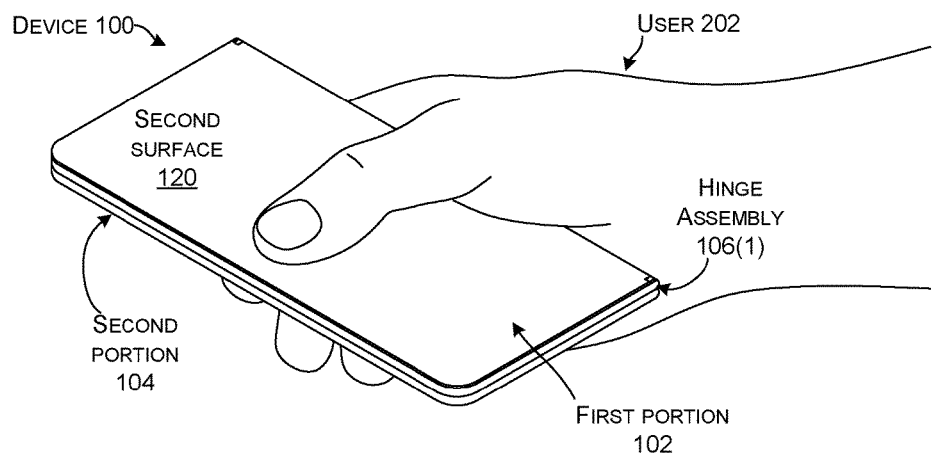

Assume at this point the user 202 wants to open the device 100. For instance, the user may want to be able to view displays (126, FIG. 1). As shown in FIG. 2B, to open the device the user 202 can simply engage the user-controllable lock 204. In this implementation, the user can engage the user-controllable lock with a single digit (in the illustration his/her thumb) to activate the user-controllable lock and release the first and second portions 102 and 104.

Figure 2C:
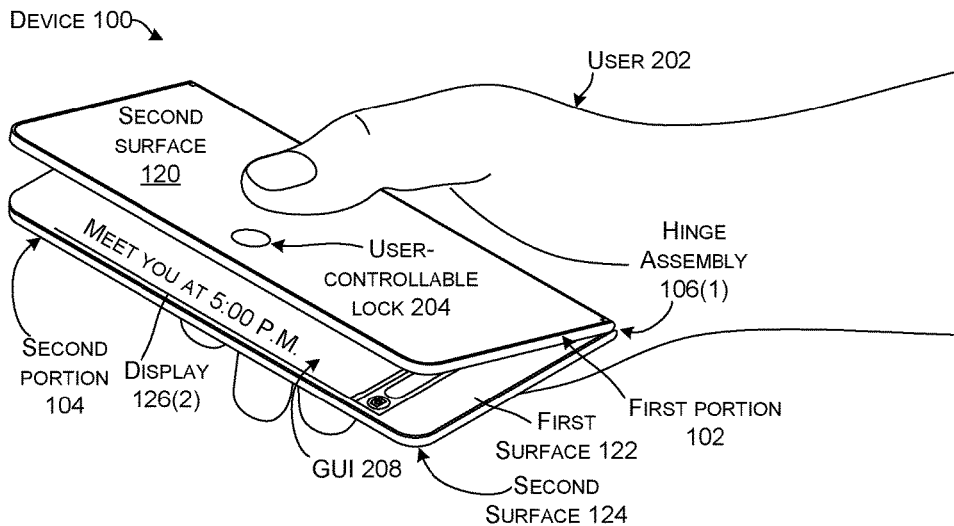

As shown in FIG. 2C, responsive to the user 202 releasing the user-controllable lock 204, the device 100 can automatically open the first and second portions 102 and 104 a few degrees without further user effort. In this case, the hinge assemblies 106 provide a force that biases the first and second portions apart from the closed orientation unless the user-controllable lock maintains the closed orientation. This bias can be viewed as a 'pop-up' feature. Further, once the device is popped-up, the device can maintain the orientation without user intervention (e.g., the user doesn't have to hold the device open).

Figure 2D:
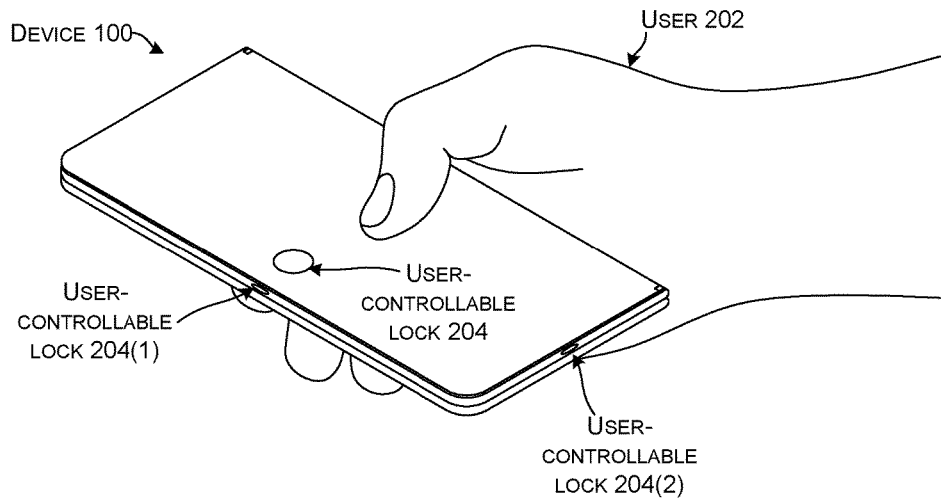

The pop-up feature can allow the user 202 to easily manually open the display 126 further if desired, and/or the user can view some or all of the displays at this point. For instance, in this example a graphical user interface (GUI) 208 shows that the user has a new text message on display 126(2) that says, "Meet you at 5:00 P.M." The user can easily view the text without further manipulation of the device portions. If the user wants to text back or perform other actions, the user can easily open the device further with one hand. In this case, assume the user is done, and can close the device 100 simply by pressing down with his/her thumb until the device is closed, and the user-controllable lock 204 re-engages as shown in FIG. 2D. Note that in this implementation, the device sensed that only a portion of the displays were visible in the pop-up orientation of FIG. 2C, and so the device customized the GUI for this orientation. A different GUI may be generated if the user opens the device to a different orientation.

Note that the illustrated implementation employs the user-controllable lock 204 on the second surface 120. FIG. 2D shows two alternative user-controllable lock locations on the side of the device 100 as indicated at 204(1) and 204(2). The side locations can allow a single user-controllable lock to be accessed in both the zero-degree orientation and the 360-degree orientation.

FIGS. 3-10G collectively show another example hinge assembly 106(1).

Figure 3:
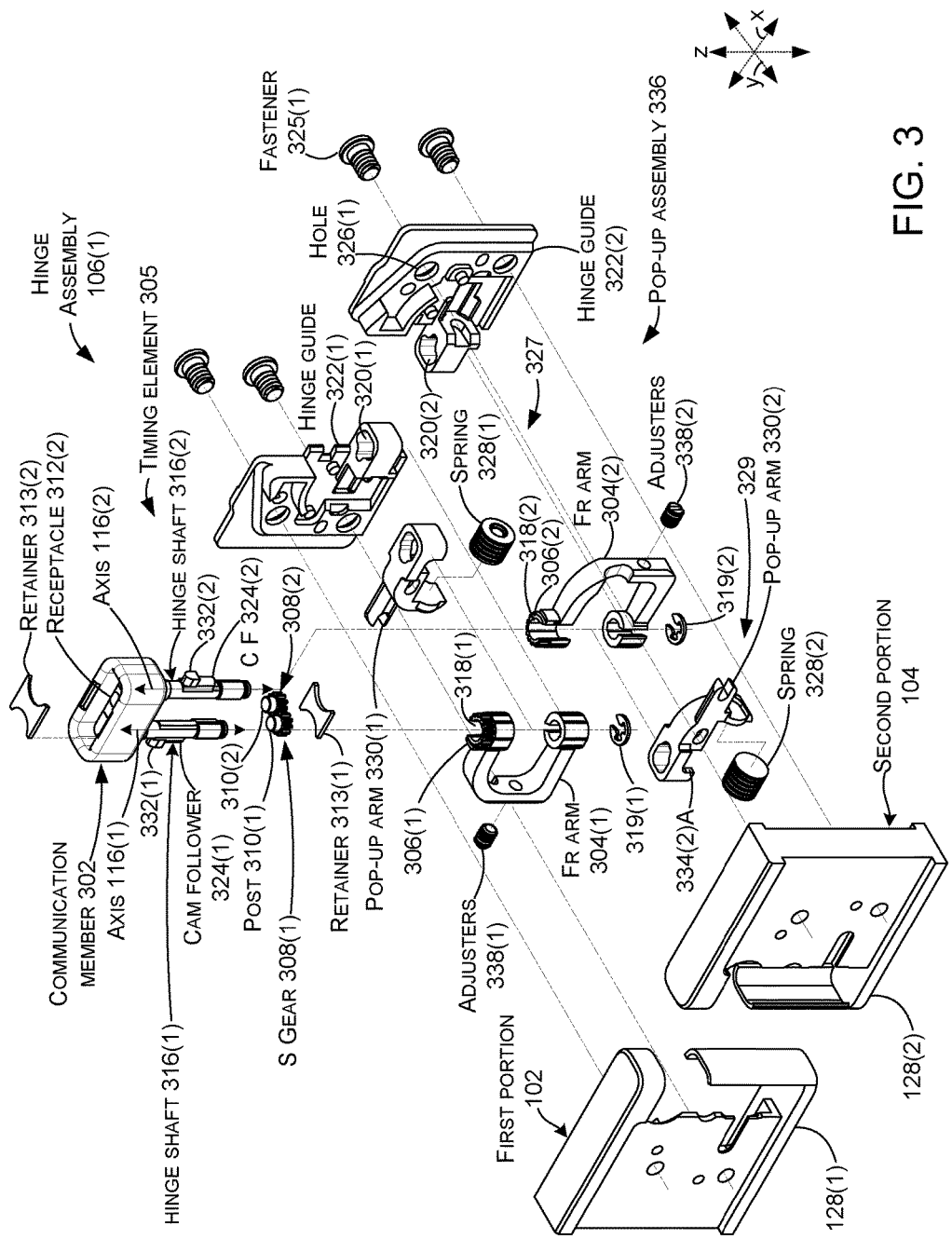
FIGS. 3 and 11 show exploded perspective views of example devices in accordance with some implementations of the present concepts.

FIG. 3 is an exploded view in the 180-degree orientation that shows details of example hinge assembly 106(1). The hinge assembly 106(1) can include a communication member 302 and first and second friction arms 304(1) and 304(2). The hinge assembly 106(1) can include a timing element 305 that synchronizes rotation (e.g., extent of rotation) of the first and second portions 102 and 104 around the first and second hinge axes 116. For instance, the timing element 305 can ensure that 20 degrees of rotation around the first hinge axis simultaneously produces 20 degrees of rotation around the second hinge axis.

In the illustrated implementation, the timing element 305 can be manifest as gears. For instance, the friction arms 304 can define primary gears 306 that can interact with intervening or secondary gears 308. The secondary gears 308 are rotatably secured to communication member 302 by parallel hinge posts 310 that engage receptacles 312 in the communication member. (Only receptacle 312(2) is visible in FIG. 3). The secondary gears 308 can be retained in the communication member 302 by retainer 313(1). Thus, the retainer 313(1) operating in cooperation with the communication member 302 can secure the secondary gears 308 in engaging relation with one another and with the primary gears 306.

The communication member 302 can also be shaped to receive a conductor, such as a flexible printed circuit (FPC) that can be maintained in the communication member by retainer 313(2). The conductor can connect displays 126 and/or other electronic components on the first portion 102 with displays and/or other electronic components on the second portion 104.

The communication member 302 can include hinge shafts 316 that pass through the primary gears 306 and apertures 318 at first and second ends of the first and second friction arms 304. The hinge shafts can be retained in the friction arms 304 by retainers 319. In some implementations, the apertures 318 can be sized so that the friction arms 304 act as friction cylinders for the hinge shafts 316 (e.g., provide a degree of frictional resistance that can hold the first and second portions 102 and 104 in an existing orientation unless acted upon by the user 202). (As will be described below relative to FIGS. 4A-10G, in this implementation the hinge shafts provide variable friction during rotation (e.g., the friction during a first range of rotation around the hinge axes 116 can be different than during a second range of rotation)).

Multi-lobe cams 320 can be defined by and/or fixedly arranged relative to the first and second portions 102 and 104. In the illustrated implementation, hinge guides 322 are secured in fixed relation to the first and second portions 102 and 104. The multi-lobe cams 320 can be defined by the hinge guides 322. In this case, the multi-lobe cams are formed in the hinge guides (e.g., the multi-lobe cams can be manifest as cavities) and are aligned with hinge axes 116. In some implementations, the hinge shafts 316 include cam followers 324 that extend orthogonally to the hinge axes. The hinge shafts 316 are received in the cavity of the multi-lobe cams so that the cam followers 324 engage the multi-lobe cams 320 (illustrated and described relative to FIGS. 4F-10F).

In the illustrated implementation, the hinge guides 322 can be fixed to the first and second portions 102 and 104, such as by fasteners 325 through holes 326 (not all of which are designated with specificity) into housing 128.

Force generating elements 327, such as springs 328, can be positioned relative to the hinge guides 322 and force transferring elements 329, such as pop-up arms 330. The pop-up arms 330 can be positioned over the hinge shafts 316. Tabs 332 on the hinge shafts 316 can engage portions 334 (not all of which are designated with specificity) of the pop-up arms 330 in specific orientations to bias the first and second portions 102 and 104 apart from one another (e.g., provide a pop-up action). At other orientations, the tabs 332 do not engage the pop-up arms 330. Stated another way, for a range of rotation (such as 31-330 degrees), the pop-up arms 330 can transfer spring force to a first element, such as the friction arms 304. However, at another range of rotation (such as 0-30 degrees and 330-360 degrees), when the tabs 332 contact the pop-up arms, the pop-up arms can uncouple the spring force from the friction arms. Thus, the present implementations can leverage a single spring 328 per hinge guide 322.

The spring 328 can alternatively provide spring force to another element. For instance, the spring force can bias the cam 320 and cam follower 324 against one another and then bias the first and second portions away from one another. The springs 328, pop-up arms 330, tabs 332, and/or hinge guides 322 can provide an example of a pop-up assembly 336 that can bias the first and second portions 102 and 104 away from each other from a first orientation, such as zero degrees to a second orientation, such as 30-degrees (and/or from 360 to 330, among others). (Other rotation ranges that are less than or more than 30 degrees are contemplated.) This aspect is discussed in more detail below relative to FIGS. 4A-10G. Other structural implementations of pop-up assemblies 336 are contemplated.

Note also that in the illustrated implementation, the friction arms 304 are u-shaped (extend from a first end to a second end along either a curvilinear u-shape or with straight side elements extending away from the hinge shaft 316 and are connected by a straight element that is perpendicular to the side elements and parallel to the hinge shaft). In this case, the first end and the second end define the apertures 318 through which the hinge shafts pass. The u-shaped configuration can allow the springs 328 and the pop-up arms 330 to be nested within the friction arms. This configuration facilitates the use of a single spring acting on a hinge axis 116 of a hinge assembly 106 to, at different orientations, apply spring force to bias the first and second portions 102 and 104 apart or apply spring force to create resistance to rotation of the first and second portions.

Adjusters 338 can operate on the springs 328 to adjust the spring force imparted by the springs 328 between the hinge guides 322 and friction arms 304. In this case, the adjusters can be manifest as threaded screws that pass through the friction arms 304 to contact the springs 328.

Figure 4A:
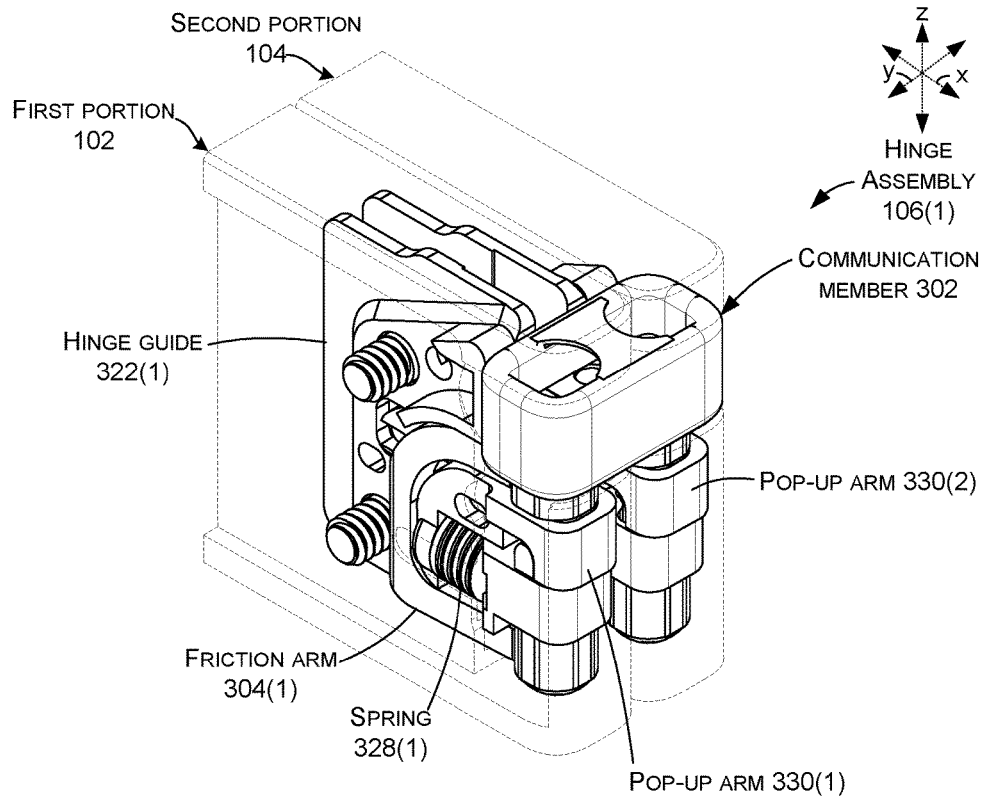
Figure 4B:
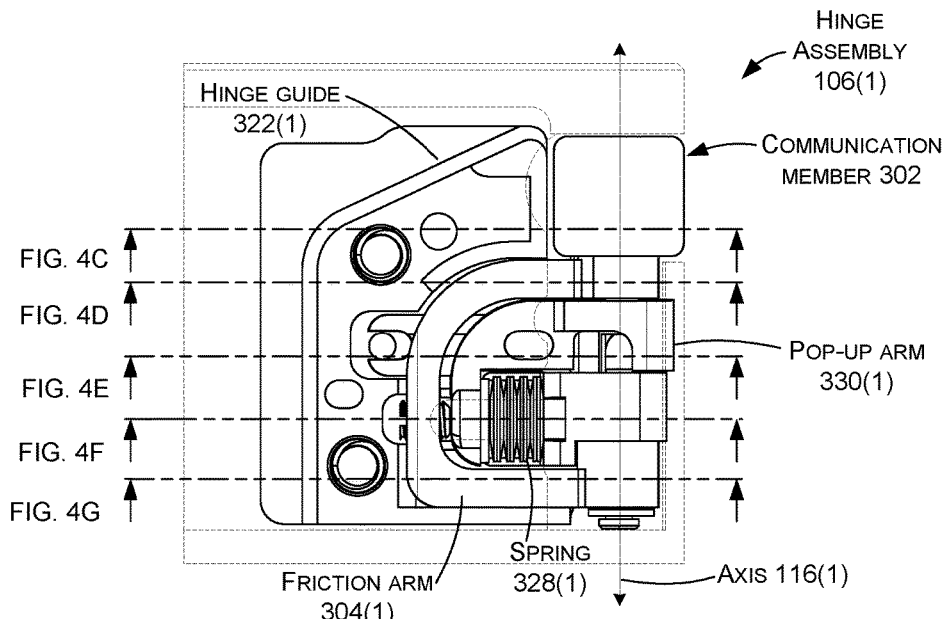

FIGS. 4A-10G collectively show features of the hinge assembly 106(1). FIGS. 4A-4G show the first and second portions 102 and 104 (e.g., the hinge guides 322(1) and 322(2)) parallel to one another at a zero-degree orientation similar to FIG. 2A with the first surfaces 118 and 122 facing inwardly and the second surfaces 120 and 124 facing outwardly. FIG. 4A is a perspective view, FIG. 4B is an elevational view (e.g., parallel to the hinge axes 116), and FIGS. 4C-4G are sectional views as indicated in FIG. 4B. FIGS. 5A-5G are similar views to FIGS. 4A-4G at a 15-degree orientation rather than a zero-degree orientation. FIGS. 6A-6G show a 30-degree orientation. Similarly, FIGS. 7A-7G are similar views at 90 degrees, and FIGS. 8A-8G are 180-degree (e.g. parallel) orientations. FIGS. 9A-9G are similar views at 330-degree orientations, and FIGS. 10A-10G show 360-degree orientations (e.g., parallel to and positioned over one another, but in this case, opposite surfaces are facing one another when compared to FIGS. 4A-4G). Note that while the drawings are organized by orientation, it may be helpful for the reader to also compare specific cross-sections at multiple orientations. For instance, the function of the elements shown in FIG. 4D may be understood by reviewing FIG. 4D in combination with FIGS. 5D, 6D, 7D, 8D, 9D, and/or 10D.

Figure 4C:
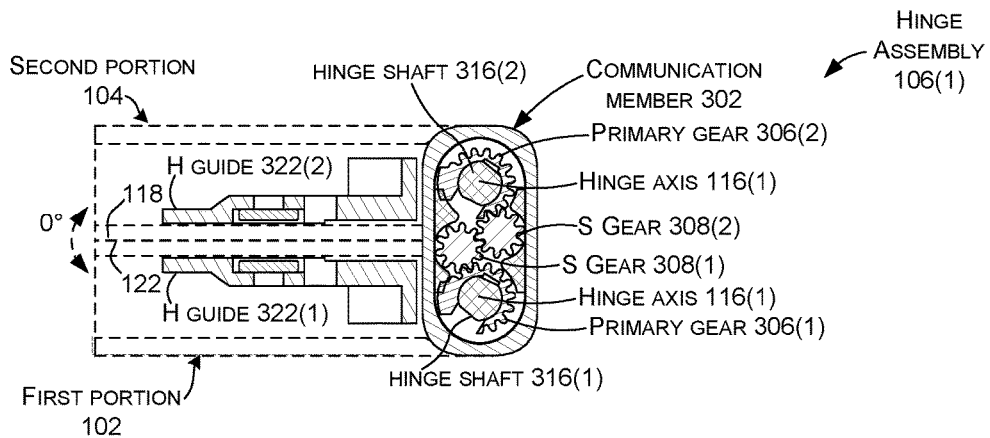

Looking at FIG. 4C, the primary gears 306 are positioned around the hinge shafts 316 and interact with the secondary gears 308. The secondary gears 308 interact with one another and with the primary gears so that rotation of either the first or second portions 102 and 104 around hinge axes 116 results in an equal rotation of the other of the first and second portions.

Figure 4D:
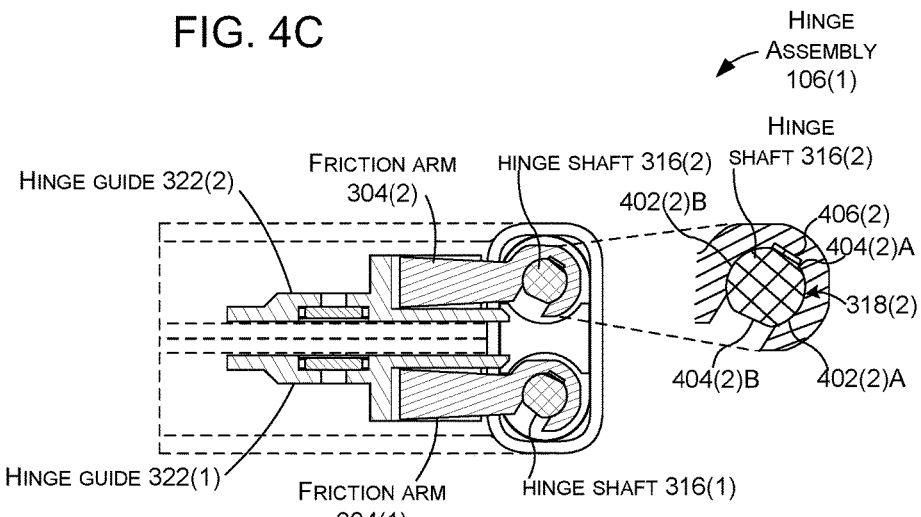

FIG. 4D shows how hinge shafts 316 can create varied friction during rotation through different orientations. An enlarged view of hinge shaft 316(2) and friction arm 304(2) is included to help visualize some of the described features. In this case, a portion of hinge shafts 316 are non-circular. Specifically, the hinge shafts include two radiused regions 402 interposed between two flat regions 404. Further, aperture 318(2) in friction arm 304(2) can be partially defined by a friction structure 406(2). In this zero-degree orientation, flat region 404(2)A is aligned with the friction structure 406(2). Since the flat region 404(2)A does not contact the friction structure 406(2), reduced or no friction occurs between the hinge shaft and the friction arm.

Figure 4E:
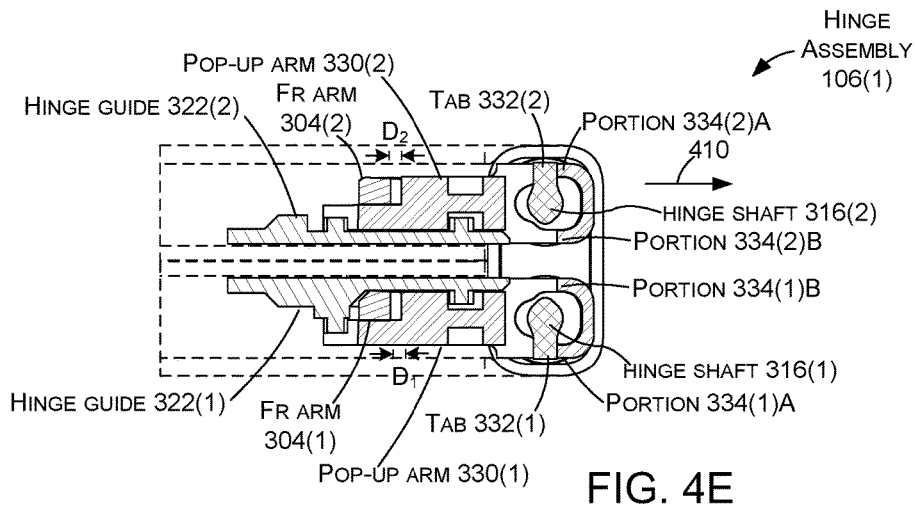

FIG. 4E shows how the hinge assembly 106(1) can generate forces that bias the first and second portions 102 and 104 apart from a closed orientation to a defined orientation, such as from zero degrees to 30 degrees (e.g., 15 degrees around each hinge axis). In this case, tabs 332 of the hinge shafts 316 are contacting portions 334(1)A and 334 (2)A of the pop-up arms 330. This contact can force the pop-up arm to move to the right as indicated by arrow 410 (e.g., pop-up arms 330 and friction arms 304 move apart or away from one another). This movement can preload (e.g., compress) the spring 328 so that the spring is creating a force to rotate the two device portions apart from one another. (Recall that the two device portions can be locked together and the spring force does not create rotational motion until they are unlocked (e.g., the springs remain compressed when locked). The movement of the pop-up arm 330 away from the friction arm 304 can also decouple the spring force from the friction arm 304. Thus, at this orientation, spring force is not applied to increase friction between the friction arm and the hinge shafts 316, thereby allowing easier relative rotation of the hinge shafts and the friction arms when the first and second portions are unlocked.

Figure 4F:
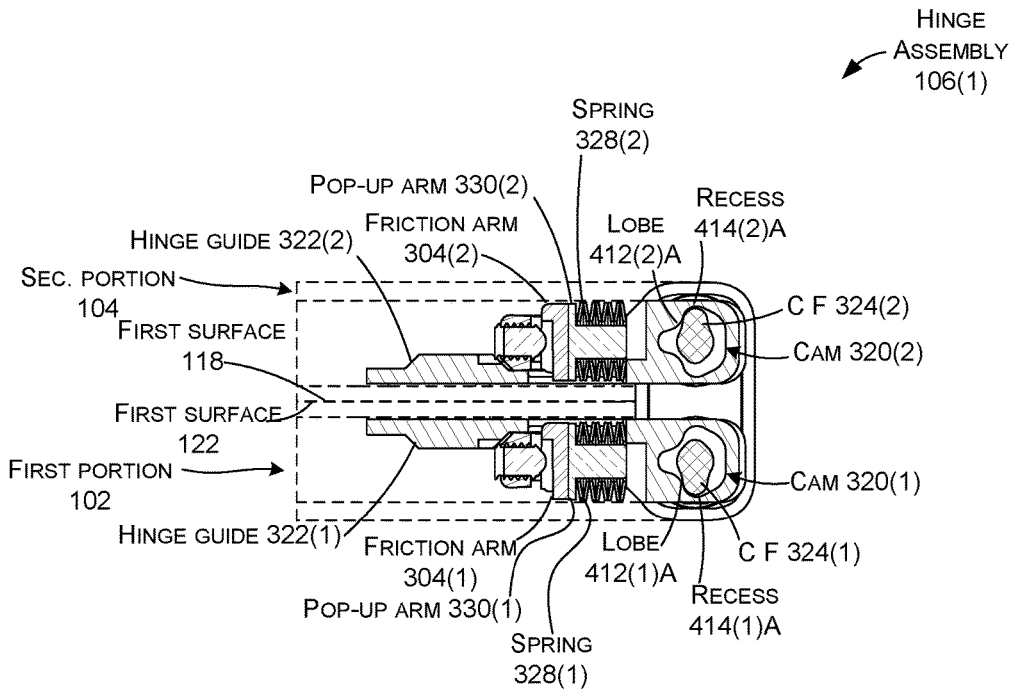

FIG. 4F shows the multi-lobe cams 320. In this case, multi-lobe cams can include two or more cam lobes 412 and cam recesses 414 (not all of which are designated with specificity). In this zero-degree orientation, cam follower 324(1) is positioned in cam recess 414(1)A and cam follower 324(2) is positioned in cam recess 414(2)A which allows the hinge guides 322 and hence the first and second portions 102 and 104 to rest against one another (e.g., first surface 118 is parallel to and abuts first surface 122). In other orientations, the multi-lobe cams 320 can force the first and second portions away from one another to reduce/prevent damage to the device. For instance, compare the 30-degree orientation of FIG. 6F to the zero-degree orientation of FIG. 4F.

Further, the camming action can be facilitated by a force directing the cam 320 (and hence the hinge guide 322) and the cam follower 324 (via the friction arm 304) against one another. However, at the zero-degree orientation, as mentioned above in relation to the discussion of FIG. 4D, the spring 328 has been decoupled from the friction arm 304. The spring force is instead being directed to the pop-up feature (e.g., to the pop-up arm 330 and hence tab 332). As such, at this orientation, rotation around the first and second hinge axes 116 is made easier by decoupling the spring force from the cam and cam follower and instead using the spring force to bias the two portions 102 and 104 apart from one another. Further, because the cam and cam follower are not forced against one another, the resistance to rotation of the first and second portions is less, and so a smaller spring force can accomplish the pop-up rotation than would be required without the decoupling.

Further still, the coupling and decoupling can allow a single spring 328 to provide both spring forces (e.g., at separate ranges of the rotation). Stated another way, the spring can provide the pop-up force for a first range of rotation, such as zero to 15 degrees, and can apply the normal force between the cam 320 and the cam follower 324 for a different range of rotation, such as 16 to 180 degrees.

Figure 4G:
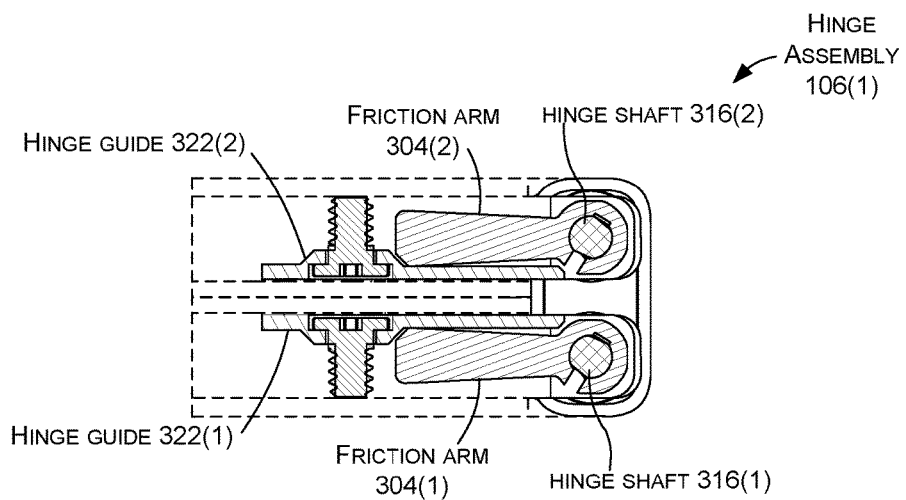

FIG. 4G shows a portion of the friction arms 304 around the hinge shafts 316. This can be viewed as the 'lower portion of the friction arms' with the 'upper portion of the friction arms' described above relative to FIG. 4C. The lower portion can have a similar configuration that reduces friction between the friction arm and the hinge shaft for a range of rotation and increases the friction for another range of rotation. Thus, this configuration can provide less resistance to rotation during the pop-up range and a higher resistance to rotation outside the pop-up range. The higher resistance to rotation can allow the device to maintain the orientation that a user sets it at. For instance, if the user 202 sets the device 100 at a ninety-degree orientation, the higher resistance can allow the device to hold this orientation and not 'fold up.' As mentioned, the friction arm can be u-shaped with the lower and upper portions of the 'U' described relative to FIGS. 4C and 4G. The U shape of the friction arm can facilitate efficient energy transfer between the friction arm and other elements of the hinge assembly 106. For instance, spring force applied to the friction arm is efficiently transferred to the hinge shaft with relatively little loss due to deformation and/or torqueing of the friction arm.

Assume at this point in the explanation that the user 202 releases the user-controllable lock (204, see FIGS. 2A-2B). The pop-up force described above can start to rotate the first and second portions 102 and 104 apart from one another to the fifteen-degree orientation shown in FIGS. 5A-5G.

Figure 5A:
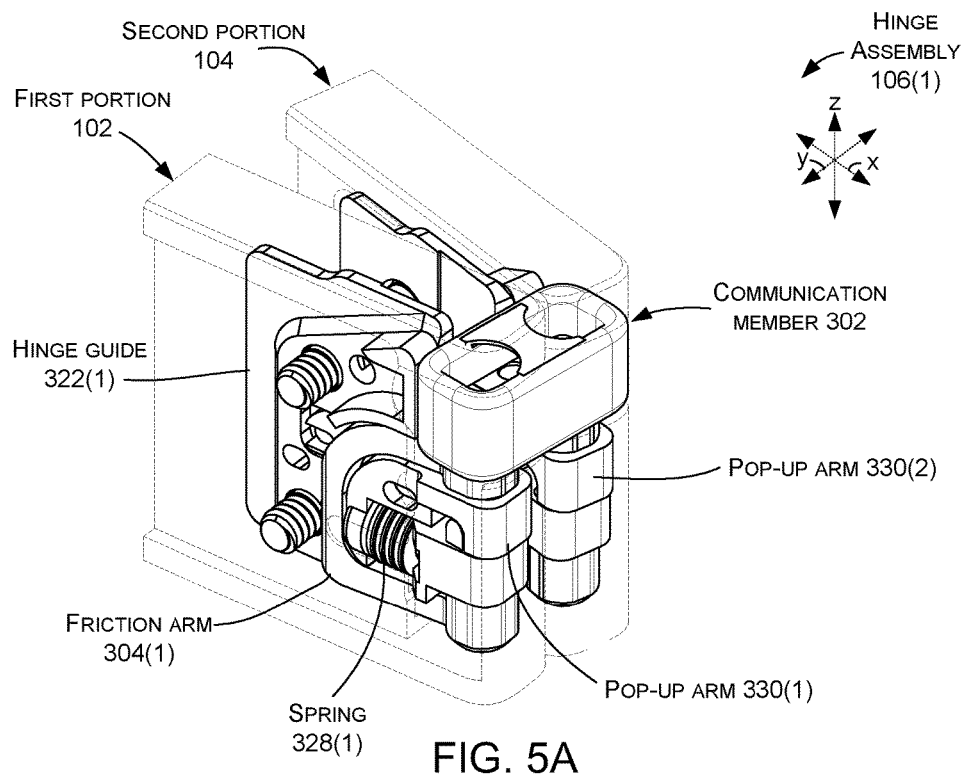
Figure 5B:
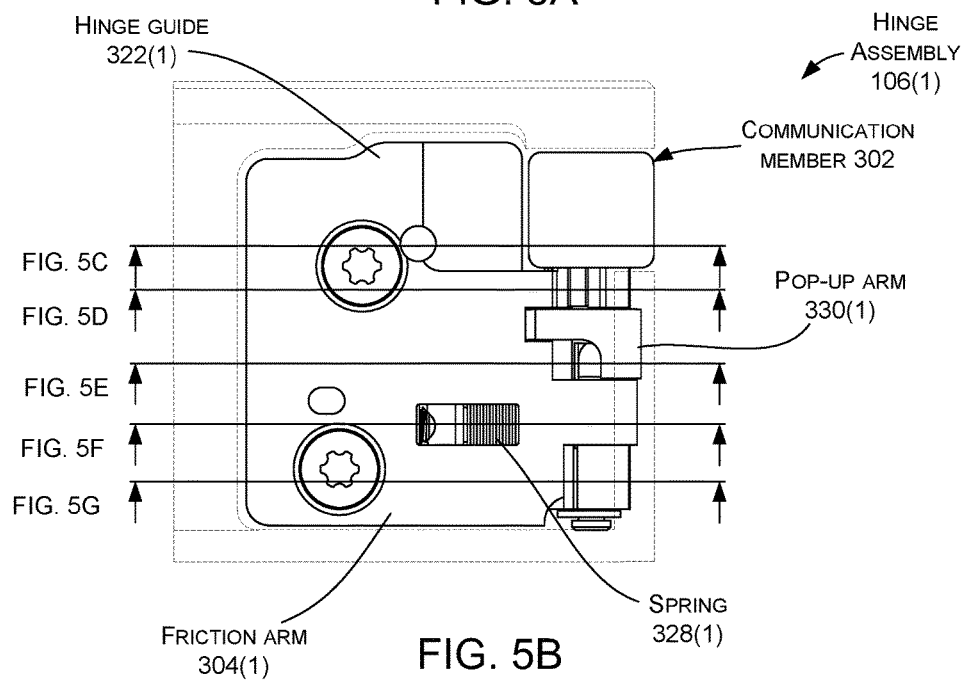
Figure 5C:
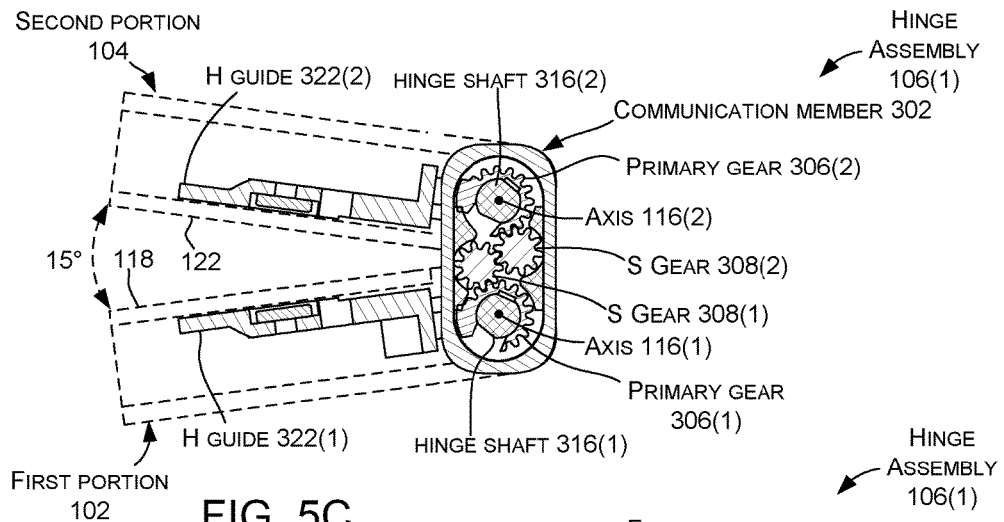

FIG. 5C shows the hinge assembly 106(1) at a 15-degree orientation (e.g., 7.5 degrees of rotation around each hinge axis 116 relative to FIG. 4C). This rotation can be regulated in a one-to-one manner by the interaction of the primary and secondary gears 306 and 308 and the hinge shafts 316.

Figure 5D:
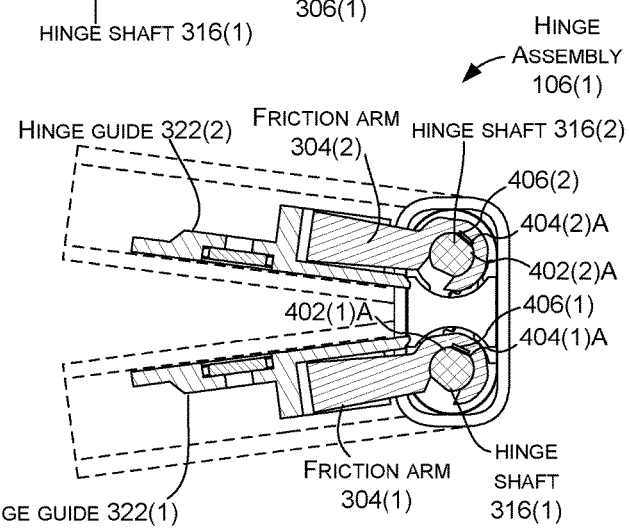

FIG. 5D shows the flat regions 404(1)A and 404(2)A of the friction arms 304 still aligned with the friction structure

406. Thus, the first and second portions 102 and 104 remain in the low friction range of rotation described above relative to FIG. 4D so that the spring force can continue to rotate the first and second portions away from one another (e.g., pop them apart).

Figure 5E:
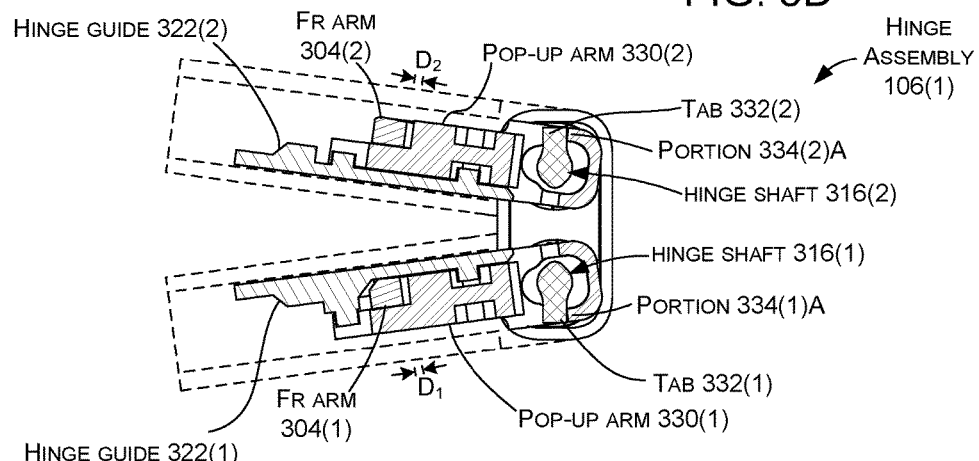

FIG. 5E shows tabs 332 of the hinge shafts 316 continuing to contact portions 334(1)A and 334(2)A of the pop-up arms 330. As such, the spring force from springs 328 are continuing to be transferred from the spring to the pop-up arms 330 and from the pop-up arms to the tabs 332 on the hinge shafts 316. Since the hinge shafts and tabs cannot rotate, the spring force causes the first and second portions 102 and 104 to rotate away from one another. At this point, distance D is less than at the zero-degree orientation of FIG. 4E, but friction arms 304 remain decoupled from pop-up arms 330 and thus decoupled from the spring force generated by springs 328.

Figure 5F:
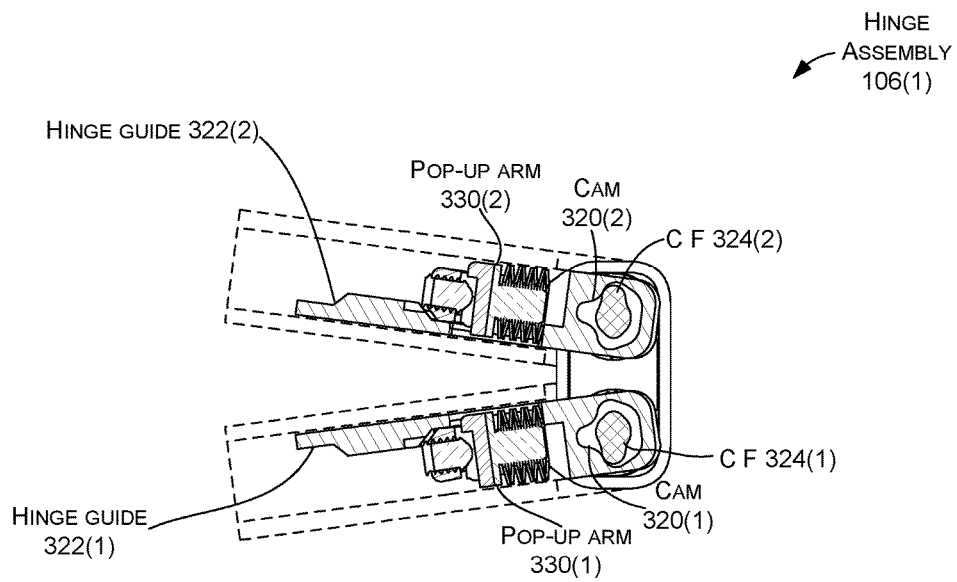

FIG. 5F shows the cams 320 and the cam followers 324. At this point, the spring force is being applied to move the first and second portions 102 and 104 apart and is not being employed to bias the cam and cam followers against one another. As such, the effects of the cam are not substantial at this point in the rotation.

Figure 5G:
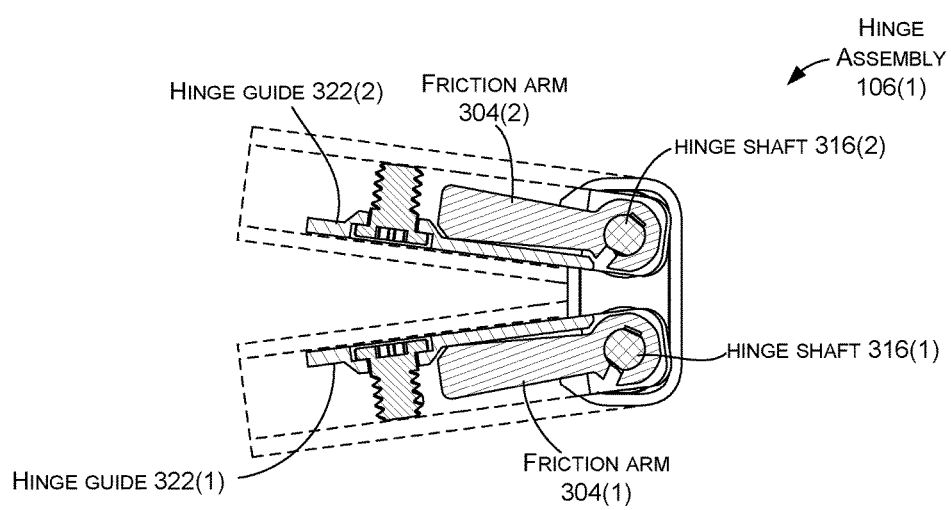

FIG. 5G shows the bottom of the friction arms 304 interacting with the hinge shafts 316. The function is similar to the top of the friction arms described above relative to FIG. 5D.

Assume at this point that the spring pressure continues to rotate the first and second portions 102 and 104 away from one another (e.g., pop-up).

Figure 6A:
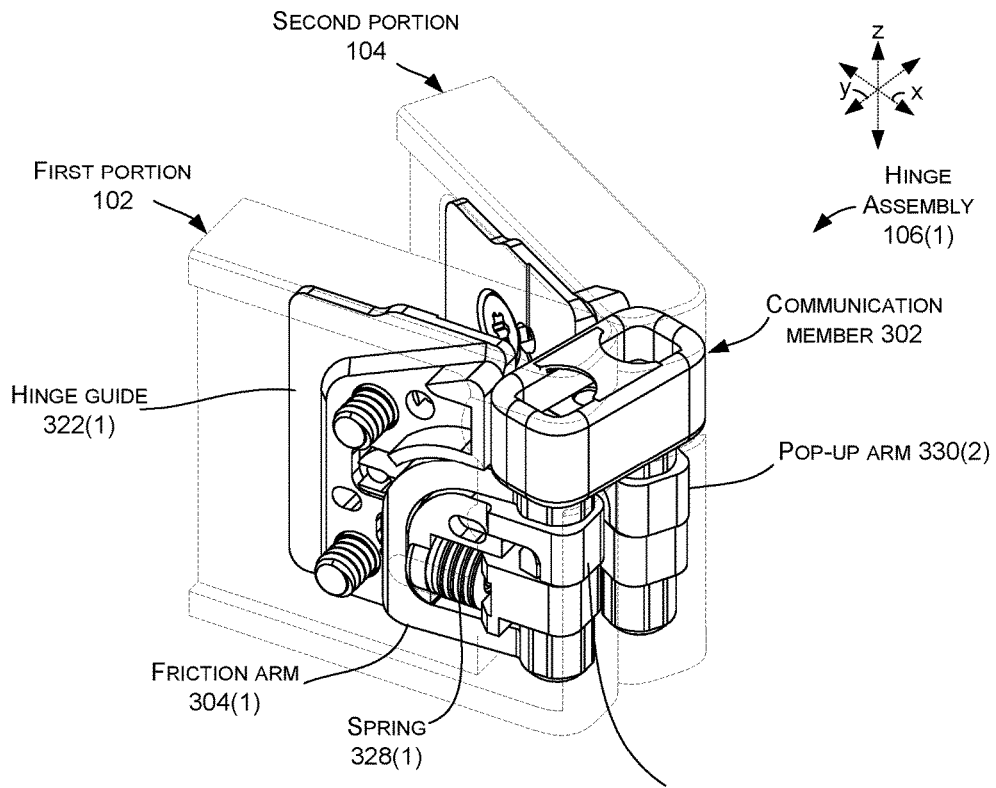
Figure 6B:
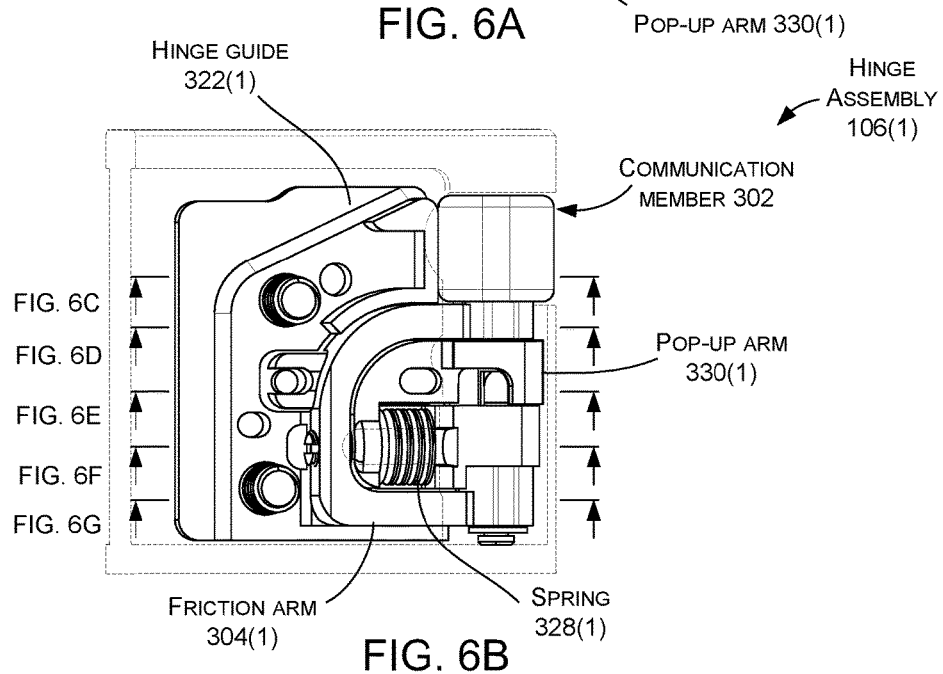
Figure 6C:
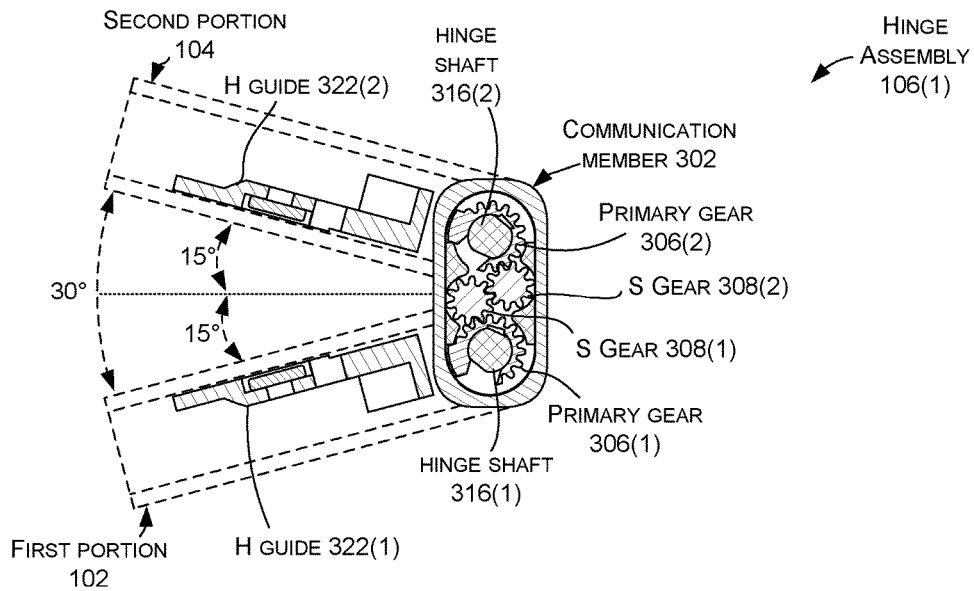

FIGS. 6A-6C show the first and second portions 102 and 104 rotated to a 30-degree orientation.

FIG. 6C shows that the controlled gear interactions of the primary gears 306 and the secondary gears 308 causes equal rotation around the first and second hinge axes 116 (e.g., 15 degrees around each for a total of 30 degrees).

Figure 6D:
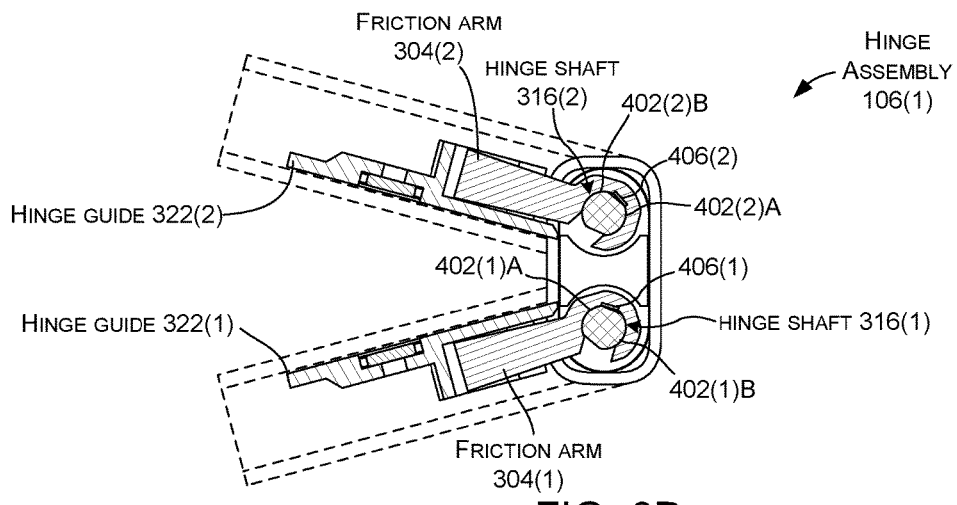

FIG. 6D shows that rotation of the first and second portions 102 and 104 and hence friction arms 304 around hinge shafts 316 has progressed to the point where the radiused regions 402(1)A and 402(2)A are engaging friction structures 406. As the radiused regions begin to contact the friction structures, increased friction results in additional resistance to rotation than was experienced between zero degrees and thirty degrees. Thus, FIG. 6D represents the transition from the first range of rotation (e.g., zero degrees to thirty degrees) with relatively low resistance to rotation to the second range of rotation (thirty degrees to 330 degrees) with relatively higher resistance to rotation. Stated another way, the first and second portions 102 and 104 are transitioning from the low friction range of rotation described above relative to FIGS. 4A-4G and 5A-5G so that the spring force can continue to rotate the first and second portions away from one another (e.g., pop them apart) to the high friction orientations where the pop-up hinge device can offer enough resistance to rotation to maintain the orientation rather than collapsing.

Figure 6E:
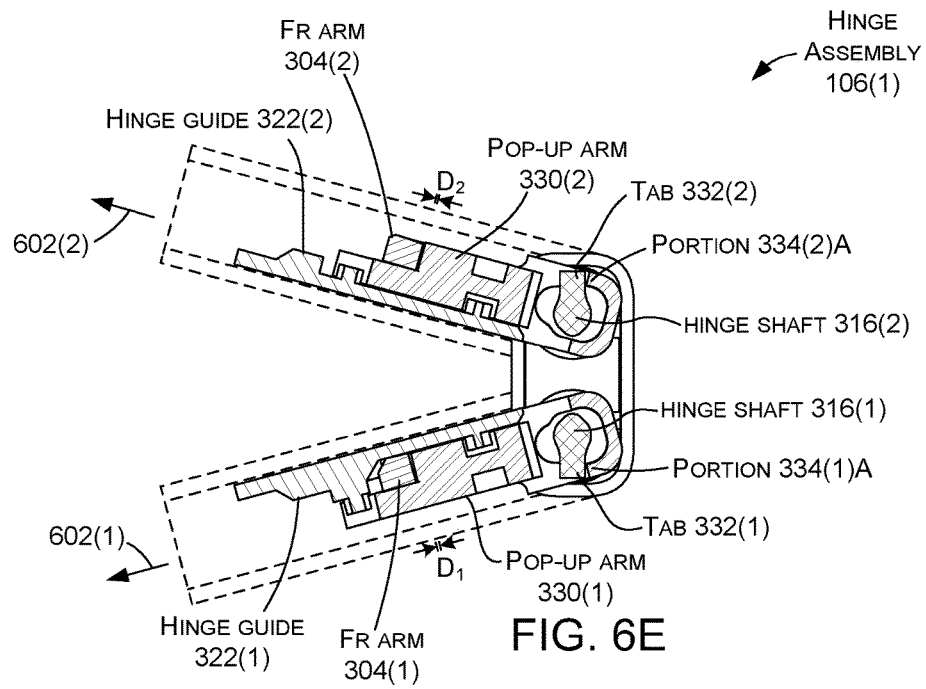

FIG. 6E shows tabs 332 ceasing to engage portions 334(1)A and 334(2)A (e.g., a few more degrees of rotation and the tabs will not be engaging the portions). As a result, force from springs 328 is moving/forcing the pop-up arms 330 to the left as indicated by arrow 602 (since the first and second portions 102 and 104 are not parallel at this point, a separate arrow is shown for each). Stated another way, the pop-up arms 330 and friction arms 304 move toward each other. The pop-up arms 330 are recoupling with the friction arms 304 as evidenced by gap distance D approaching or equal to zero. Thus, spring force is now being transferred from the pop-up arm to the friction arms rather than to the hinge shafts 316. Stated another way, the first range of rotation is ending, and the second range of rotation is beginning. In the first range of rotation the spring force was applied to the hinge shafts 316 to create a pop-up force to automatically open the first and second device portions. In the second range of rotation, the spring force contributes to friction in the hinge assembly 106(1) to create resistance to rotation so that the device portions maintain an orientation set by the user. Thus, the inventive concepts allow a single spring 328 (per hinge guide 322) to supply spring forces for two different purposes depending on device orientation.

Figure 6F:
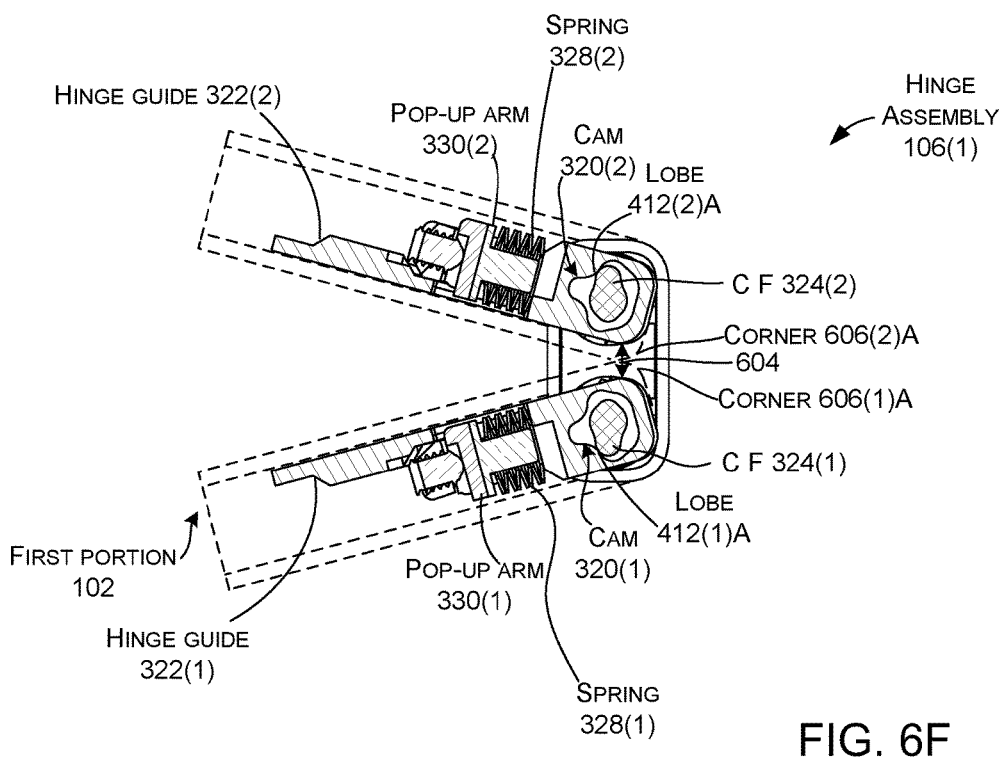

FIG. 6F shows cam followers 324 engaging cam lobes 412. As the cam followers engage the cam lobes, the cams 320 and hence the first and second portions 102 and 104 are pushed away from one another between the hinge shafts 316 as indicated by arrow 604. This separation can prevent the inwardly facing corners 606(1)A and 606(2)A from contacting one another (and/or reduce the force at which the corners contact one another) to reduce the chance of damaging the first and second portions.

Figure 6G:
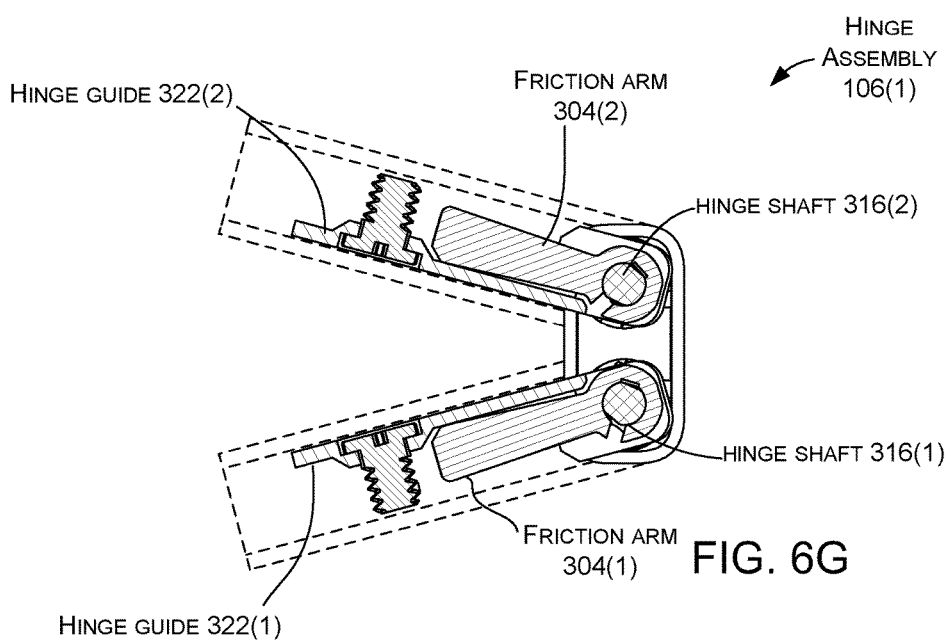

FIG. 6G is similar to FIG. 6D and shows the interaction between the hinge shafts 316 and the friction arms 304 transitioning from the low friction configuration to the higher friction configuration.

FIGS. 7A-7G show 90 degrees of rotation relative to FIGS. 4A-4G.

FIG. 7C shows interactions of primary gears 306 and secondary gears 308 providing continued corresponding rotation around hinge axes 116. In this case, there is 45 degrees of rotation around each hinge axis dictated by the controlled rotation of the gear teeth.

FIG. 7D shows the friction structures 406 of the friction arms 304 contacting radiused regions 402(1)A and 402(2)A of the hinge shafts 316. This contact creates frictional resistance to rotation for the first and second portions 102 and 104 that can allow them to maintain the orientation unless acted upon by the user.

FIG. 7E shows tabs 332 disengaged from portions 334(1)A and 334(2)A (e.g., no significant force between the tabs and the portions). As a result, force from springs 328 is transferred to the friction arms 304 through the pop-up arms 330. Stated another way, the pop-up arms 330 are recoupled with the friction arms 304 as evidenced by gap distance D equal to zero.

FIG. 7F shows cam followers 324 fully engaging cam lobes 412. As the cam follower engages the cam lobe, the cams 320 and hence the first and second portions 102 and 104 are pushed away from one another between the hinge shafts 316 as indicated by arrow 604, which is at its fullest extent in this 90-degree orientation. This separation can prevent the inwardly facing corners 606(1)A and 606(2)A from contacting one another to reduce the chance of damaging the first and second portions.

Figure 7A:
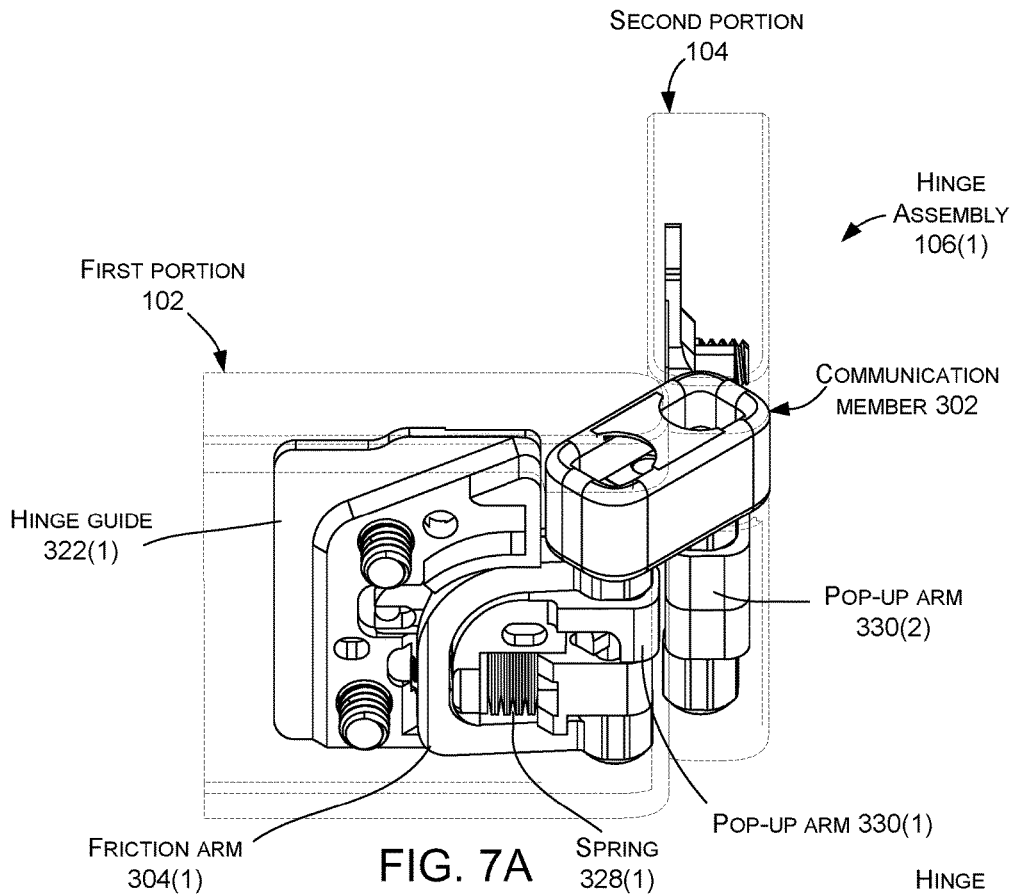
Figure 7B:
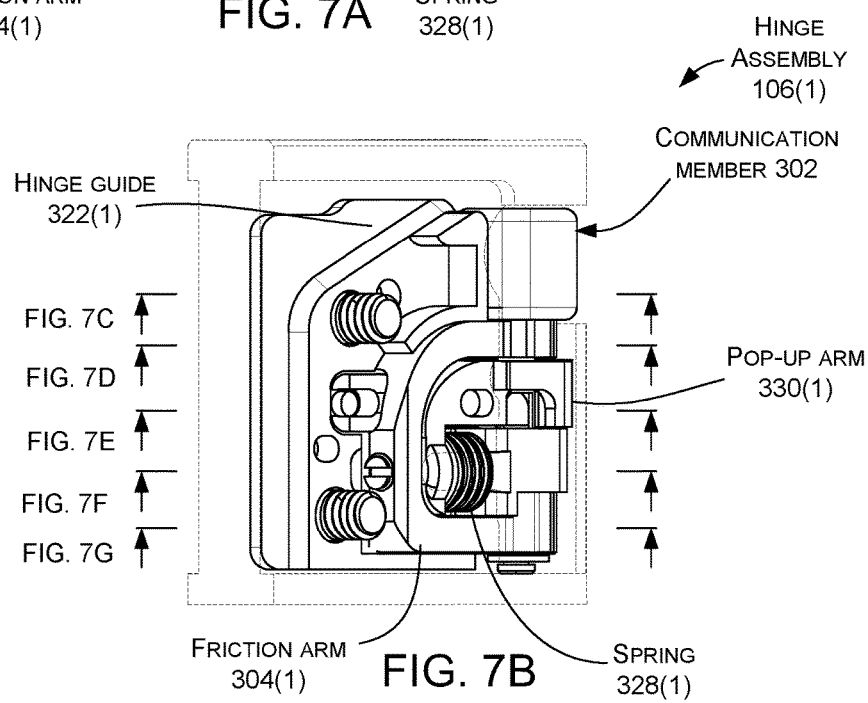
Figure 7G:
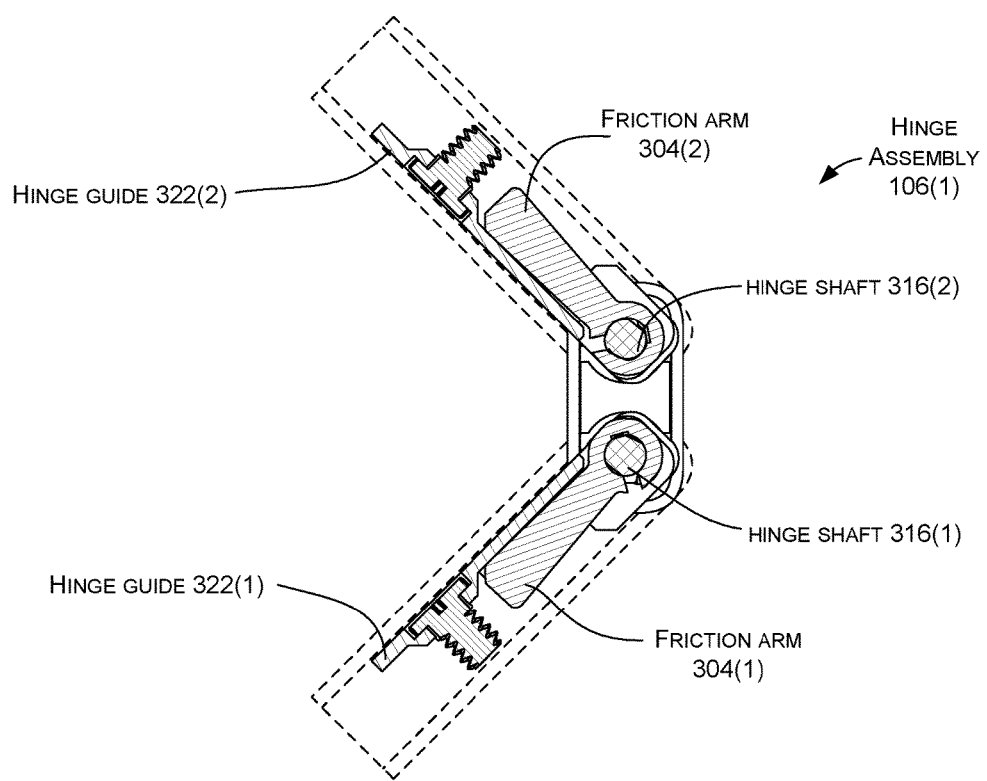

FIG. 7G is similar to FIG. 7D and shows the interaction between the hinge shafts 316 and the friction arms 304 in the high friction orientation.

FIGS. 8A-8G show the first and second portions 102 and 104 at 180-degree orientations with the first and second portions parallel to and abutting one another.

Figure 8C:
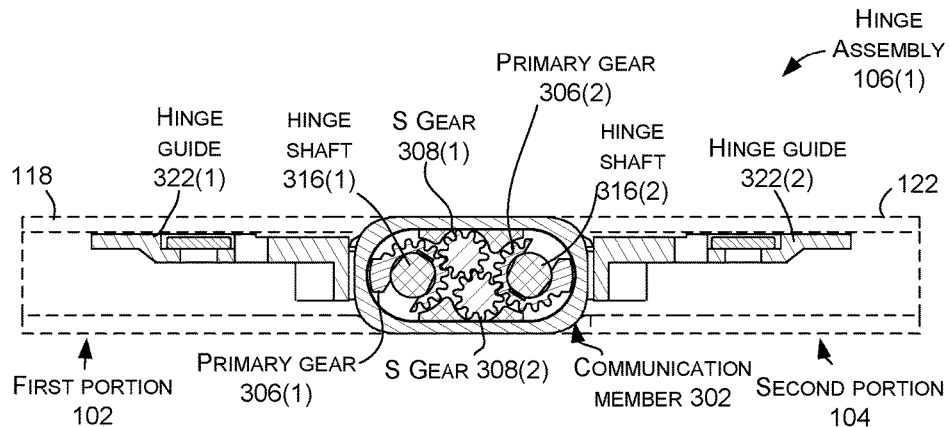

FIG. 8C shows the primary and secondary gears 306 and 308 continuing to cause equal rotation around the first and second hinge axes 116 (specifically designated in other views, in this view contained within hinge shafts 316).

Figure 8D:
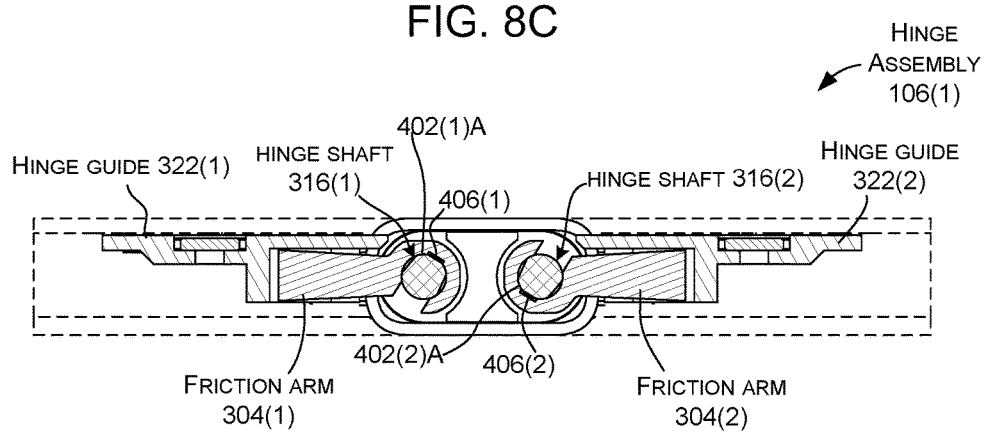

FIG. 8D shows the friction structures 406 of the friction arms 304 contacting radiused regions 402(1)A and 402(2)A of the hinge shafts 316. This contact creates resistance to rotation for the first and second portions 102 and 104 that can allow them to maintain the orientation unless acted upon by the user. Thus, the device can maintain the 180-degree orientation unless the user decides to rotate the first and second portions.

Figure 8E:
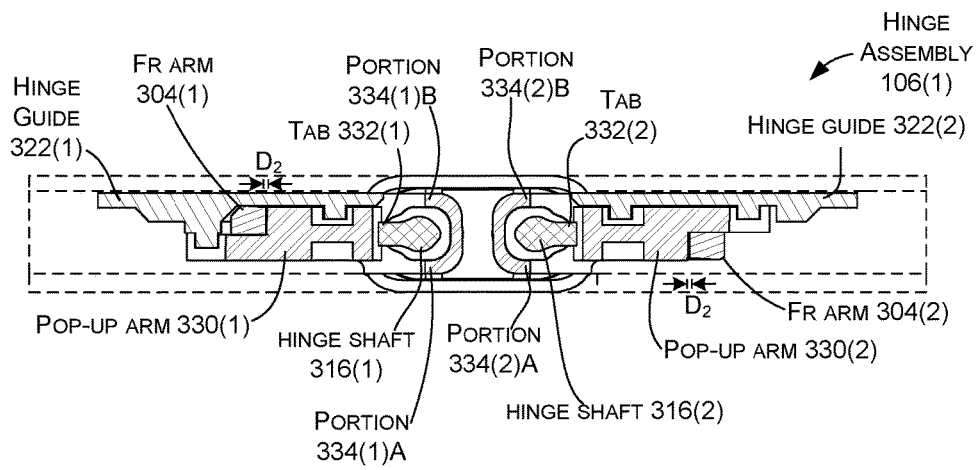

FIG. 8E shows tabs 332 of the hinge shafts 316 are not engaging portions 334(1)A and 334(2)A or 334(1)B and 334(2)B of the pop-up arms 330. Instead, the spring force is biasing the pop-up arms 330 against the friction arms 304 (e.g., away from the hinge shafts) and the spring force is also biasing the hinge guides 322 and hence the cams (FIG. 8F, 320) against the cam followers (FIG. 8F, 324) (e.g., toward the hinge shafts 316).

Figure 8F:
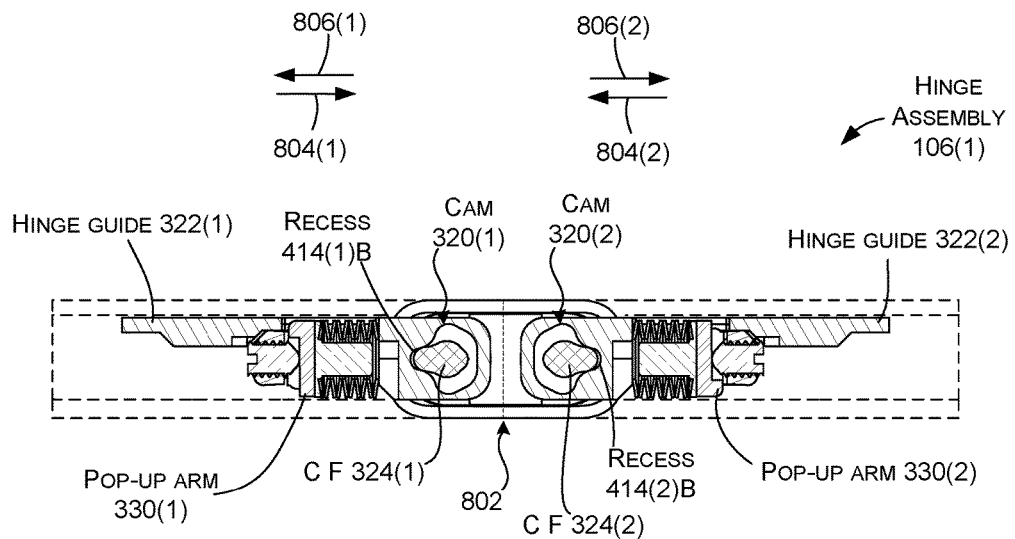

FIG. 8F shows cam followers 324 fully engaging cam recesses 414(1)B and 414(2)B, which allows the first and second portions 102 and 104 to move toward one another and abut one another as indicated generally at 802. The abutting first and second portions can reduce/minimize any gap or discontinuity on displays positioned on the first and second portions and create a nearly seamless 'single display' across the first and second portions in the 180-degree orientation.

Figure 8G:
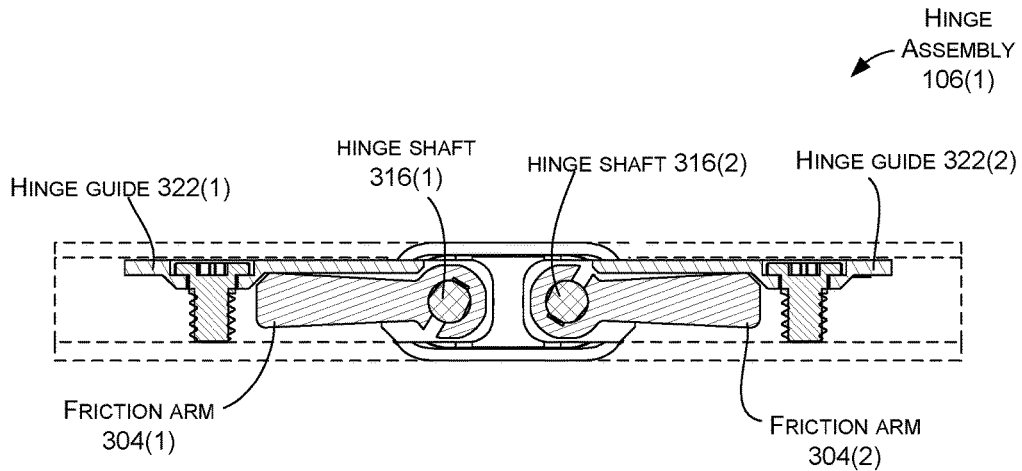

FIG. 8G is similar to FIG. 8D and shows the interaction between the hinge shafts 316 and the friction arms 304 in the high friction orientation. Looking at FIGS. 8F and 8G collectively, recall that as mentioned above, the spring force is forcing the friction arms 304 away from the hinge guides 322. The friction arms 304 are pivotally constrained to the hinge shafts 316 and therefore cannot move away from the hinge shafts. As such, the spring force serves to bias or force the cams 320 (FIG. 8F) (defined by the hinge guides 322) and the cam followers 324 (FIG. 8F) (defined by the hinge shafts 316) towards one another as indicated by arrows 804 and 806, respectively.

FIGS. 9A-9G show a 330-degree orientation of the first and second portions 102 and 104 (e.g., 330 degrees of rotation relative to the zero-degree orientation of FIGS. 4A-4G).

Figure 9A:
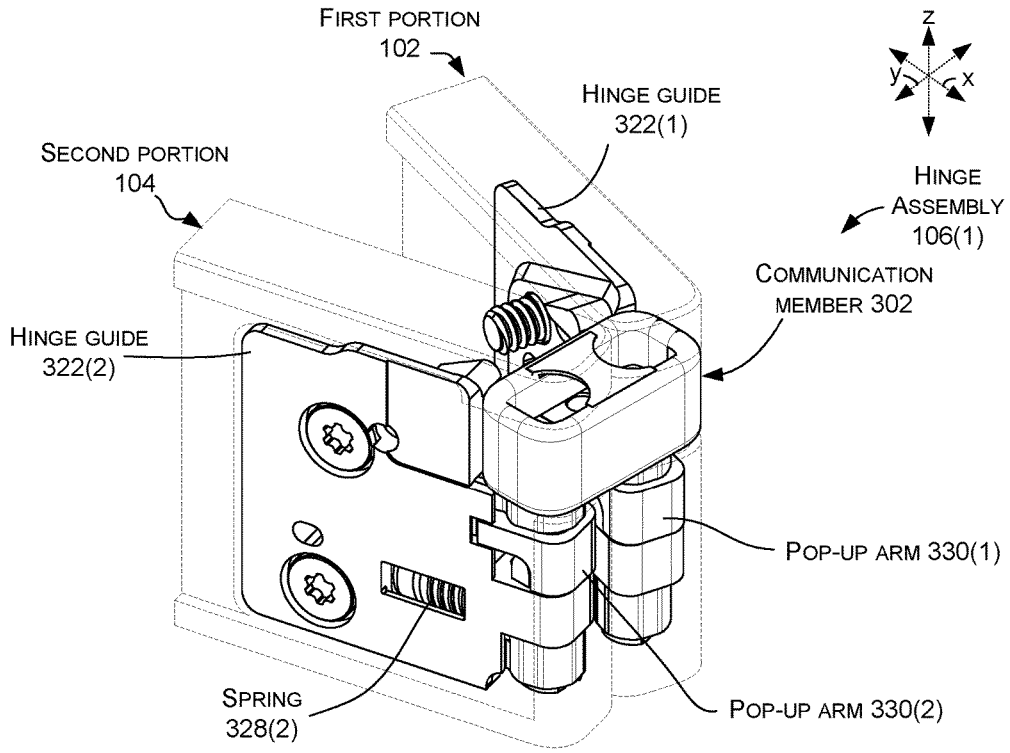
Figure 9B:
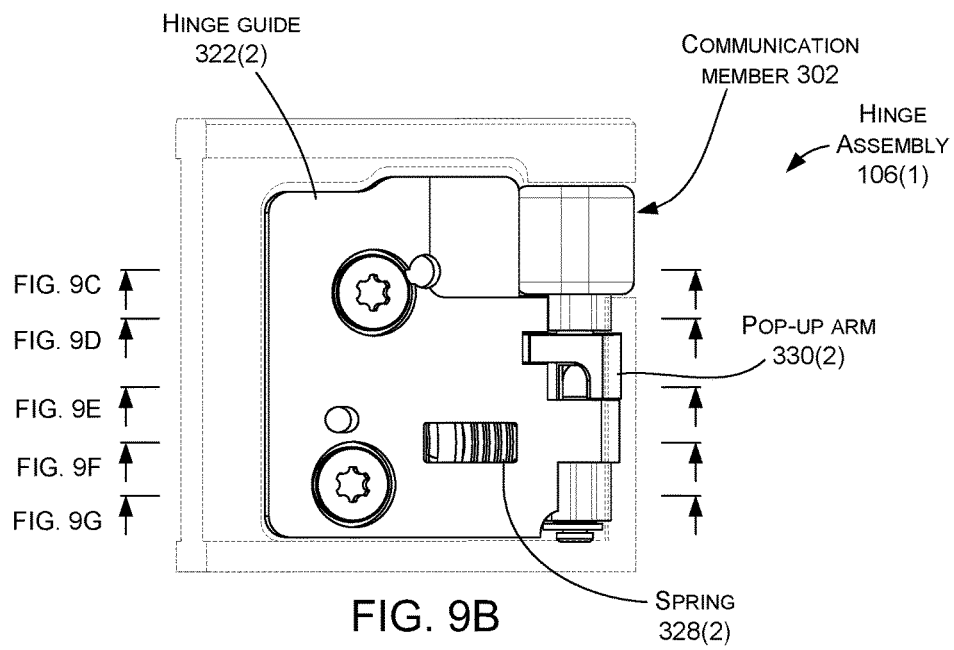
Figure 9F:
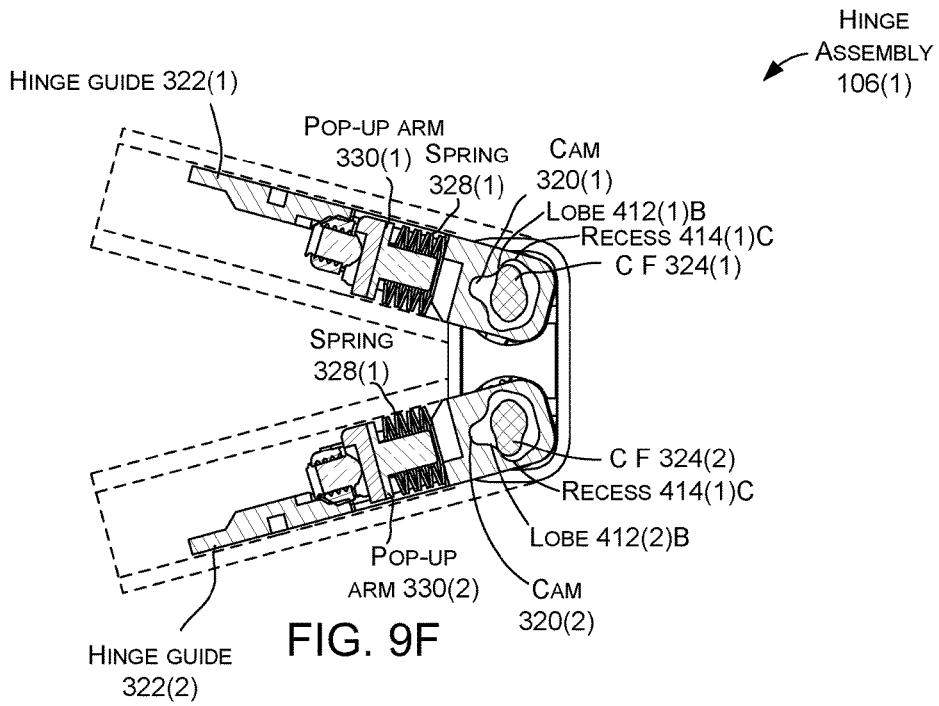
Figure 9G:
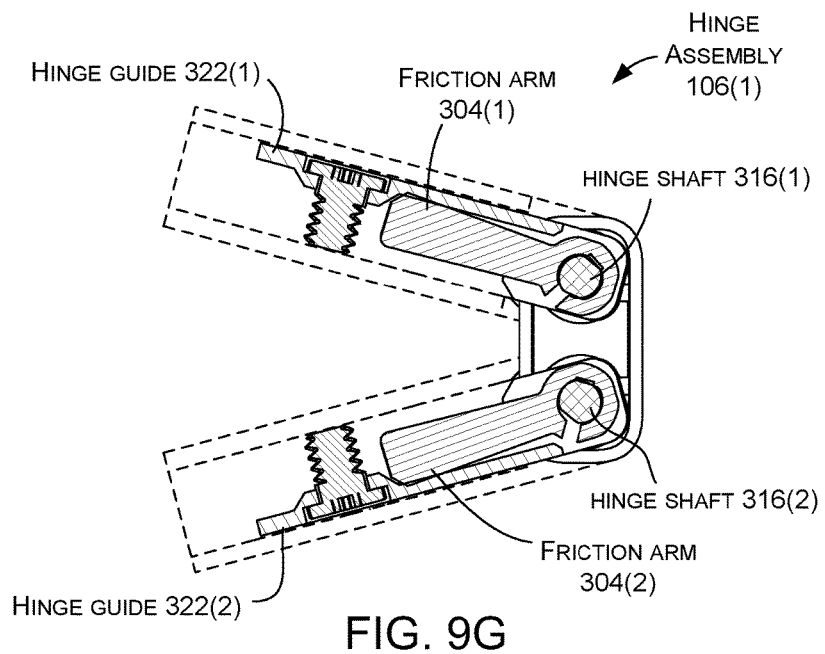
Figure 10A:
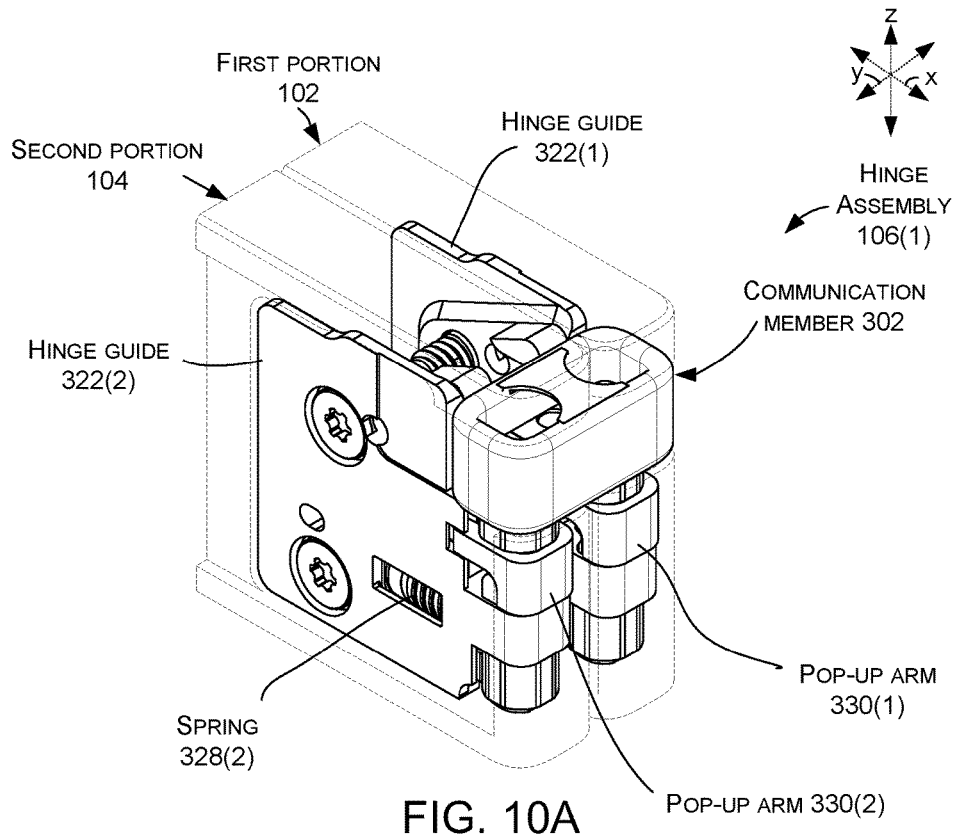
Figure 10B:
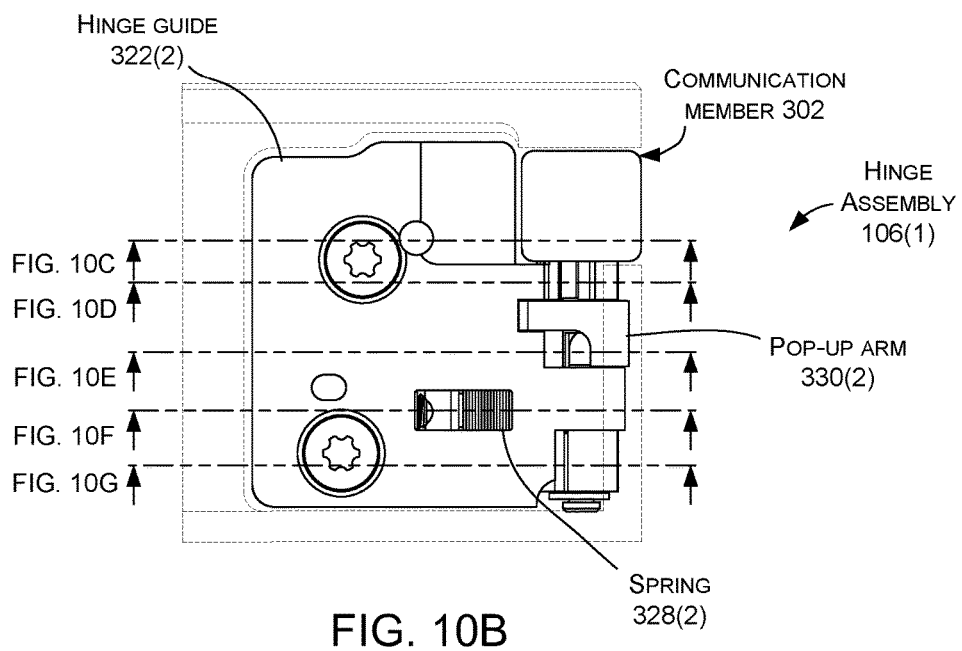
Figure 10C:
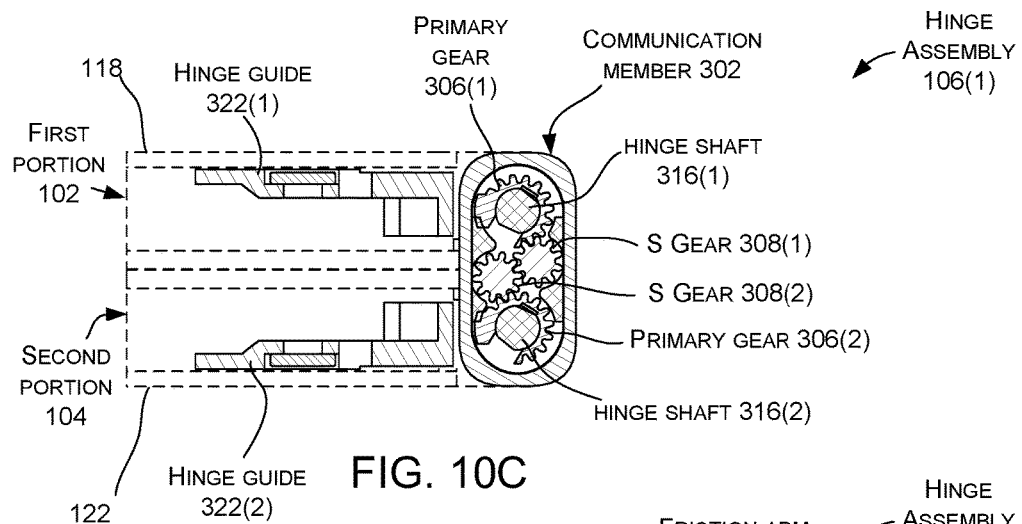
Figure 10D:
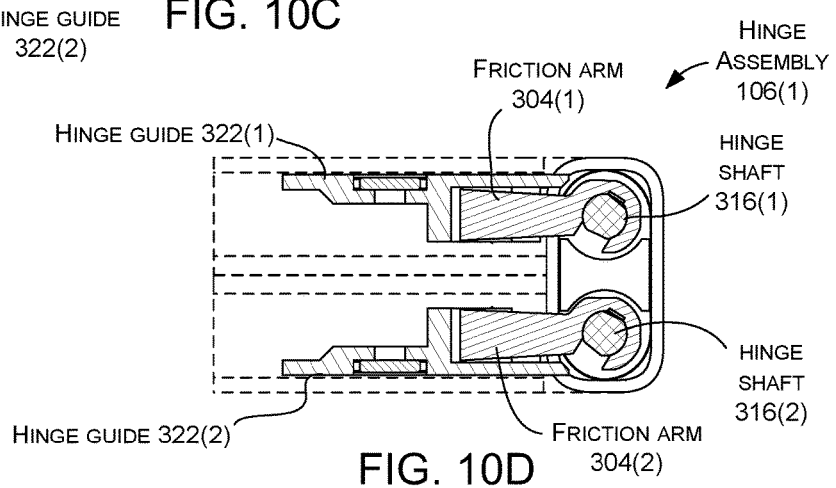
Figure 10E:
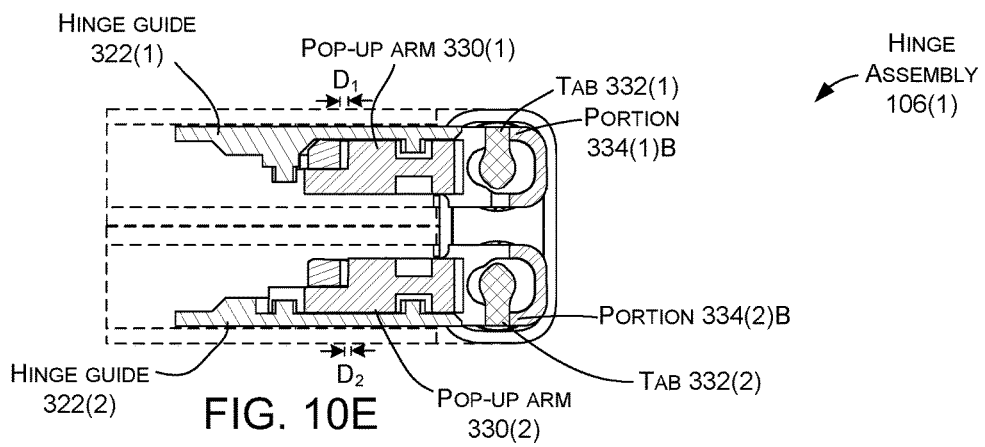
Figure 10F:
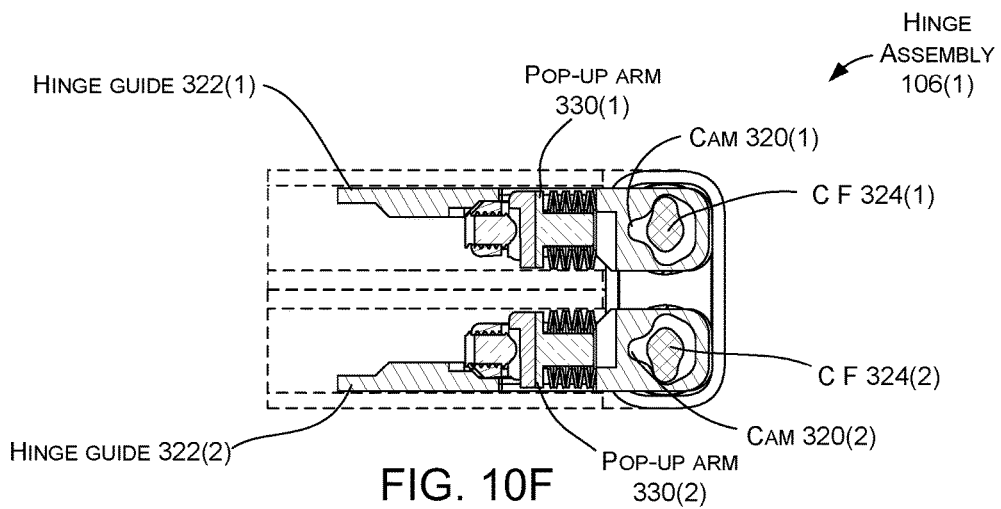
Figure 10G:
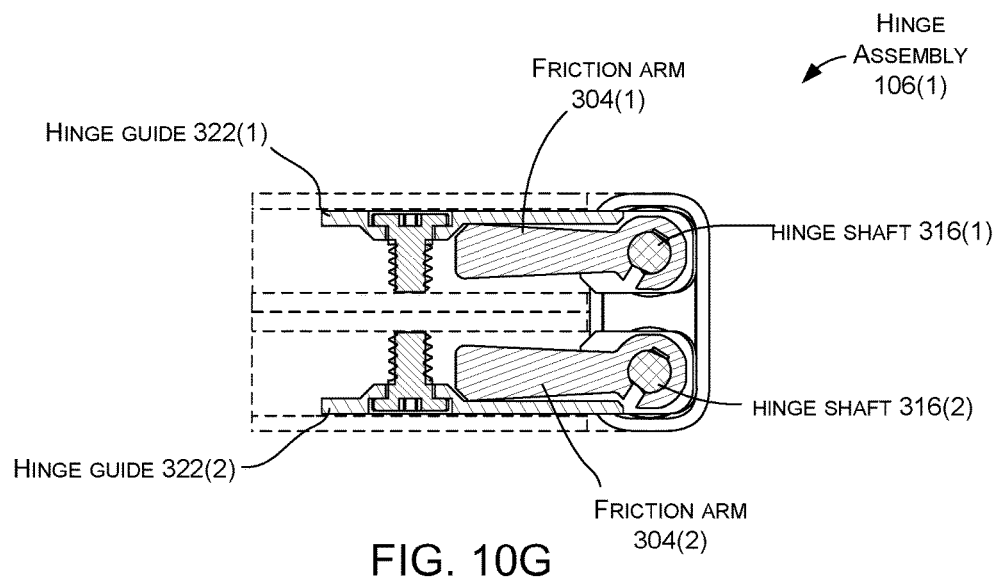

FIGS. 9D and 9G show the hinge shafts 316 and friction arms 304 transitioning from a relatively high friction range of rotation to the relatively low friction range of rotation. Recall that in this implementation, the low friction range of rotation spanned from zero degrees to 30 degrees and then transitions to the high friction range from 30 degrees to 330 degrees. Now at 330 degrees, the hinge assembly 106(1) is transitioning back to the low friction range between 330 degrees and 360 degrees. More specifically, in this implementation, the transition from high resistance to rotation to low resistance to rotation is caused by the friction arms' friction structures 406 ending alignment with the hinge shafts' radiused regions 402(1)A and 402(2)A and starting to align with flat regions 404(1)B and 404(2)B. The radiused regions contact the friction structure and create frictional resistance to rotation, whereas the flat regions do not contact the friction structures and thus create less friction.

FIG. 9E shows tabs 332 beginning to engage portions 334(1)B and 334(2)B of the pop-up arms 330. This engagement begins to decouple the pop-up arms 330 from the friction arms 304 (e.g., distance D between the pop-up arms and the friction arms will expand from almost zero at 330 degrees to a larger distance at 360 degrees). The spring energy will instead displace the pop-up arms and create the pop-up force.

FIG. 9F shows cam followers 324 coming off of cam lobes 412(1)B and 412(2)B toward cam recesses 414(1)C and 414(2)C, which allows the first and second portions 102 and 104 to move back toward one another. In this implementation, max cam lift occurs at 90 degrees and 270 degrees to protect the first and second portions from damaging one another. Cam lift is lowest at 0, 180 and 360-degree orientations. Stated another way, the hinge assemblies 106 provide varying translation as the first and second portions are rotated through various orientations. This hinge assembly rotation and translation movement will allow the two display device to be as close to each other with minimum deadband (e.g., distance between active areas of two displays at 180-degree open orientation). Traditional hinges require a gap between the first and second portions at the 180-degree open orientation.

FIGS. 10A-10G show the 360-degree orientation and are similar to the zero-degree orientation of FIGS. 4A-4G. In this case, the first surfaces 118 and 122 are now facing outwardly and the second surfaces 120 and 124 are facing inwardly. The springs 328 are decoupled from the friction arms 304 and are creating the pop-up force to spring the first and second portions 102 and 104 away from one another (back to the 330-degree view of FIGS. 9A-9G). In this orientation, the user-controllable lock 204 (FIGS. 2A-2D) can once again maintain the closed orientation unless acted upon by the user 202 so that the hinge assemblies 106 can bias the first and second portions apart. (See, for example, user-controllable lock 204(1) and 204(2) implementations of FIG. 2D which are accessible to the user in both the zero-degree orientation and the 360-degree orientation.)

FIGS. 11-14F collectively show another example hinge assembly 106(A).

Figure 11:
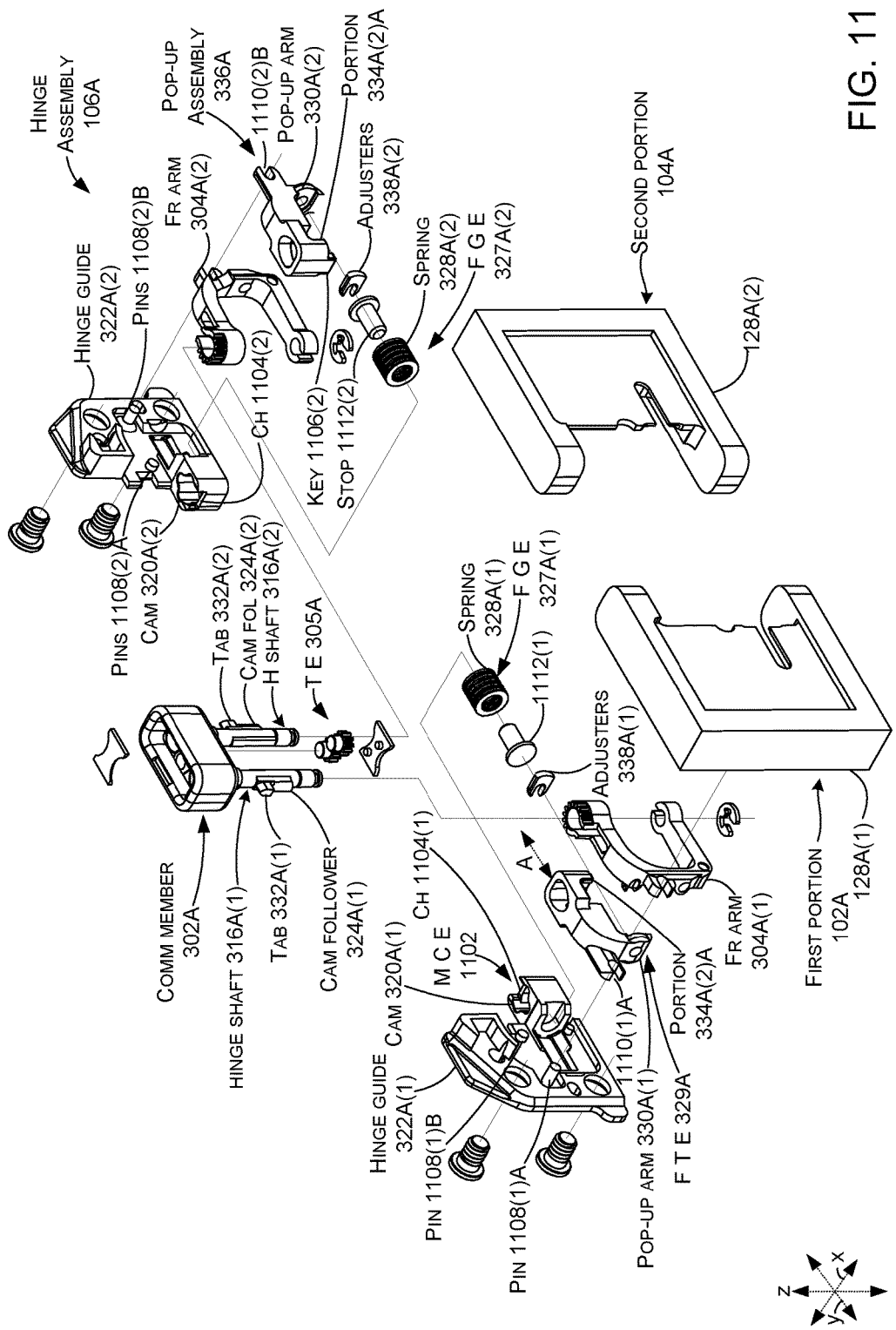

FIG. 11 is an exploded view in the 180-degree orientation that shows details of example hinge assembly 106A. The hinge assembly 106A can include several of the elements introduced above relative to FIG. 3, some of which are not discussed in detail here for sake of brevity. These elements may or may not be identical to those discussed relative to FIG. 3 and for ease of explanation are referred to with the same designators used above with the addition of the "A" suffix. In this case, the hinge assembly 106A can include communication member 302A and first and second friction arms 304A(1) and 304A(2), as well as timing element 305A that can include primary gears 306A and/or secondary gears 308A. The communication member 302A can include hinge shafts 316A.

Multi-lobe cams 320A can be defined by and/or fixedly arranged relative to the first and second portions 102A and 104A. In the illustrated implementation, hinge guides 322A are secured in fixed relation to the first and second portions 102A and 104A (e.g., with housing 128A). The multi-lobe cams 320A can be defined by the hinge guides 322A. In this case, the multi-lobe cams are formed in the hinge guides (e.g., the multi-lobe cams can be manifest as cavities) and are aligned with hinge axes 116. In some implementations, the hinge shafts 316A include cam followers 324A that extend orthogonally to the hinge axes. The hinge shafts 316A are received in the cavity of the multi-lobe cams so that the cam followers 324A engage the multi-lobe cams 320A.

Force generating elements 327A, such as springs 328A, can be positioned relative to the hinge guides 322A and to force transferring elements 329A, such as pop-up arms 330A. In this example, the force transferring element 329A can extend along an axis (A) that is orthogonal to the hinge shaft 316A. The force transferring element 329A can be associated with the force generating element 327A and can be configured to employ force from the force generating element by moving along the axis A in a first direction to bias the first and second portions 102 and 104 to rotate away from one another during a first range of rotation (such as zero to 20 degrees) between the first and second portions and to move in a second opposite direction along the axis to employ the force to create resistance to rotation during a second range of rotation (such as 21 to 340 degrees).

A movement constraining element 1102 can be configured to allow linear movement of the force transferring element 329A parallel to the axis A and rotational movement around the hinge shaft 316A (e.g., around axis 116A). The movement constraining element 1102 can be configured to inhibit movement of the force transferring element relative to other axes (e.g., other linear movement and/or other rotational movement).

In this example, the movement constraining element 1102 is manifest on hinge guides 322A and pop-up arms 330A. Specifically, in this illustrated implementation the movement constraining element 1102 entails cooperatively operating channels 1104 and keys 1106 that control the movement of the pop-up arms 330A. For instance, the hinge guides 322A can define channels 1104 that extend along the axis A and the pop-up arms 330A can define keys 1106 that ride in the channels along the axis A. (Note key 1106(1) is not readily visible in FIG. 11, see FIG. 12A instead). Note also that alternatively, the channels 1104 could be formed in the pop-up arms 330A and the keys 1106 formed in the hinge guides 322A.

The hinge guides 322A can be slideably secured to the pop-up arms 330A. In the illustrated example, the hinge guides 322A can define pins 1108 and the pop-up arms 330A can define slots 1110 that extend parallel to the axis A. The pins 1108 can move linearly relative to the slots 1110 parallel to the axis A but the pins and slots inhibit rotation of the pop-up arm relative to the hinge guide. The pins 1108 can have a diameter that is slightly less than a width defined by sides of the slots 1110 to allow for manufacturing tolerances. Traditionally, the pins would be positioned equidistance from the sides of the slots 1110. However, the springs 328A can create a rotational force on the pop-up arms 330A (e.g., in the orientation of FIG. 11, the rotational force is clockwise around the x axis on pop-up arm 330A(1) and counter-clockwise on pop-up arm 330A(2)). To limit rotation of the pop-up arms 330, in some implementations the pins 1108 can be positioned against the sides of the slots 1110 in the respective counter-clockwise and clockwise directions to limit/preclude rotation caused by the springs 328A. Stated another way, the pins can be biased from the center of the slots to the edges so that rotation in the defined direction is immediately constrained.

The pop-up arms 330A can be positioned over the hinge shafts 316A. Tabs 332A on the hinge shafts 316A can engage portions 334A of the pop-up arms 330A in specific orientations (such as the first range of rotation) to transfer spring energy to rotational energy (e.g., pop-up). Recall, that the springs 328A can alternatively provide spring force to bias the cams 320A and cam followers 324A against one another and then to bias the first and second portions 102 and 104 away from one another (such as the second range of rotation). The springs 328A, pop-up arms 330A, tabs 332A, and/or hinge guides 322A can provide an example of a pop-up assembly 336A that can bias the first and second portions 102 and 104 away from each other from a first orientation to a second orientation (e.g., through the first range of rotation).

Adjusters 338A can operate on the springs 328A to adjust the spring force imparted by the springs 328A between the hinge guides 322A and friction arms 304A. In this case, the adjusters 338A can be manifest as shims. In this example, the shims can be horseshoe shaped to allow a probe (not shown) to compress stops 1112 against the springs 328A. A width of the shims can be selected for an individual pop-up arm 330A(1) or 330A(2) based upon pressure readings of the probe. The horseshoe shaped shim can be inserted over the probe and the probe can be withdrawn so that the spring force retains the shim between the stops 1112 and the pop-up arms 330A. The insertable shims can achieve a desired spring force (e.g., pretension) against the pop-up arm rather than against the friction arms 304A despite tolerances from hinge assembly to hinge assembly and/or between sides of an individual hinge assembly.

FIGS. 12A-14F collectively show features of the hinge assembly 106A. FIGS. 12A-12F are views of zero-degree orientation similar to FIG. 4A-4G. FIGS. 13A-13F are views of thirty-degree orientation similar to FIG. 6A-6G. FIGS. 14A-14F are views of 180-degree orientations (e.g. parallel) orientations similar to FIGS. 8A-8G.

Figure 12A:
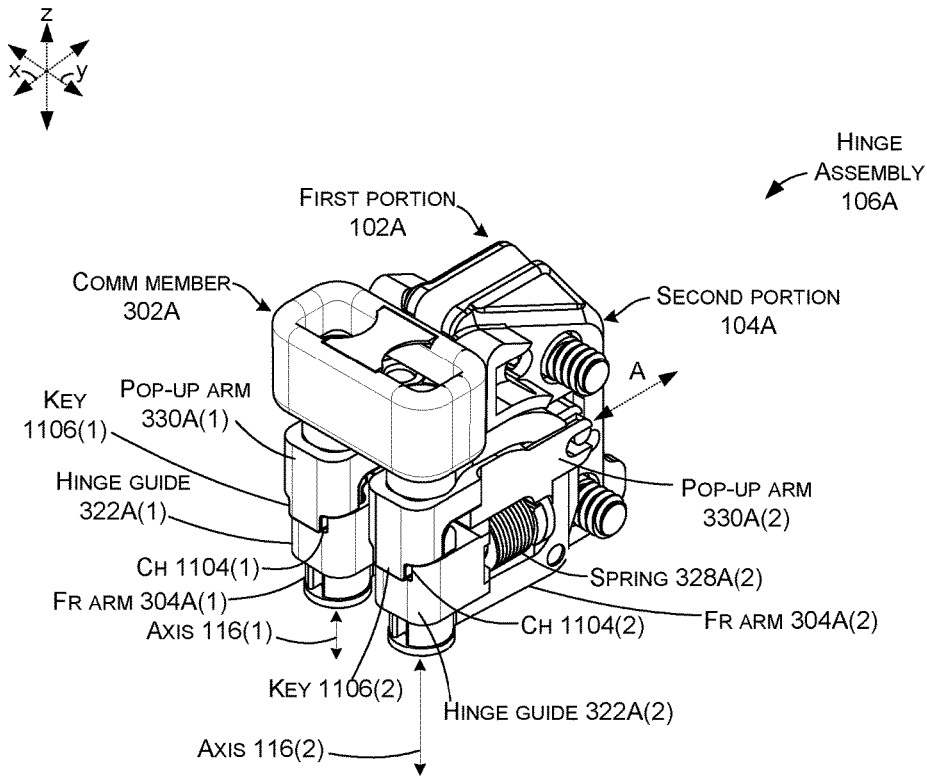
Figure 12B:
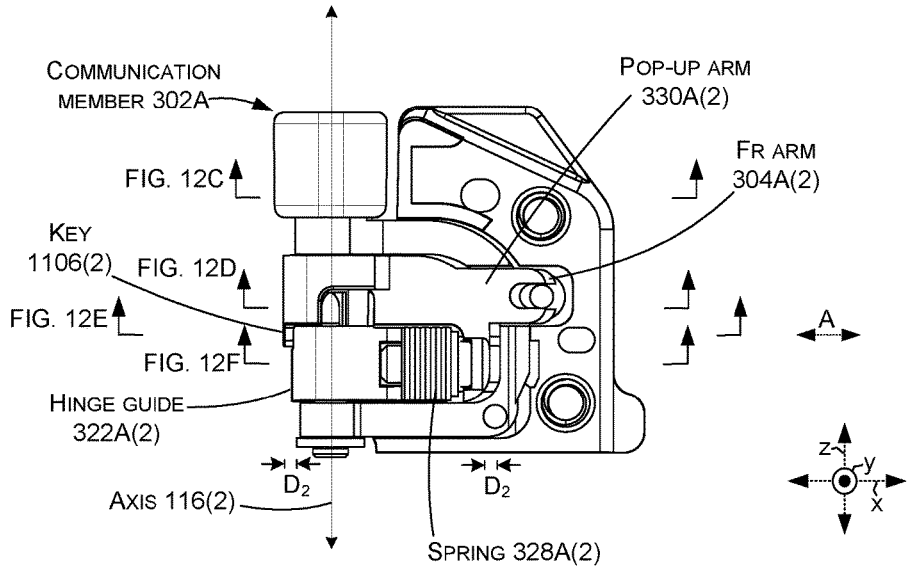
Figure 12C:
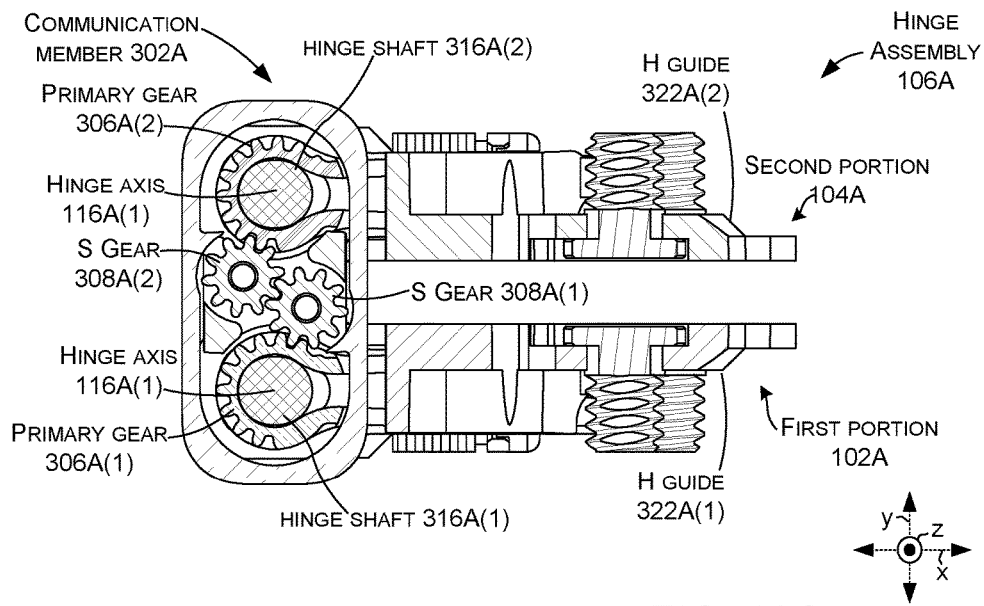
Figure 12D:
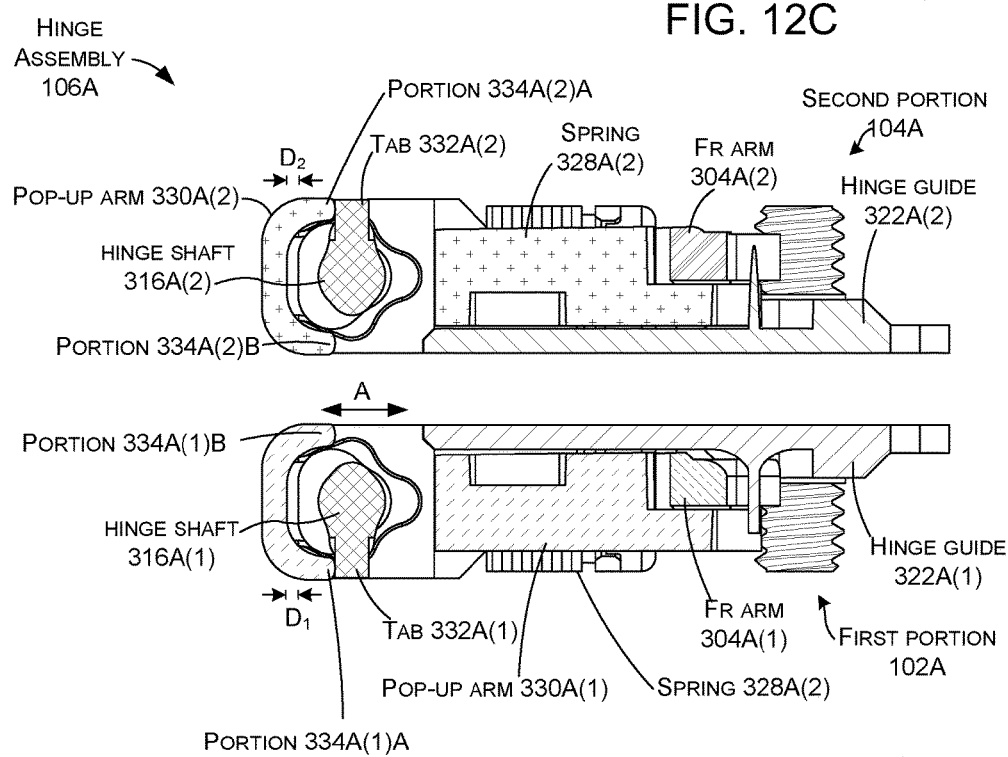
Figure 12E:
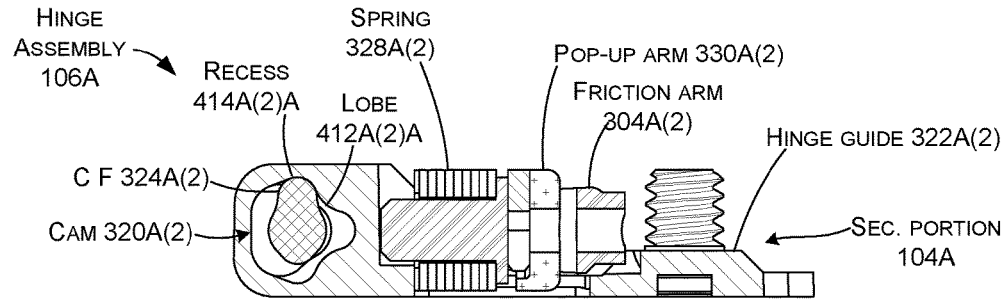
Figure 12F:
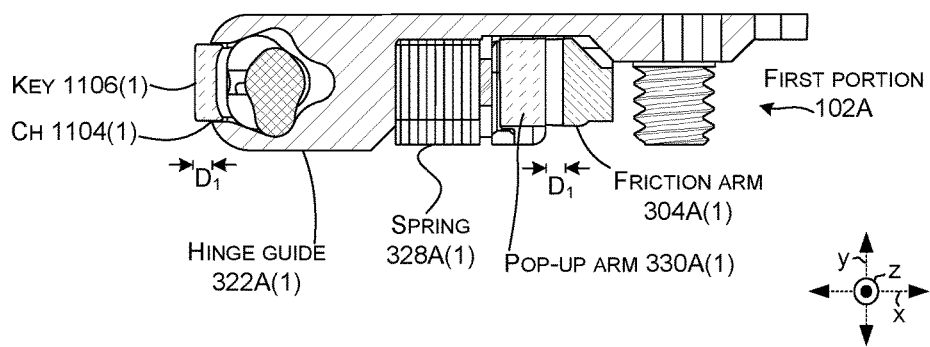

FIGS. 12A, 12B, and 12F show relative positions of the pop-up arms 330A relative to hinge guides 322A. Note that in this zero-degree orientation, the (front of) the keys 1106 of the pop-up arms 330A are not flush with the (front of) the hinge guides 322A. Instead, the pop-up arms have moved along the A axis (which is parallel to the x-reference axis) by distance D. The distance D can be evidenced as the difference in the x-reference direction at the pop-up arms' keys 1106 relative to the hinge guides channels 1104 and/or at the distance between the pop-up arms 330A and the friction arms 304A. Both instances of D are labeled in FIGS. 12B and 12F. (This relative position can be compared to that of FIGS. 13A and 13B where the front of the keys 1106 are relatively flush with the front of the hinge guides 322A and the pop-up arms 330A are contacting the friction arms (e.g., no gap or distance D). Specifically, the keys 1106 of the pop-up arms 330A can slide in channels 1104 of the hinge guides 322A parallel to the x-reference axis, but not in other directions.

At this point, contact between the hinge shafts' tabs 332A and the pop-up arms' portions 334A is producing the movement of the pop-up arms 330A relative to the hinge guides 322A as represented by "A" axis/direction (FIG. 12D). The pop-up arms 330A can also rotate around hinge axes 116 via the hinge shafts 316A. However, other movements of the pop-up arms 330A are inhibited. For instance, at this orientation, the A direction is generally parallel to the x-reference direction. The keys 1106 and channels 1104 configuration fosters the x-reference axis movement while inhibiting other relative movement, such as along the y-reference axis and/or along other angles defined within the xy-reference plane.

FIG. 12C, shows interaction of the primary gears 306 and the secondary gears 308 to cause equal rotation around the hinge shafts 316.

FIG. 12D shows how the hinge assembly 106A can generate forces that bias the first and second portions 102A and 104A apart from a closed orientation to a defined orientation, such as from zero degrees to 40 degrees (e.g., 20 degrees around each hinge axis). In this case, tabs 332A of the hinge shafts 316A are contacting portions 334A(1)A and 334A(2)A of the pop-up arms 330A. This contact can force the pop-up arms 330A to move relative to the friction arms 304A by distance D. This movement can preload (e.g., compress) the springs 328A so that the springs are creating a force to rotate the two device portions 102 and 104 apart from one another through a range of rotation. The movement of the pop-up arms 330A away from the friction arms 304A can also decouple the spring force from the friction arms 304A. Thus, at this orientation, spring force is not applied to increase friction between the friction arm and the hinge shafts 316A, thereby allowing easier relative rotation of the hinge shafts and the friction arms when the first and second portions are unlocked.

FIG. 12E shows the multi-lobe cams 320A. In this case, multi-lobe cams can include two or more cam lobes 412A and cam recesses 414A (not all of which are designated with specificity). In this zero-degree orientation, cam follower 324A(1) is positioned in cam recess 414(1)A and cam follower 324A(2) is positioned in cam recess 414A(2)A which allows the hinge guides 322A and hence the first and second portions 102A and 104A to rest against one another. In other orientations, the multi-lobe cams 320A can force the first and second portions 102A and 104A away from one another to reduce/prevent damage to the device 100A.

Further, the camming action can be facilitated by a force directing the cam 320A (and hence the hinge guide 322A) and the cam follower 324A (via the friction arm 304A) against one another. However, at the zero-degree orientation the springs 328A have been decoupled from the friction arms 304A. The spring force is instead being directed to the pop-up feature (e.g., to the pop-up arm 330A and hence tab 332A). As such, at this orientation, rotation around the first and second hinge axes 116 is made easier by decoupling the spring force from the cam and cam follower and instead using the spring force to bias the two portions 102A and 104A apart from one another. Further, because the cam and cam follower are not forced against one another, the resistance to rotation of the first and second portions is less, and so a smaller spring force can accomplish the pop-up rotation than would be required without the decoupling.

FIGS. 13A-13F show the first and second portions 102 and 104 rotated 30-degrees from the orientation of FIGS. 12A-12F.

Figure 13A:
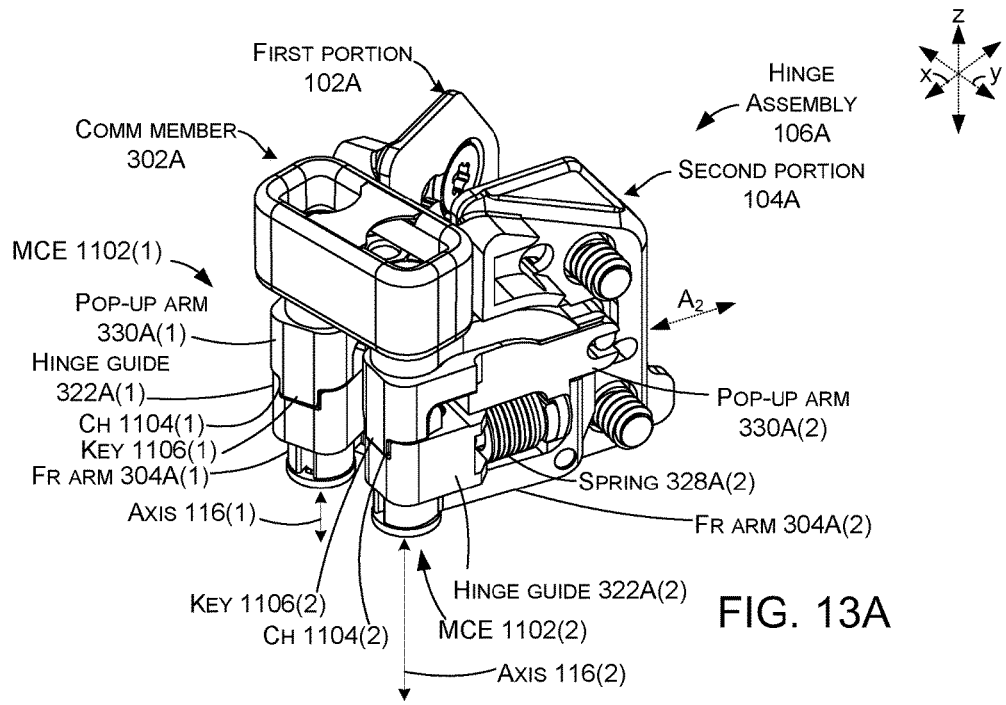
Figure 13B:
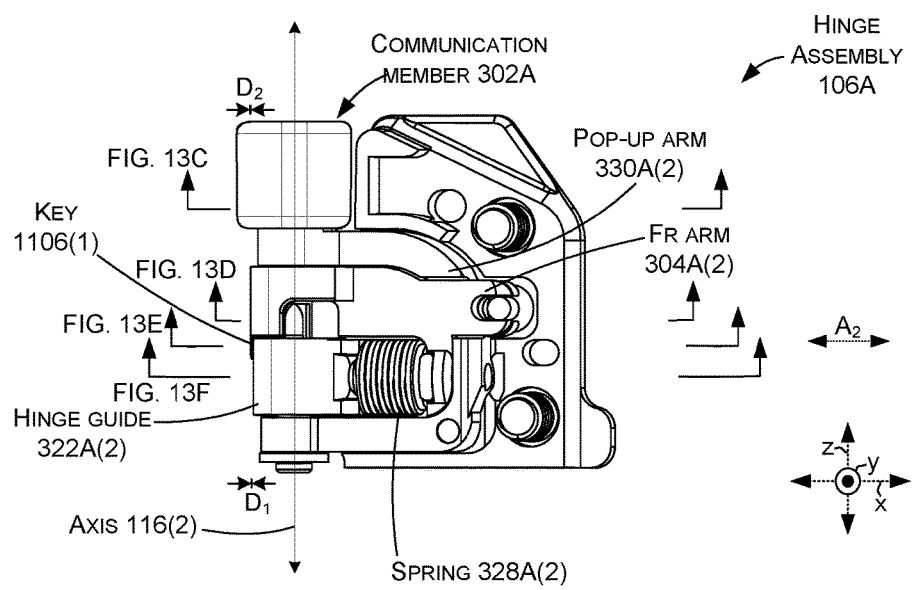
Figure 13C:
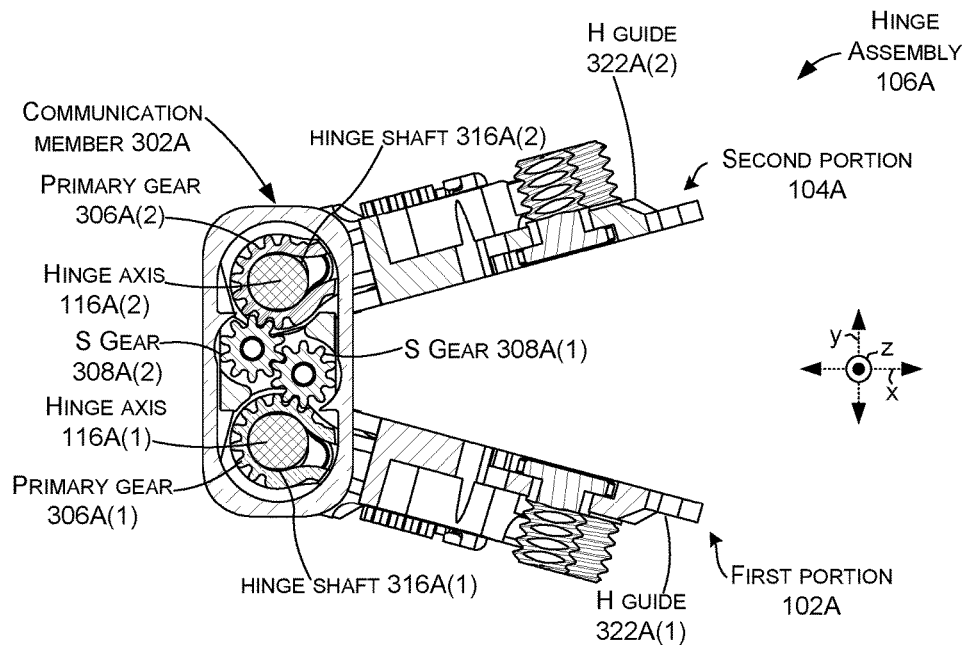

FIG. 13C shows the primary gears 306A and the secondary gears 308A continuing to regulate equal rotation around the two hinge axes 116. Thus, 15 degrees of the rotation from the zero-degree orientation to the 30-degree orientation occurs around each hinge axis.

Figure 13D:
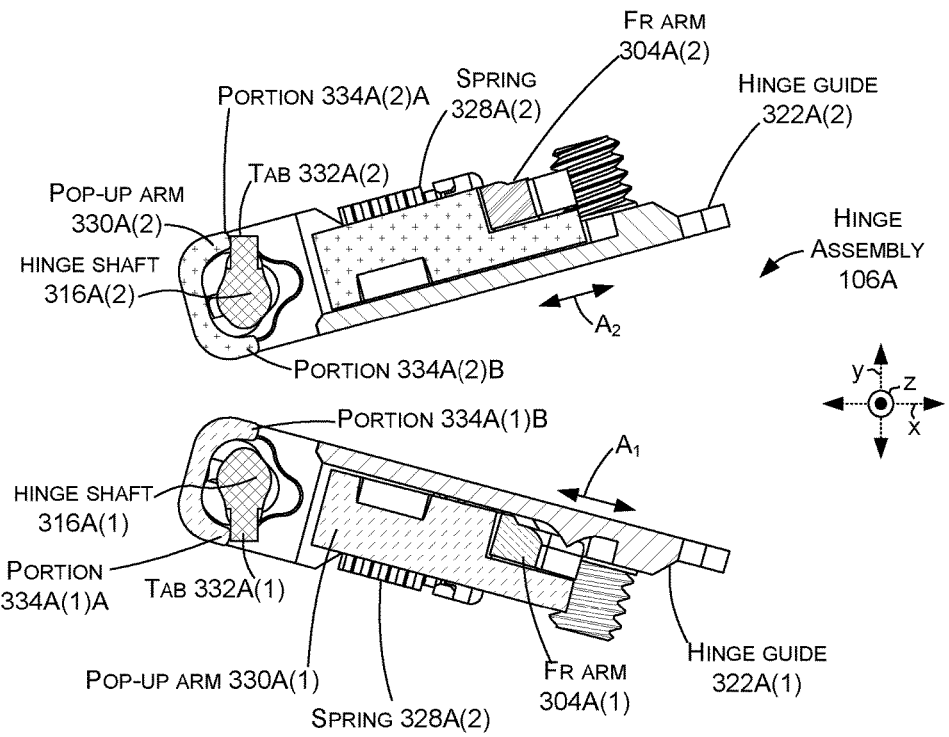
Figure 13E:
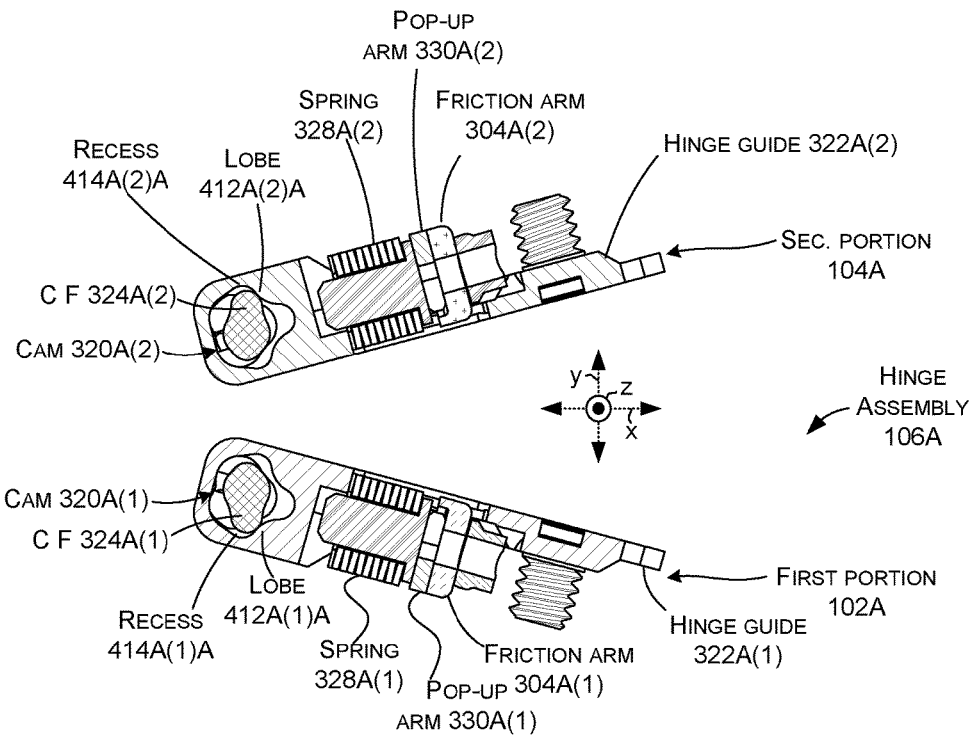

FIG. 13D shows tabs 332A ceasing to engage portions 334A(1)A and 334A(2)A. As a result, force from springs 328A is moving/forcing the pop-up arms 330A to the right along the A direction/axis (since the first and second portions 102A and 104A are not parallel at this point, a separate arrow A is shown for each pop-up arm 330A).

Figure 13F:
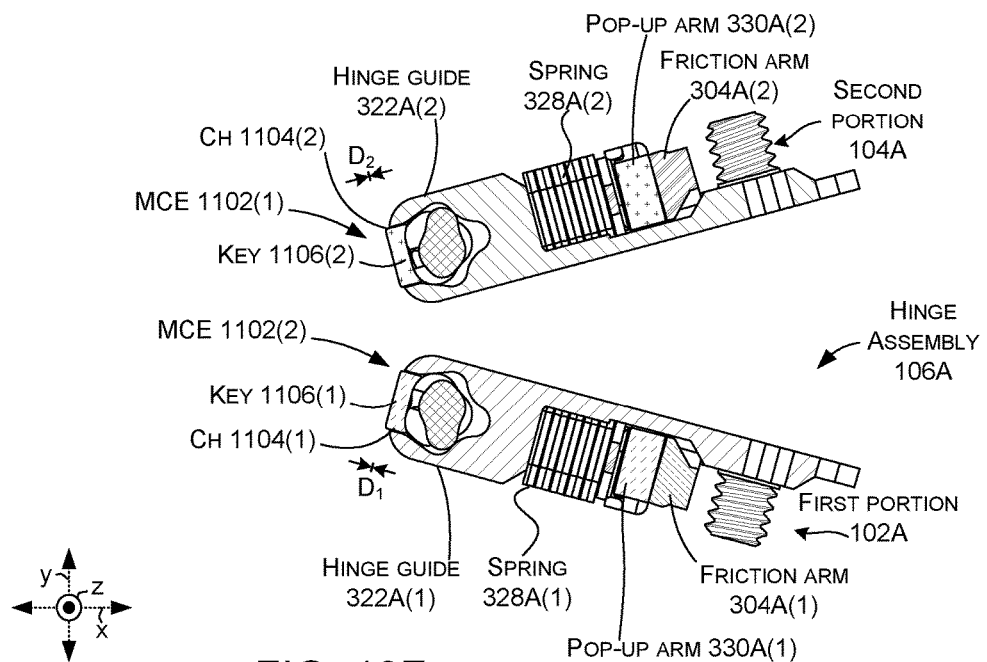
Figure 14A:
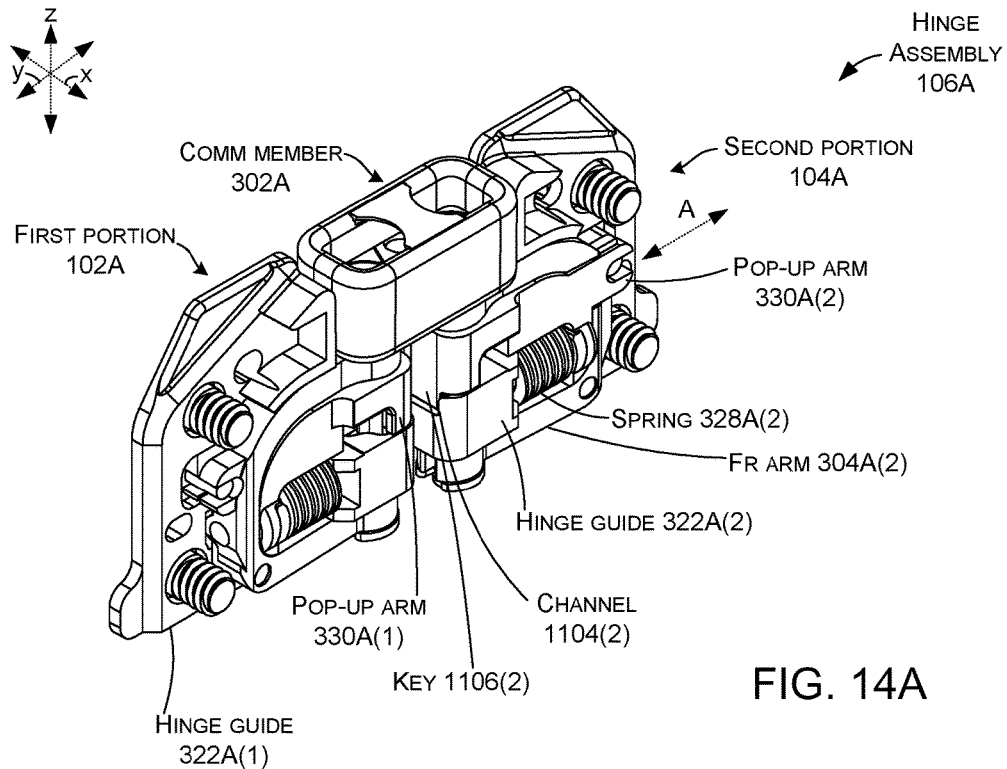
Figure 14B:
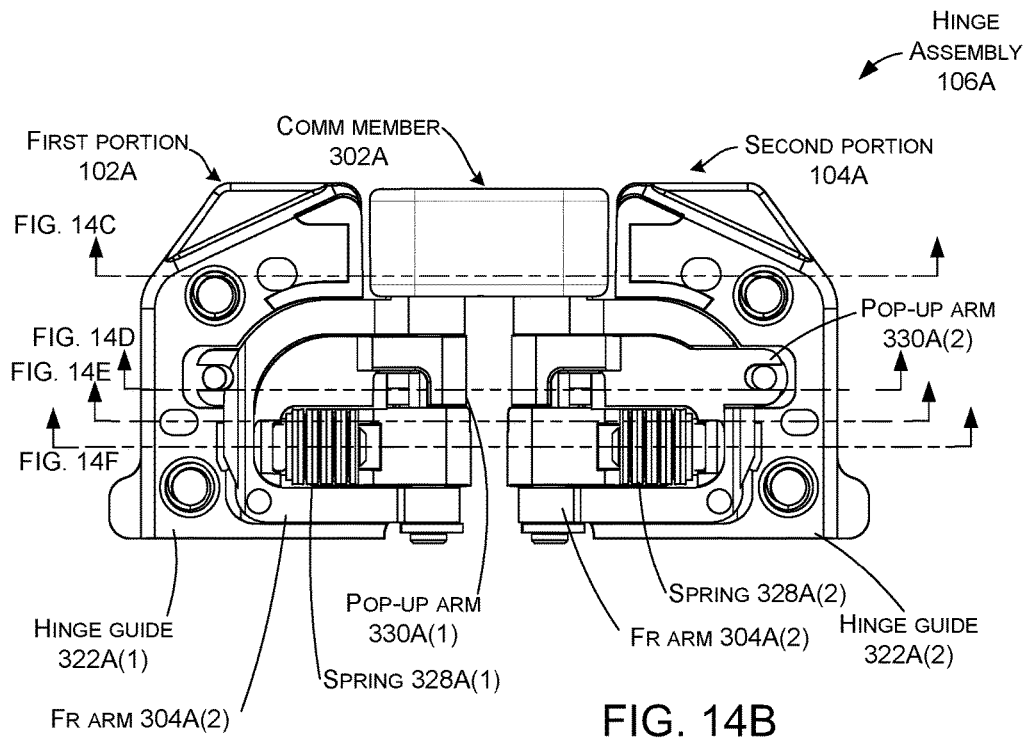

FIGS. 13A, 13B, and 13F show positions of the pop-up arms 330A relative to hinge guides 322A. The movement of the pop-up arms 330A reflected in arrows A of FIG. 13D reduces and then eliminates the distance D (now zero) until the front of the pop-up arms 330A are flush with the front of the hinge guides 322A. Specifically, the keys 1106 of the pop-up arms 330A(2) have moved along the channels 1104 of the hinge guides 322A until the pop-up arms and hinge guides are relatively flush. Further, during this first range of rotation from zero-degrees to 30-degrees the interactions of the channels 1104 and keys 1106 has prevented other directions of movement of the pop-up arms relative to the hinge guides.

At this point, the pop-up arms 330A are recoupling with the friction arms 304A. Stated another way, the first range of rotation is ending, and the second range of rotation is beginning. In the first range of rotation the spring force was applied to the hinge shafts 316A (e.g., tabs 332A) to create a pop-up force to automatically open the first and second device portions. The movement constraining element 1102 served to facilitate spring induced relative motion between the pop-up arms 330A and the hinge guides 322A along the A axis and constrain other relative motion. In the second range of rotation, the spring force contributes to friction in the hinge assembly 106A to create resistance to rotation so that the device portions maintain an orientation set by the user.

FIGS. 14A-14F show the first and second portions 102A and 104A at 180-degree orientations with the first and second portions parallel to, and abutting, one another.

FIG. 14C shows the primary and secondary gears 306A and 308A continuing to cause equal rotation around the first and second hinge axes 116 (specifically designated in other views, in this view contained within hinge shafts 316A).

FIG. 14D shows tabs 332A of the hinge shafts 316A are not engaging portions 334(1)A and 334(2)A or 334(1)B and 334(2)B of the pop-up arms 330A. Instead, the spring force is biasing the pop-up arms 330A against the friction arms 304A (e.g., away from the hinge shafts) and the spring force is also biasing the hinge guides 322A and hence the cams (FIG. 14E, 320A) against the cam followers (FIG. 14E, 324A) (e.g., toward the hinge shafts 316A).

FIGS. 14E and 14F show cam followers 324A fully engaging cam recesses 414A(1)B and 414A(2)B, which allows the first and second portions 102A and 104A to move toward and abut one another. The abutting first and second portions can reduce/minimize any gap or discontinuity on displays positioned on the first and second portions and create a nearly seamless 'single display' across the first and second portions in the 180-degree orientation. Further, FIG. 14F shows that similar to the 30-degree orientation of FIG. 13F, the pop-up arms' keys 1106 remain constrained by the hinge guides' channels 1104 except in the A direction. Further, the front of the pop-up arms 330A remains flush with the front of the hinge guides 322A (e.g., distance D is zero) because tab 332A is not exerting force on the pop-up arms 330A (see FIG. 14D).

Other orientations of hinge assembly 106A should be readily understood from the description above relative to FIGS. 3-10G and FIGS. 11-14F.

Various examples are described above. Additional examples can include a device that comprises a first portion and a second portion that are rotatably coupled via a hinge shaft and a force generating element. The device can also include a force transferring element extending along an axis that is orthogonal to the hinge shaft and a movement constraining element configured to allow linear movement of the force transferring element parallel to the axis and rotational movement around the hinge shaft and configured to inhibit movement of the force transferring element relative to other axes.

Another example can include any of the above and/or below examples where the force transferring element is associated with the force generating element and is configured to employ force from the force generating element by moving along the axis in a first direction to bias the first and second portions to rotate away from one another during a first range of rotation between the first and second portions and to move in a second opposite direction along the axis to employ the force to create resistance to rotation during a second range of rotation.

Another example can include any of the above and/or below examples where the force transferring element comprises a pop-up arm.

Another example can include any of the above and/or below examples where the movement constraining element comprises a hinge guide secured to the first portion.

Another example can include any of the above and/or below examples where the hinge shaft extends through the hinge guide and the pop-up arm.

Another example can include any of the above and/or below examples where the hinge guide defines a channel that extends along the axis and the pop-up arm defines a key that rides in the channel along the axis.

Another example can include any of the above and/or below examples where the hinge guide defines pins and the pop-up arm defines slots that extend parallel to the axis and wherein the pins can move linearly relative to the slots parallel to the axis but the pins and slots inhibit rotation of the pop-up arm relative to the hinge guide.

Another example can include any of the above and/or below examples where the force generating element generates a clockwise rotational force on the pop-up arm relative to the hinge guide and wherein the pins are positioned in the slots to prevent clockwise rotation due to the clockwise rotational force.

Another example can include any of the above and/or below examples where the force generating element comprises a spring.

Another example can include any of the above and/or below examples where the spring is oriented parallel to the axis.

Another example can include any of the above and/or below examples where an adjuster controls pretension of the spring against the pop-up arm.

Another example can include any of the above and/or below examples where the movement constraining element is configured to constrain both linear movement of the force transferring element and rotational movement of the force transferring element.

Another example can include any of the above and/or below examples where the hinge shaft comprises a tab that contacts a portion of the force transferring element to couple the force to the hinge shaft during the first range of rotation.

Another example can include any of the above and/or below examples where the contact between the tab on the hinge shaft and the portion of the force transferring element creates the bias to rotate the first and second portions away from one another.

Another example can include any of the above and/or below examples where the hinge shaft comprises multiple parallel hinge shafts.

Another example can include a first portion and a second portion that are rotatably coupled via a hinge shaft, a force generating element, a force transferring element extending along an axis that is orthogonal to the hinge shaft, and a movement constraining element configured to allow movement of the force transferring element parallel to the axis and configured to inhibit movement of the force transferring element relative to other axes. The force transferring element can be associated with the force generating element and configured to employ force from the force generating element by moving along the axis in a first direction to bias the first and second portions to rotate away from one another during a first range of rotation between the first and second portions and to move in a second opposite direction along the axis to employ the force to create resistance to rotation during a second range of rotation.

Another example can include any of the above and/or below examples where the movement constraining element defines a channel and the force generating element defines a key that engages the channel.

Another example can include a device, comprising a hinge assembly that rotatably secures a first portion relative to a hinge axis. The hinge assembly can comprise an element that rotates around the hinge axis and moves toward and away from the hinge axis.

Another example can include any of the above and/or below examples where the first portion defines a channel and the element defines a key that moves orthogonally along the channel.

Another example can include any of the above and/or below examples where the element comprises a force transferring element that transfers force to one element of the hinge assembly at a first orientation of the first portion and to another element at a second orientation that is different from the first orientation.

Individual elements of the hinge assemblies can be made from various materials, such as metals, plastics, and/or composites. These materials can be prepared in various ways, such as in the form of sheet metals, die cast metals, machined metals, 3D printed materials, molded or 3D printed plastics, and/or molded or 3D printed composites, among others, and/or any combination of these materials and/or preparations can be employed.

The present hinge assembly concepts can be utilized with any type of device, such as but not limited to notebook computers, smart phones, wearable smart devices, tablets, and/or other types of existing, developing, and/or yet to be developed devices.

Various methods of manufacture, assembly, and/or use for hinge assemblies and devices are contemplated beyond those shown above relative to FIGS. 1-14F.

Although techniques, methods, devices, systems, etc., pertaining to hinge assemblies are described in language specific to structural features and/or methodological acts, it is to be understood that the subject matter defined in the appended claims is not limited to the specific features or acts described. Rather, the specific features and acts are disclosed as example forms of implementing the claimed methods, devices, systems, etc.

The invention claimed is:

1. A device, comprising:
a first portion and a second portion that are rotatably coupled via multiple parallel hinge shafts each hinge shaft associated with:
a force generating element;
a force transferring element extending along an axis that is orthogonal to the hinge shaft; and,
a movement constraining element configured to allow linear movement of the force transferring element parallel to the axis and rotational movement around the hinge shaft and configured to inhibit movement of the force transferring element relative to other axes.

2. The device of claim 1, wherein the force transferring element is associated with the force generating element and is configured to employ force from the force generating element by moving along the axis in a first direction to bias the first and second portions to rotate away from one another during a first range of rotation between the first and second portions and to move in a second opposite direction along the axis to employ the force to create resistance to rotation during a second range of rotation.

3. The device of claim 2, wherein the hinge shaft comprises a tab that contacts a portion of the force transferring element to couple the force to the hinge shaft during the first range of rotation.

4. The device of claim 3, wherein the contact between the tab on the hinge shaft and the portion of the force transferring element creates the bias to rotate the first and second portions away from one another.

5. The device of claim 1, wherein the force transferring element comprises a pop-up arm.

6. The device of claim 5, wherein the movement constraining element comprises a hinge guide secured to the first portion.

7. The device of claim 6, wherein the hinge shaft extends through the hinge guide and the pop-up arm.

8. The device of claim 6, wherein the hinge guide defines a channel that extends along the axis and the pop-up arm defines a key that rides in the channel along the axis.

9. The device of claim 6, wherein the hinge guide defines pins and the pop-up arm defines slots that extend parallel to the axis and wherein the pins can move linearly relative to the slots parallel to the axis but the pins and slots inhibit rotation of the pop-up arm relative to the hinge guide.

10. The device of claim 9, wherein the force generating element generates a clockwise rotational force on the pop-up arm relative to the hinge guide and wherein the pins are positioned in the slots to prevent clockwise rotation due to the clockwise rotational force.

11. The device of claim 5, wherein the force generating element comprises a spring.

12. The device of claim 11, wherein the spring is oriented parallel to the axis.

13. The device of claim 11, further comprising an adjuster that controls pretension of the spring against the pop-up arm.

14. The device of claim 1, wherein the movement constraining element is configured to constrain both linear movement of the force transferring element and rotational movement of the force transferring element.

15. The device of claim 1, wherein the multiple parallel hinge shafts comprise at least a first hinge shaft and a second hinge shaft.

16. A device, comprising:
a first portion and a second portion that are rotatably coupled via a hinge shaft;
a force generating element;
a force transferring element extending along an axis that is orthogonal to the hinge shaft;
a movement constraining element configured to allow movement of the force transferring element parallel to the axis and configured to inhibit movement of the force transferring element relative to other axes; and,
the force transferring element associated with the force generating element and configured to employ force from the force generating element by moving along the axis in a first direction to bias the first and second portions to rotate away from one another during a first range of rotation between the first and second portions and to move in a second opposite direction along the axis to employ the force to create resistance to rotation during a second range of rotation.

17. The device of claim 16, wherein the movement constraining element defines a channel and the force generating element defines a key that engages the channel.

* * * * *